(12) United States Patent
Koch, III

(10) Patent No.: US 8,307,197 B2
(45) Date of Patent: *Nov. 6, 2012

(54) SHORT-CIRCUIT EVALUATION OF BOOLEAN EXPRESSION BY ROLLING UP SUB-EXPRESSION RESULT IN REGISTERS STORING DEFAULT VALUE

(75) Inventor: Kenneth Elmon Koch, III, Waxhaw, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/364,047

(22) Filed: Feb. 2, 2009

(65) Prior Publication Data

US 2009/0138679 A1    May 28, 2009

Related U.S. Application Data

(60) Continuation-in-part of application No. 12/033,644, filed on Feb. 19, 2008, now abandoned, which is a division of application No. 10/075,917, filed on Feb. 13, 2002, now Pat. No. 7,360,066.

(60) Provisional application No. 60/268,417, filed on Feb. 14, 2001, provisional application No. 60/268,472, filed on Feb. 14, 2001, provisional application No. 60/268,478, filed on Feb. 14, 2001.

(51) Int. Cl.
*G06F 17/00* (2006.01)

(52) U.S. Cl. ........................................ 712/223; 712/36

(58) Field of Classification Search ........................ None
See application file for complete search history.

(56) References Cited

U.S. PATENT DOCUMENTS

| | | | |
|---|---|---|---|
| 4,165,534 A * | 8/1979 | Dummermuth et al. | 700/3 |
| 4,792,909 A | 12/1988 | Serlet | |
| 5,493,675 A * | 2/1996 | Faiman et al. | 717/151 |
| 5,530,939 A | 6/1996 | Mansfield, Jr et al. | |
| 5,682,519 A * | 10/1997 | Saldanha et al. | 716/104 |
| 5,805,462 A | 9/1998 | Poirot et al. | |
| 5,905,977 A | 5/1999 | Goubault | |
| 6,343,362 B1 * | 1/2002 | Ptacek et al. | 726/23 |
| 6,385,757 B1 | 5/2002 | Gupta et al. | |
| 7,315,936 B2 | 1/2008 | Koch, III | |
| 7,360,066 B2 | 4/2008 | Koch, III | |
| 7,406,592 B1 * | 7/2008 | Polyudov | 713/2 |
| 7,818,720 B2 * | 10/2010 | Gan et al. | 717/130 |

OTHER PUBLICATIONS

Miner, A.S. et al., "Efficient Reachability Set Generation and Storage using Decision Diagrams." Department of Computer Science, William and Mary; web page at http://citeseer.ist.psu.edu/cache/papers/cs/26511/http:zSzzSzwww.cs.wm.eduzSz~ciardozSzpubsSz1999ICATPN-MDD.pdf/miner99efficient.pdf.

Posegga, J. et al., "Towards First-Order Deduction Based on Shannon Graphs." Universitat Karlsruhe, Institut fur Logik, Komplexitat und Deduktionssysteme; web page at http://citeseer.ist.psu.edu/cache/papers/cs/24059/http:zSzzSzwww.sdsc.eduzSz~ludaeschzSzPaperzSzgwai92.pdf/posegga92towards.pdf.

* cited by examiner

*Primary Examiner* — Kenneth Kim

(74) *Attorney, Agent, or Firm* — Kilpatrick Townsend & Stockton LLP

(57) ABSTRACT

A processor including a Boolean logic unit, wherein the Boolean logic unit is operated for performing the short-circuit evaluation of a Normal Form Boolean expression/operation, a plurality of input/output interfaces in communication with the Boolean logic unit, wherein the plurality of input/output interfaces are operated for receiving a plurality of compiled Boolean expressions/operations and transmitting a plurality of compiled results, and a plurality of registers coupled to the plurality of input/output interface circuits, wherein the plurality of multi-bit registers include an instruction register, a first address register and a second address register.

20 Claims, 54 Drawing Sheets

1305

SHORT-CIRCUIT EVALUATION OF BOOLEAN EXPRESSION BY ROLLING UP SUB-EXPRESSION RESULT IN REGISTERS STORING DEFAULT VALUE

CROSS-REFERENCE TO RELATED APPLICATION

This application is a continuation-in-part of U.S. patent application Ser. No. 12/033,644, which claims the benefit of U.S. patent application Ser. No. 10/075,917 filed Feb. 13, 2003 (now U.S. Pat. No. 7,360,066), which claims the benefit of provisional U.S. Patent Application Ser. No. 60/268,471 filed Feb. 14, 2001; provisional U.S. Patent Application Ser. No. 60/268,472 filed Feb. 14, 2001; and provisional U.S. Patent Application Ser. No. 60/268,478 filed Feb. 14, 2001.

FIELD OF THE PRESENT INVENTION

The present invention relates generally to the computing and microelectronics fields. More specifically, the present invention relates to a Boolean-based processor architecture that is capable of the short-circuit evaluation of Conjunctive Normal Form ("CNF") Boolean expressions, Disjunctive Normal Form ("DNF") Boolean expressions, or both. The Boolean processor of the present invention provides an inexpensive, scalable, and efficient means for computing in environments typically suited for application-specific microprocessors and microcontrollers, such as monitoring and automation environments.

BACKGROUND

A microprocessor is a general-purpose computing architecture, also known as a central processing unit (CPU). The microprocessor includes an arithmetic logic unit (ALU), an accumulator, a plurality of registers, a program counter, a stack pointer, a clock circuit, and a plurality of interrupt circuits. In building a complete computing system, the microprocessor must be supplemented with external components, such as a random-access memory (RAM) and a read-only memory (ROM), an oscillator, a plurality of memory decoders, a plurality of Input/Output (I/O) interfaces (ports), and a plurality of other devices, such as video displays and disk drives. The microprocessor is designed to perform a wide variety of calculations with data and return the results to a user or another machine. The microprocessor achieves this computing power through the use of a sophisticated instruction set that may contain a plurality of instructions for performing arithmetic operations, bit movement operations, memory fetch and store operations, etc. Because of the complexity of the calculations that the microprocessor performs, the programs that control its operation are generally relatively large, requiring the use of mass storage devices to house them. When needed for a specific calculation or task, a program is loaded into the system RAM and executed by the microprocessor.

The primary design factors related to the microprocessor are flexibility and expandability, allowing the microprocessor to handle almost any task. This adaptability has resulted in a relatively large demand for the microprocessor and has enabled manufacturers to mass-produce them, resulting in a relatively inexpensive and disposable product.

Like the microprocessor, a microcontroller is also a general-purpose computing architecture. The microcontroller differs from the microprocessor, however, in that it can operate as a complete, stand-alone computer system. The microcontroller includes all of the components of the microprocessor, in addition to its own RAM, ROM, plurality of counters, and ¼ ports. The microcontroller is also relatively flexible and can be used in a plurality of applications, however, the microcontroller is intended for use in a relatively static environment, requiring its programs to change minimally over time. The microcontroller is primarily intended to be used to control the environment within which it operates. The microcontroller is typically used in embedded system applications for monitoring and automation purposes. The microcontroller can be found in, for example, appliances (such as microwave ovens, refrigerators, televisions, VCRs, and stereos), automobiles (such as in engine control systems, diagnostics systems, and climate control systems), environmental control systems (such as factories, greenhouses, and homes), instrumentation arrays, and aerospace systems.

The microprocessor differs from the microcontroller in their sets of operational codes. Typically, the microprocessor has far more operational codes for moving data to and from an external memory than the microcontroller, which may only have a few such operational codes. From an internal bit-handling perspective, the microcontroller has far more internal bit-handling operational codes than the microprocessor, which may only have a few. The architecture of both the microprocessor and the microcontroller are intended for mass use and are designed for flexibility and expandability. Each has the goal of supporting a wide range of applications. While the primary use of the microprocessor is for calculation-intensive computing, the microcontroller is designed to handle smaller calculations and to control its environment.

The short-circuit evaluation of a Boolean expression or operation is simply the abandonment of the remainder of the expression or operation once its value has been determined. If the outcome of the expression or operation can be determined prior to its full evaluation, it makes sense to save processing cycles by avoiding the remaining, unnecessary, conditional tests of the expression or operation. In other words, the short-circuit evaluation of a Boolean expression is a technique that specifies the partial evaluation of expressions involving AND and OR operations.

A Boolean expression is in DNF if it is expressed as the sum (OR) of products (AND). That is, the Boolean expression B is in DNF if it is written as:
 A1 OR A2 OR A3 OR . . . An
where each term Ai is expressed as:
 T1 AND T2 AND . . . AND Tm
where each term Ti is either a simple variable, or the negation (NOT) of a simple variable. Each term Ai is referred to as a "minterm". A Boolean expression is in CNF if it is expressed as the product (AND) of sums (OR). That is, the Boolean expression B is in CNF if it is written as:
 01 AND 02 AND 03 AND . . . On
where each term Oi is expressed as:
 T1 OR T2 OR . . . OR Tm
where each term Ti is either a simple variable, or the negation (NOT) of a simple variable. Each term Oi is referred to as a "maxterm". The terms "minterm" and "maxterm" can also be referred to as "disjunct" and "conjunct", respectively.

The short-circuit evaluations of a CNF Boolean expression and a DNF Boolean expression are handled differently. In the case of a CNF expression, short-circuiting can occur if any of the conjuncts evaluates to false. In the following example,
 (A v B)^(C v D)
if either of the conjuncts, (A v B) or (C v D), evaluates to false, the expression also evaluates to false. If (A v B) evaluates to false, the remainder of the expression can be eliminated, thereby saving the time required to evaluate the other conjunct. In contrast to CNF short-circuit evaluation, a DNF expression can be short-circuited if any of the disjuncts evaluates to true. Using the previous example in DNF, (A^C)v(A^D)v(B^C)v(B^D)

if any of the disjuncts, (A^C), (A^D), (B^C), or (B^D), evaluates to true, the expression also evaluates to true. For example, if (A^C) evaluates to true, the evaluation of the remaining three disjuncts can be eliminated, since their values are irrelevant to the outcome of the expression.

Thus, the short-circuit evaluation of both CNF and DNF expressions becomes increasingly valuable, in terms of cycle savings, as the complexity of the expressions increases. In large scale monitoring and automation applications, the short-circuit evaluation of both CNF and DNF expressions is essential.

SUMMARY

Embodiments of the general-purpose Boolean processor of the present invention incorporate an architecture that is designed to provide optimal performance for computing complex Boolean expressions. The Boolean processor is intended for use in, among other things, monitoring and automation applications. The Boolean processor is built for speed and efficiency via its ability to perform the short-circuit evaluation of Conjunctive Normal Form (CNF) Boolean expressions. The Boolean processor provides enhanced computing performance, in terms of the number of instructions required to perform equivalent operations, to that of other general-purpose architectures.

In one embodiment, a processor includes a Boolean logic unit, wherein the Boolean logic unit is operated for performing the short-circuit evaluation of Normal Form Boolean expressions/operations; a plurality of input/output interfaces, wherein the plurality of input/output interfaces are operated for receiving a plurality of compiled Boolean expressions/operations and transmitting a plurality of compiled results; and a plurality of registers coupled to the plurality of input/output interface circuits, wherein the plurality of multi-bit registers comprise an instruction register, a first address register and a second address register.

In another embodiment, a method for processing a Boolean expression using a processor is provided, wherein the processor includes a Boolean logic unit, wherein the Boolean logic unit is operated for performing the short-circuit evaluation of Normal Form Boolean expressions/operations, a plurality of input/output interfaces, wherein the plurality of input/output interfaces are operated for receiving a plurality of compiled Boolean expressions/operations and transmitting a plurality of compiled results, and a plurality of registers coupled to the plurality of input/output interface circuits, wherein the plurality of multi-bit registers comprise an instruction register, a first address register and a second address register, the method including: (a) starting an operation related to a Normal Form Boolean expression, wherein the Boolean expression comprises a conjunct or a disjunct; (b) evaluating the conjunct or disjunct; (c) selectively short-circuiting a portion of the Boolean expression; and (d) providing a result.

In a further embodiment, a hybrid processor is provided, wherein the hybrid processor includes a host processor, wherein the host processor is at least operable for performing comparison operations and register modifications; and a Boolean processor core, wherein the Boolean processor core includes a Boolean short-circuit outcome calculation unit, wherein the Boolean short-circuit outcome calculation unit is operable for evaluating the short-circuit outcome of Conjunctive Normal Form Boolean expressions/operations, operable for evaluating the short-circuit outcome of Disjunctive Normal Form Boolean expressions/operations, or operable for evaluating the short-circuit outcome of both Conjunctive Normal Form Boolean expressions/operations and Disjunctive Normal Form Boolean expressions/operations; a plurality of input/output interfaces, wherein the plurality of input/output interfaces are operable for receiving, from the host processor, data related to: a plurality of compiled Boolean expressions/operations and transmitting, to the host processor, data representative of the short-circuit outcome of a plurality of evaluated Normal Form Boolean expressions/operations; and a plurality of registers coupled to the plurality of input/output interface circuits, wherein the plurality of multi-bit registers include an instruction register, a first address register and a second address register.

In a further embodiment, a compiling method includes receiving a plurality of conditional tests; based upon the received plurality of conditional tests, generating an operation, in computer-readable format, representative of a Boolean expression in Conjunctive Normal Form or Disjunctive Normal Form; and storing the operation in a Boolean processor operable to evaluate the Boolean expression by processing the operation and selectively short-circuiting a portion of the Boolean expression.

In a further embodiment, a system including a plurality of Boolean processors in parallel is provided.

In a further embodiment, a method is provided for processing a Boolean expression using a processor including a Boolean logic unit, wherein the Boolean logic unit is operated for performing the short-circuit evaluation of Normal Form Boolean expressions/operations, a plurality of input/output interfaces, wherein the plurality of input/output interfaces are operated for receiving a plurality of compiled Boolean expressions/operations and transmitting a plurality of compiled results, and a plurality of registers coupled to the plurality of input/output interface circuits, wherein the plurality of multi-bit registers include an instruction register, a first address register and a second address register, the method including searching a memory for data that meets criteria specified in the instruction register; and providing a result of the search.

BRIEF DESCRIPTION OF THE DRAWINGS

Further features, embodiments, and advantages of the present invention will become apparent from the following detailed description with reference to the drawings, wherein.

DETAILED DESCRIPTION

Figure 20:
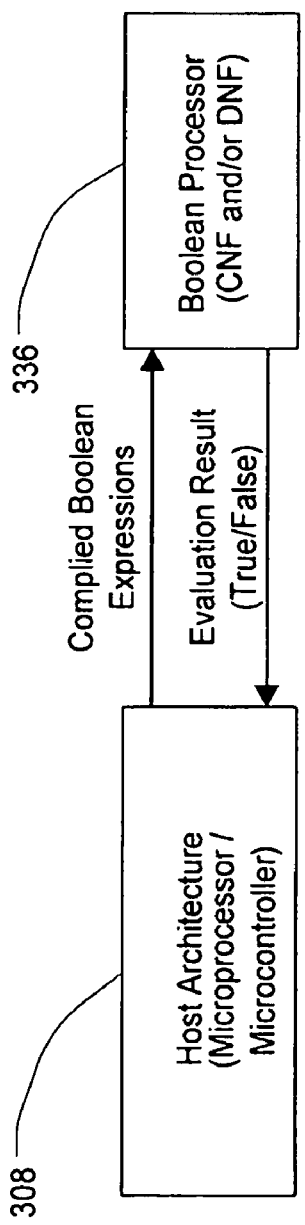
FIG. 20 is a high-level block diagram illustrating the functional relationship between a host computer device and a Boolean co-processor.
Figure 21:
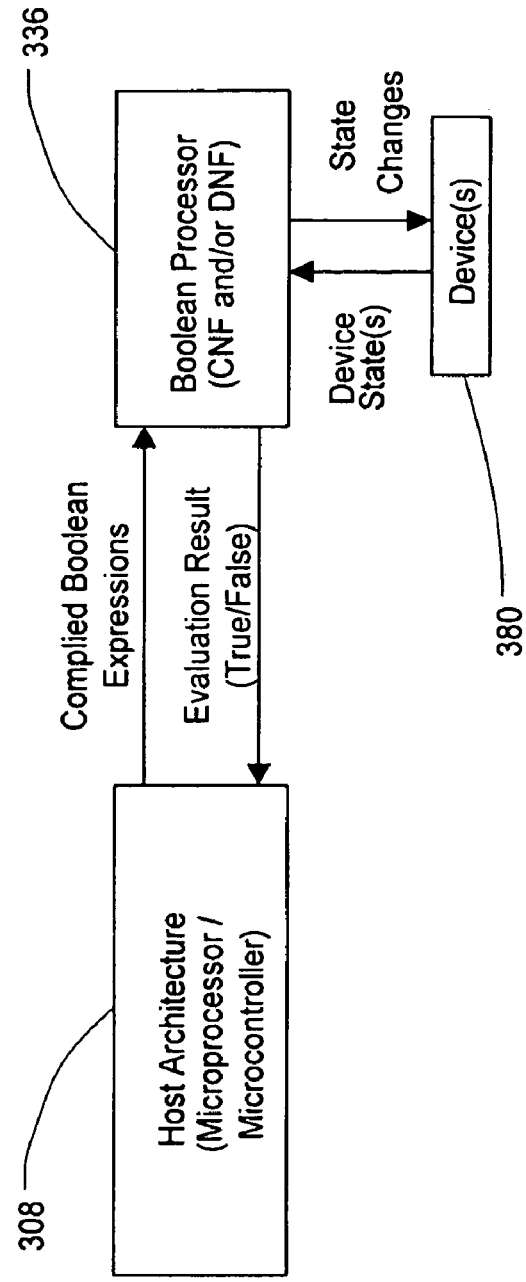
FIG. 21 is a high-level block diagram illustrating the functional relationship between a host computer device and a Boolean co-processor having a direct interface with one or more system devices.

Embodiments of the present invention provide systems an methods for an improved Boolean processor. One such embodiment is a Boolean co-processor that may be incorporated into larger chip designs such as other microcontrollers and/or microprocessors. One co-processor comprises a Boolean processor and/or DNF Boolean processor that is/are modified to accept portions of code from a host unit (microcontroller and/or microprocessor). These portions of code represent Boolean expressions in Conjunctive Normal Form (CNF) and/or Disjunctive Normal Form (DNF) and are off-loaded to the Boolean co-processor to maximize the overall speed of the host unit as shown in FIG. 20. In addition to providing the results of the evaluation of Boolean expressions to the host unit, the Boolean co-processor may also interface directly with devices connected to an entire system as shown in FIG. 21.

This Boolean processing functionality serves a similar purpose to that of a math co-processor with the exception that it executes Boolean operations instead of mathematical operations.

The efficiency of the short circuiting of CNF expressions can be maximized by:

C1. Evaluating terms within conjuncts that are most likely to be true as early as possible in the overall evaluation of each conjunct.

C2. Evaluating conjuncts that are most likely to evaluate to false as early as possible in the overall evaluation of the CNF expression.

Figure 19:
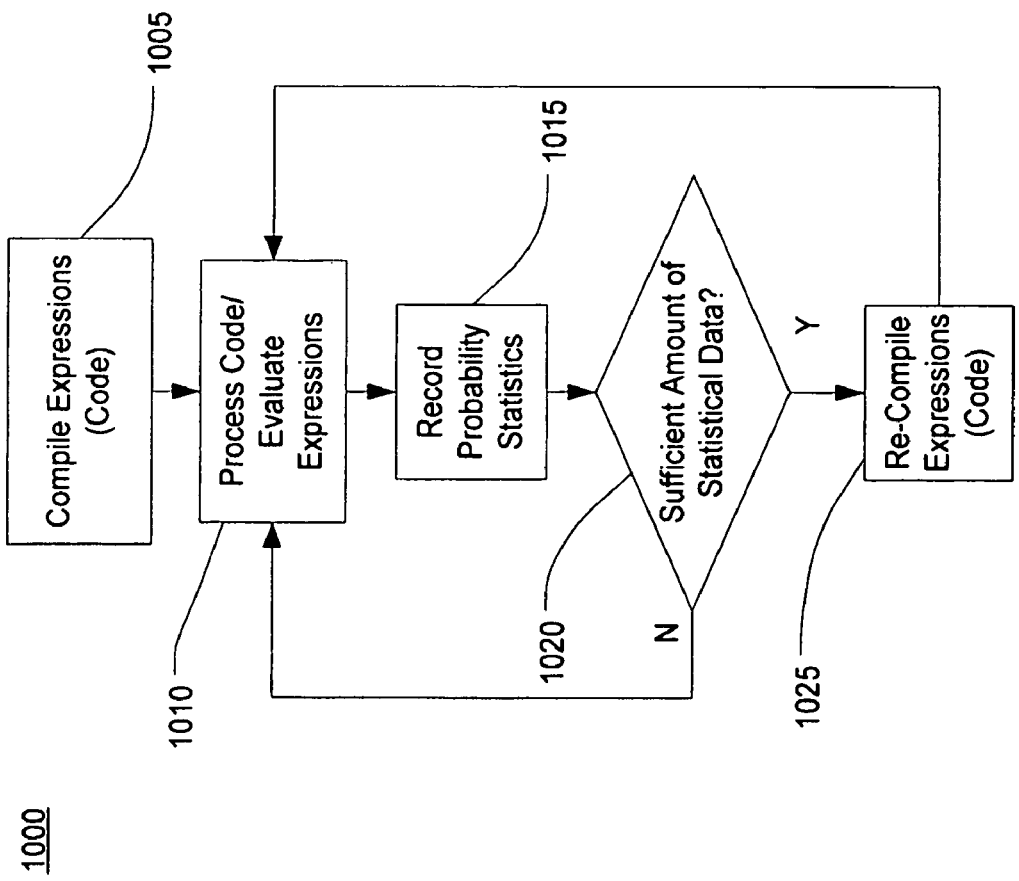
FIG. 19 is a flowchart diagram of a re-compiling process for use with the preferred embodiments of the present invention.

Another embodiment of the present invention is a method by which the probabilities of terms within conjuncts evaluating to true and/or false and the probabilities of conjuncts evaluating to true and/or false are stored in any form or fashion and recorded as the CNF expressions are evaluated over multiple iterations. These results are then used to recompile and/or reconfigure the ordering of terms, conjuncts, and/or operations to maximize the efficiency of the evaluations as described above in C1 and C2. The flow chart in FIG. 19 shows the process by which the efficiency of the evaluation of both CNF and DNF expressions is maximized.

The efficiency of the short circuiting of DNF expressions can be maximized by:

D1. Evaluating terms within disjuncts that are most likely to be false as early as possible in the overall evaluation of each disjunct.

D2. Evaluating disjuncts that are most likely to evaluate to true as early as possible in the overall evaluation of the DNF expression.

Another embodiment of the present invention is a method by which the probabilities of terms within disjuncts evaluating to true and/or false and the probabilities of disjuncts evaluating to true and/or false are stored in any form or fashion and recorded as the DNF expressions are evaluated over multiple iterations. These results are then used to recompile and/or reconfigure the ordering of terms, disjuncts, and/or operations to maximize the efficiency of the evaluations as described above in DI and D2.

Another embodiment of the present invention is an architecture similar to that previously disclosed that performs short-circuit evaluation of Disjunctive Normal Form Boolean expressions. In the case of DNF, an AND register is used to evaluate the results of and perform short circuiting within disjuncts when a state returns a false value, and roll the results into an OR register, that will perform a short circuit operation if any of the disjuncts in the expression being evaluated results in a true value.

The commonly-assigned U.S. Pat. No. 7,360,066 describes an AND register that is initialized to a value of true ('one'), remains at true ('one') if all conjuncts of a Boolean expression/operation being evaluated are true, and changes to a state of false ('zero') of if the expression being evaluated is false. In another embodiment of the present invention, the flexibility of the AND register is further extended. The AND register may be modified such that one or more values may be used to initialize the register and represent a true ('one') value. The same applies to a false ('zero') value, where any of another set of values, other than those used to represent a true ('one') value, may be used to represent a false ('zero') value.

The commonly-assigned U.S. Pat. No. 7,360,066 describes an OR register that is initialized to a value of 'zero' and remains at 'zero' until a state in a conjunct evaluates to 'one', at which point the register is set to 'one' and the operation is short-circuited to the start of the next conjunct in the expression being evaluated. In another embodiment of the present invention, the flexibility of the OR register is extended. The OR register may be modified such that one or more values may be used to initialize the register and represent a false ('zero') value. The same applies to a true ('one') value, where any of another set of values, other than those used to represent a false value, may be used to represent a true value.

The commonly-assigned U.S. Pat. No. 7,360,066 describes an instruction register comprised of n+m+3 bits consisting of an n-bit address, an m-bit control/state word, and a 3-bit operational code. In this case, n and m can be any number. In another embodiment of the present invention, the flexibility of the instruction register is further extended by making it an n+m+x bit register where x represents an operational code of x bits, where x can be any number. This will permit subsequent designs with more than $2^3$ operational codes (or less than $2^3$ operational codes, if desired).

In another embodiment of the present invention, Boolean processor device states are stored in the Device State Storage portion, or Random Access Memory, of the architecture. To ensure system accuracy, it is important that a memory location is not read while its contents are being modified. Doing so could result in erroneous results. To ensure that the aforementioned situation does not occur, the Boolean processor architecture may be modified so that the processor either waits for the modification operation to end before reading a location in memory, or skips the operation. In the event that the value of the memory location is critical to the operation being performed by the system, putting the system in a wait state is preferable.

The addition of a wait state or skip operation can be achieved by adding some form of indicator, including, but not limited to, a single bit added to each memory location, that will indicate whether or not a memory location is in the process of being modified. The processor will then wait for the modification to end before accessing the location or skip the reading of the location.

Figure 35:
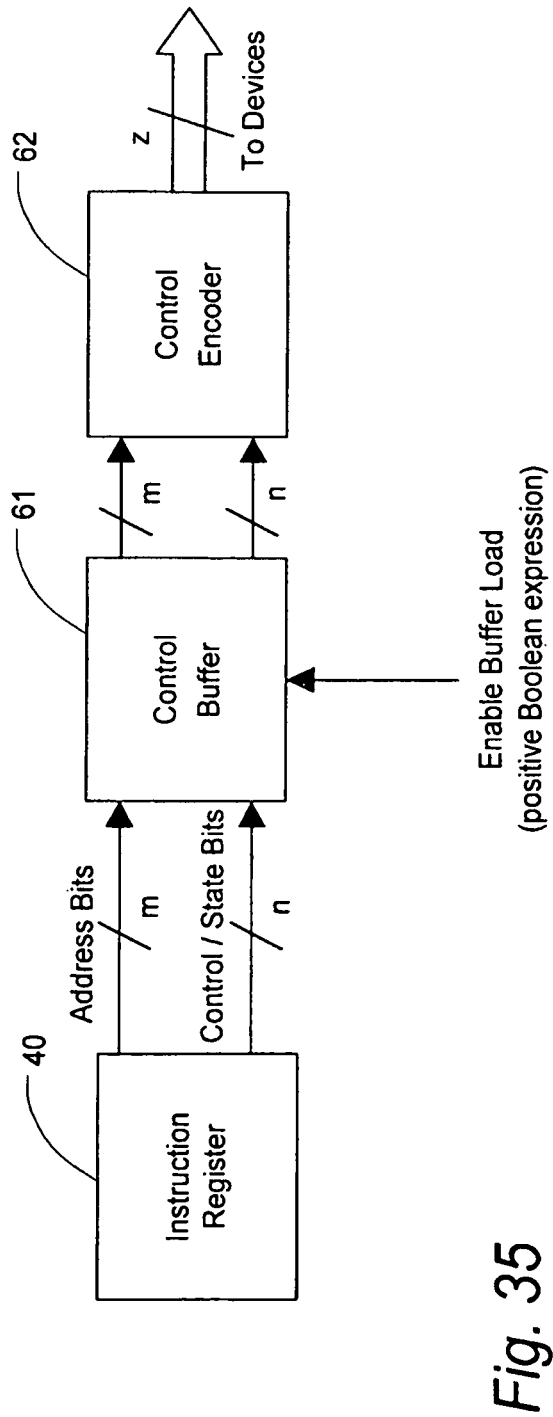
FIG. 35 is a high-level block diagram illustrating a first approach for ensuring data integrity in a Boolean processor system.

Additionally, the processor writes state change information directly across a bus to devices attached to it. The processor is designed to process its micro-program at a much faster rate than its devices operate. In the event that two or more device states are changed in a timeframe that is shorter than the time required to update a device's state, a buffer, as shown in FIG. 35, will need to be used to store state change commands until the bus is clear. Once an update message has been sent, the next message in the buffer may be sent. To ensure system accuracy, the single bit in RAM that indicates that the state of the corresponding device is being modified can be set to true to prevent the system from reading an expired state from device state storage.

Figure 36:
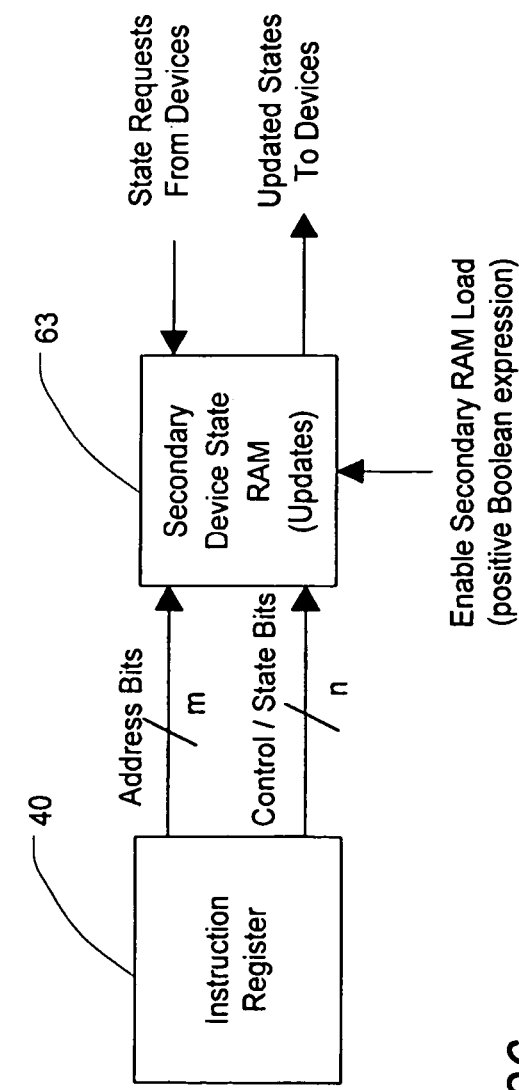
FIG. 36 is a high-level block diagram illustrating a second approach for ensuring data integrity in a Boolean processor system.

Another method for updating device states would be the addition of another RAM module that will store updated states. The Boolean processor would write state updates to that module. The devices could then request their own updated states from the RAM module. This configuration would operate similarly to the configuration described above except that, instead of having device states "pushed" out to the devices via the control encoder, devices would "pull" their states from the additional RAM module, as shown in FIG. 36.

In another embodiment of the present invention, multiple instances of the Boolean processor may be used in parallel to evaluate complex CNF or Disjunctive Normal Form (DNF) expressions in a divide-and-conquer type mode. In the case of CNF, the expression's conjuncts would be distributed to the different processors for evaluation. In the event that a conjunct, or series of conjuncts, results in a false evaluation, the processor upon which the conjunct(s) were being evaluated will signal the other processors that the entire operation is false whereby causing the next Boolean expression to be distributed among the processors for evaluation.

In the case of DNF, the expression's disjuncts would be distributed to the different processors for evaluation. In the event that a disjunct, or series of disjuncts, results in a true evaluation, the processor upon which the disjunct(s) were being evaluated will signal the other processors that the entire operation is true whereby causing the next expression to be distributed among the processors for evaluation.

Figure 43:
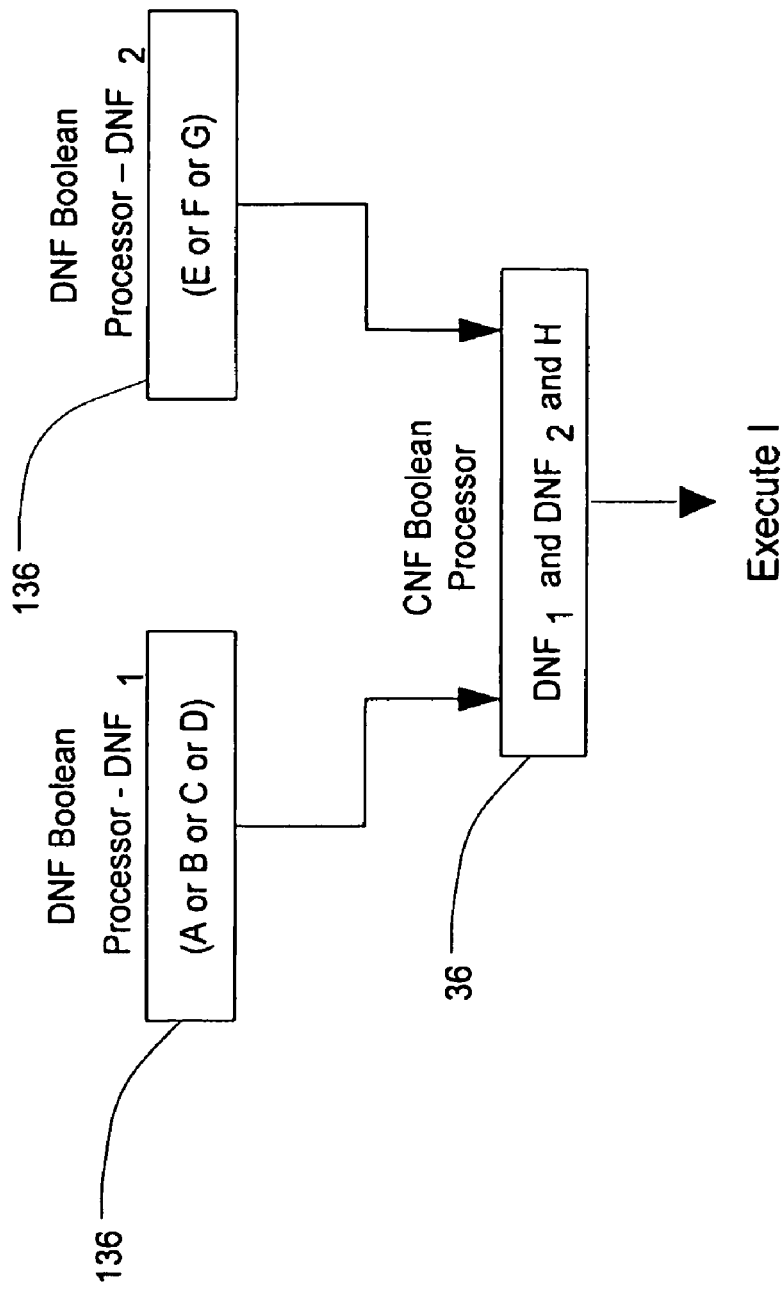
FIG. 43 is a high-level block diagram illustrating the use of Boolean processors in a parallel processing environment.

Instances of both DNF and CNF Boolean processors may also be intermingled to handle expressions. For example, in the case of the following CNF expression:

If (A or B or C or D) and (E or F or G) and H then I
where A, B, C, D, E, F, G, and H are terms of the form x=y
where x represents a device state and y represents a value for comparison, two DNF Boolean processors could be employed to evaluate the first two conjuncts since each conjunct represents a DNF expression in its most simple form. The final values from the DNF Boolean processors as well as the evaluation of H could then be rolled into a CNF Boolean processor as shown in FIG. 43.

Both the next operation address register and the end of OR address register may be loaded with values specified in the address portion of the instruction register. These values specify the addresses of lines of code within the micro-program that are jumped to when performing short circuit operations. This design limits the number of micro-program lines (or micro-program addresses) that can be accessed by the next operation address register and the end of OR address register to $2^n$, where n is the width, in bits, of the address portion of the instruction register.

In another embodiment of the present invention, in order to expand the micro-program address values that can be stored in the next operation address register and the end of OR address register, the architecture will be modified to use the bits from both the address and control/state portions of the instruction register when loading the next operation address and the end of OR address registers with the values of micro-program addresses.

In another embodiment, the control store portion of the architecture may be modified to include discrete jump to addresses that would only be utilized on instructions that are capable of being jumped to. While the limit on the number of instructions that may be jumped to remains the same in this case, the discrete jump addresses permits the "jump to" addresses to be dispersed throughout the entire micro-program, as opposed to being limited to the first $2^n$ instructions, where n is the width, in bits, of the address portion of the instruction register. The previously mentioned solution, however, in which the address and control/state portions of the instruction register are utilized, is the preferred solution.

Figure 41:
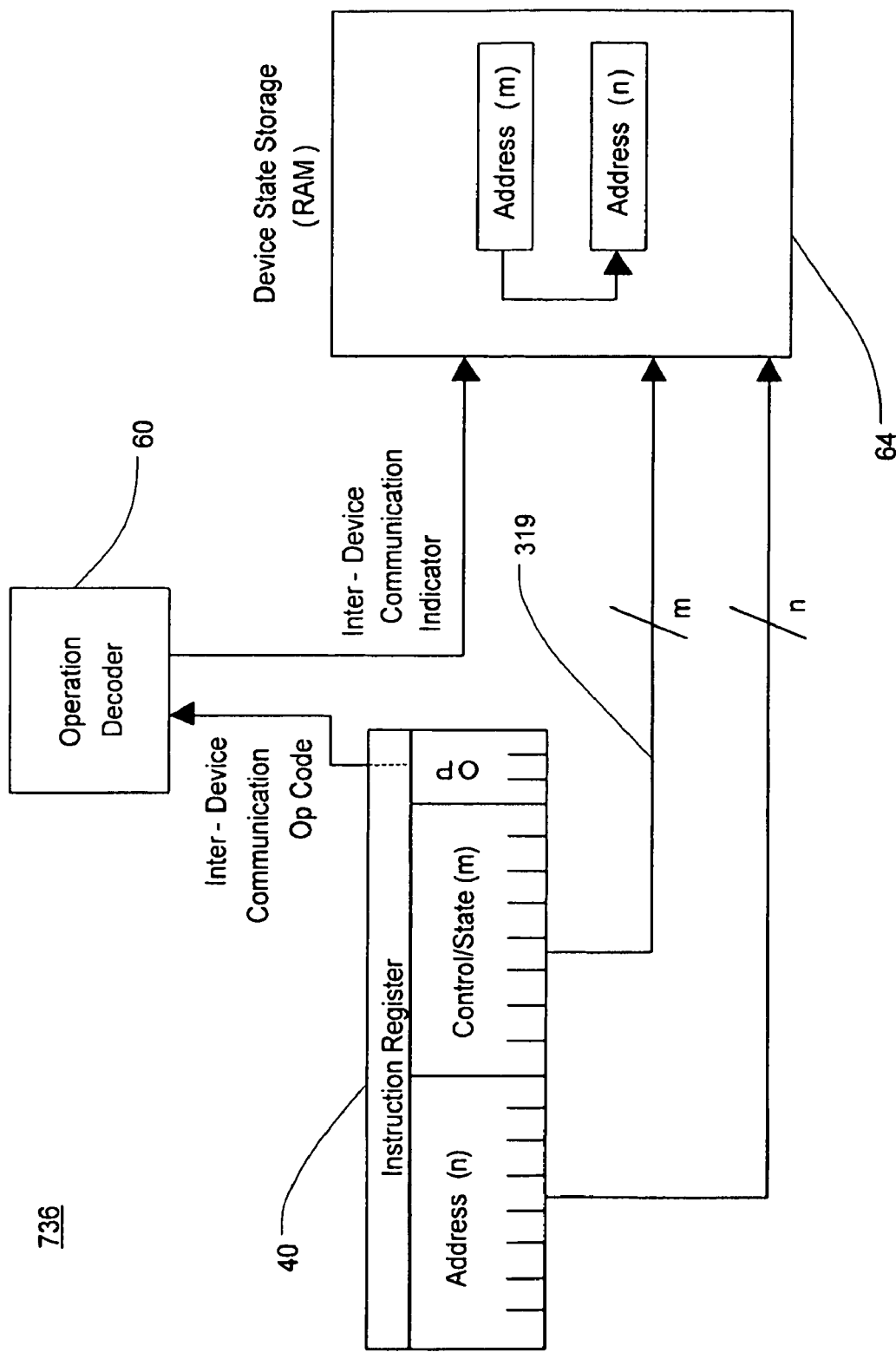
FIG. 41 is an enlarged schematic diagram of a portion of a Boolean processor having a direct connection for facilitating inter-device communication via the device state storage in accordance with another preferred embodiment of the present invention.
Figure 42:
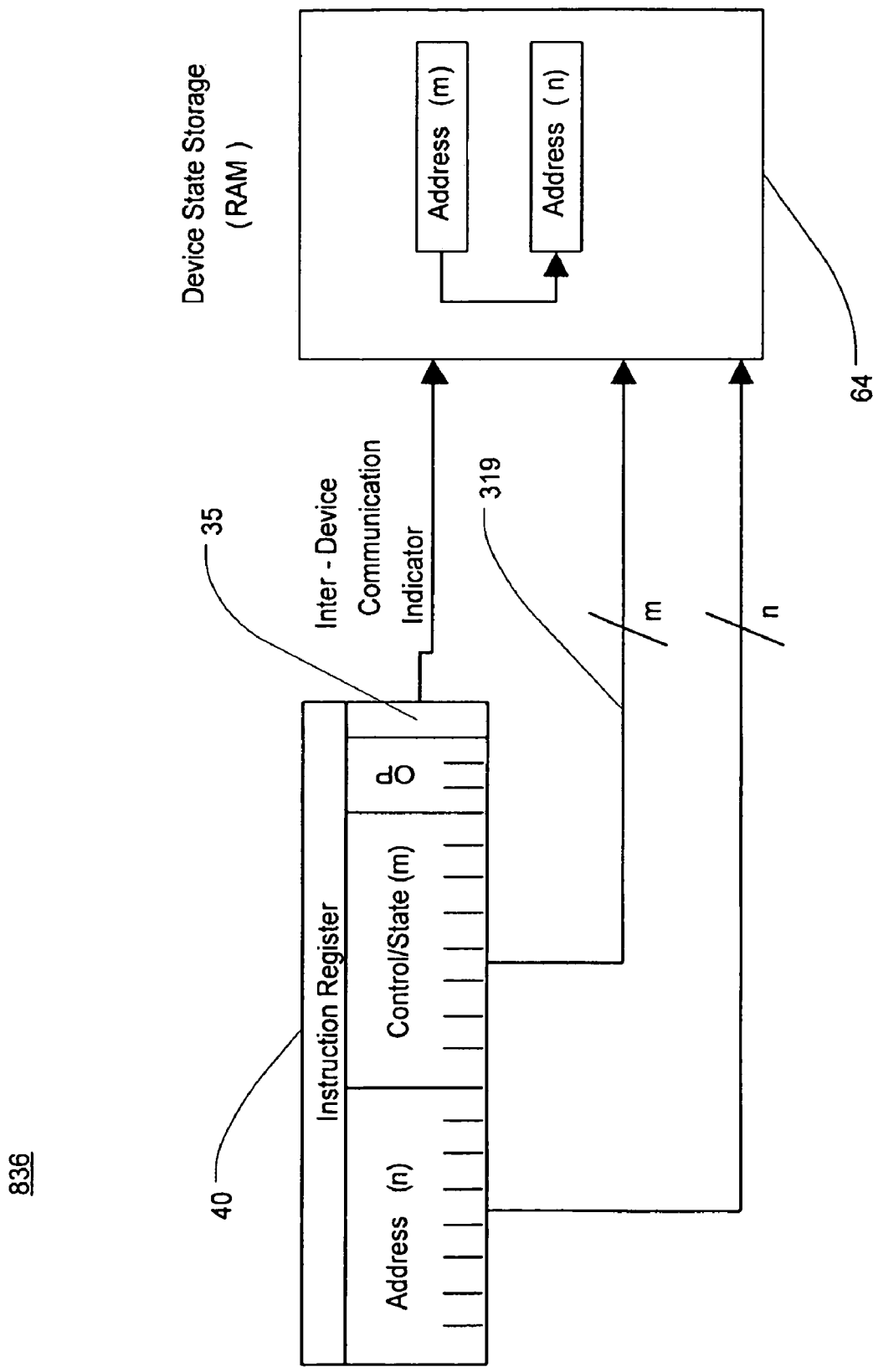
FIG. 42 is an enlarged schematic diagram of a portion of a Boolean processor having a direct connection for facilitating inter-device communication via the device state storage in accordance with yet another preferred embodiment of the present invention.

Another embodiment of the present invention is a modification to the Boolean processor that will enable inter-device communication. This functionality will permit the state of any device connected to the Boolean processor to be sent directly to any other device in the system. This communication may be achieved in one of two ways:

1. Via the addition of an extra instruction that will accept the addresses of the two devices (between which state information will be transferred) and facilitate the exchange of state data, as shown in FIG. 41. This change will require the expansion of the operation code (OP code) portion of the Boolean processor's instruction register by one bit to accommodate the extra instruction.
2. Via the addition of an indicator bit to the instruction register that will indicate that the value in the Control/State portion of the instruction register is either a direct value or the address of another device, as shown in FIG. 42. In the latter case, the state of the source device will be sent to the target device.

Embodiments of the present invention may be used for, but not limited to, applications such as serial and parallel communications add-ons for existing architectures. In either application (serial or parallel communications), peripherals (printers, modems, pointing devices, etc.), as well as internal memory locations, can be represented as devices within the Boolean processor architecture.

In the event that the Boolean processor is used as a serial communications co-processor in an existing microcontroller or microprocessor architecture, registers in the host architecture may be accessed directly by the Boolean processor by representing them as devices.

Receiving and transmitting acknowledgements can be represented as discrete states for each device (or memory location in the host architecture).

Another embodiment of the present invention is a modification to the Boolean processor that will enhance the performance of the architecture via the inclusion of:

1. An arithmetic logic unit (ALU). The ALU may be as simple as, but not limited to, a two word comparator, where the word size is determined by the number of device states supported by the implementation of the architecture. A two word comparator would simply test one word to determine if its value was either greater than, less than, greater than or equal to, or less than or equal to, the value of the other word. This will allow the Boolean processor to test threshold values and eliminate the need to test every discrete value in a range when making threshold comparisons (ex: x is greater than y). In the case of the ALU being a two word comparator, four new instructions would need to be built into the architecture. These instructions would support an AND compare between an immediate value and a device state, an AND compare between two device states, an OR compare between an immediate value and a device state, and an OR compare between two device states.

2. Two new instructions to enable AND and OR operations when comparing two device state values for equality. The current AND and OR operations are used to compare immediate values with a single device state.

3. An additional instruction for loading a value directly into an address in device state storage. This instruction will minimize the number of instructions required to load a value into a device state storage address.

The enhancements mentioned above will improve the performance of the Boolean processor in stand-alone applications as well as co-processor applications. The addition of these enhancements enables the Boolean processor to be used in applications such as data mining, knowledge discovery, and artificial intelligence where complex Boolean Normal Form (Conjunctive and Disjunctive) evaluations are commonplace.

Additional embodiments of the present invention are a set of Boolean processor cores. The cores are designed to rapidly compute the results of CNF and/or DNF expressions by interfacing the n-bit AND, OR, OR conjunct, and AND disjunct registers of the CNF and DNF Boolean processors with any existing computing architecture. These cores may also utilize the instruction set of the host architecture and directly accept any value from the host architecture, such as program addresses and the host's condition bit, as input.

The CNF Boolean processor core is comprised of an AND register, an OR register, and an OR conjunct register. These registers are used to compute the outcome of CNF Boolean expressions and their functionality in computing CNF Boolean expressions is described in commonly assigned U.S. Pat. No. 7,360,066. In addition to these three registers, a next operation address register, which holds the address of the instruction immediately following the CNF expression, as well as an end of OR address register, which holds the address of the instruction immediately following an OR conjunct, may also be included in the core. These address registers may also be omitted and substituted with registers from the host architecture.

The AND, OR, and OR conjunct registers may be set and/or reset in the following ways:

1. By modifying their values directly with-load instructions (from the host architecture and/or the CNF Boolean processor core) or any other register modifying instruction (from the host architecture and/or the CNF Boolean processor core).

2. By utilizing another register (within the host architecture or the CNF Boolean processor core) that can be set with a single instruction or series of instructions and will, subsequently, modify the values of the AND, OR, and OR conjunct registers by tying bits of the register directly to them.

3. In the event that address registers are used with the CNF Boolean processor core, modification of the address registers can trigger the setting and resetting of the AND, OR, and OR conjunct registers.

DNF Boolean processor core is comprised of an AND register, an OR register, and an AND disjunct register. These registers are used to compute the outcome of DNF Boolean expressions and their functionality in computing DNF Boolean expressions is described in the Provisional Patent Application titled "DNF Boolean Processor" by Kenneth E. Koch III. In addition to these three registers, an end of operation address register, which holds the address of the instruction that is executed in the event that the DNF expression evaluates to true, as well as an end of AND address register, which holds the address of the instruction immediately following an AND disjunct, may also be included in the core. These address registers may also be omitted and substituted with registers from the host architecture.

The AND, OR, and AND disjunct registers may be set and/or reset in the following ways:

1. By modifying their values directly with load instructions (from the host architecture and/or the DNF Boolean processor core) or any other register modifying instruction (from the host architecture and/or the DNF Boolean processor core).

2. By utilizing another register (within the host architecture or the DNF Boolean processor core) that can be set with a single instruction or series of instructions and will, subsequently, modify the values of the AND, OR, and AND disjunct registers by tying bits of the register directly to them.

3. In the event that address registers are used with the DNF Boolean processor core, modification of the address registers can trigger the setting and resetting of the AND, OR, and AND disjunct registers.

The functionality of both the CNF Boolean processor core and the DNF Boolean processor core may be combined to form a single core that is capable of computing the results of both CNF and DNF Boolean expressions.

The input to a Boolean processor core from a host architecture may vary and may include, but is not limited to:

1. 1) An indication to the core that the host architecture is in need of its services. This may include a register that, when set, will output the values of the address registers in the event that any Boolean short-circuiting occurs.

2. Addresses for the next operation address register, addresses for the end of operation address register, addresses for the end of OR address register (CNF) and addresses for the end of AND address register (DNF).

3. Condition bit or similar true/false comparison indication from the host architecture.

4. Direct values for the AND, OR, OR conjunct (CNF), and AND disjunct (DNF) registers.

5. A word, register, memory value, or any portion of the aforementioned as a direct feed into any of the Boolean processor core registers.

6. Any combination of the above.

The output from a Boolean processor core to its host architecture may include, but is not limited to:

1. A direct update of the host's program counter to the instruction address specified in the next operation address register (CNF), the end of operation address register (DNF), the end of OR address register (CNF), or the end of AND address register (DNF).

2. The execution of an instruction by the host architecture that will make the value of any of a Boolean processor core's register values accessible to the host architecture.

3. A feed to an interrupt in the host architecture triggered by the changing of any of a Boolean processor's register values.

Further areas of applicability of embodiments of the present invention will become apparent from the detailed description provided hereinafter. It should be understood that the detailed description and specific examples, while indicating the preferred embodiment of the invention, are intended for purposes of illustration only and are not intended to limit the scope of the invention.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

Figure 1:
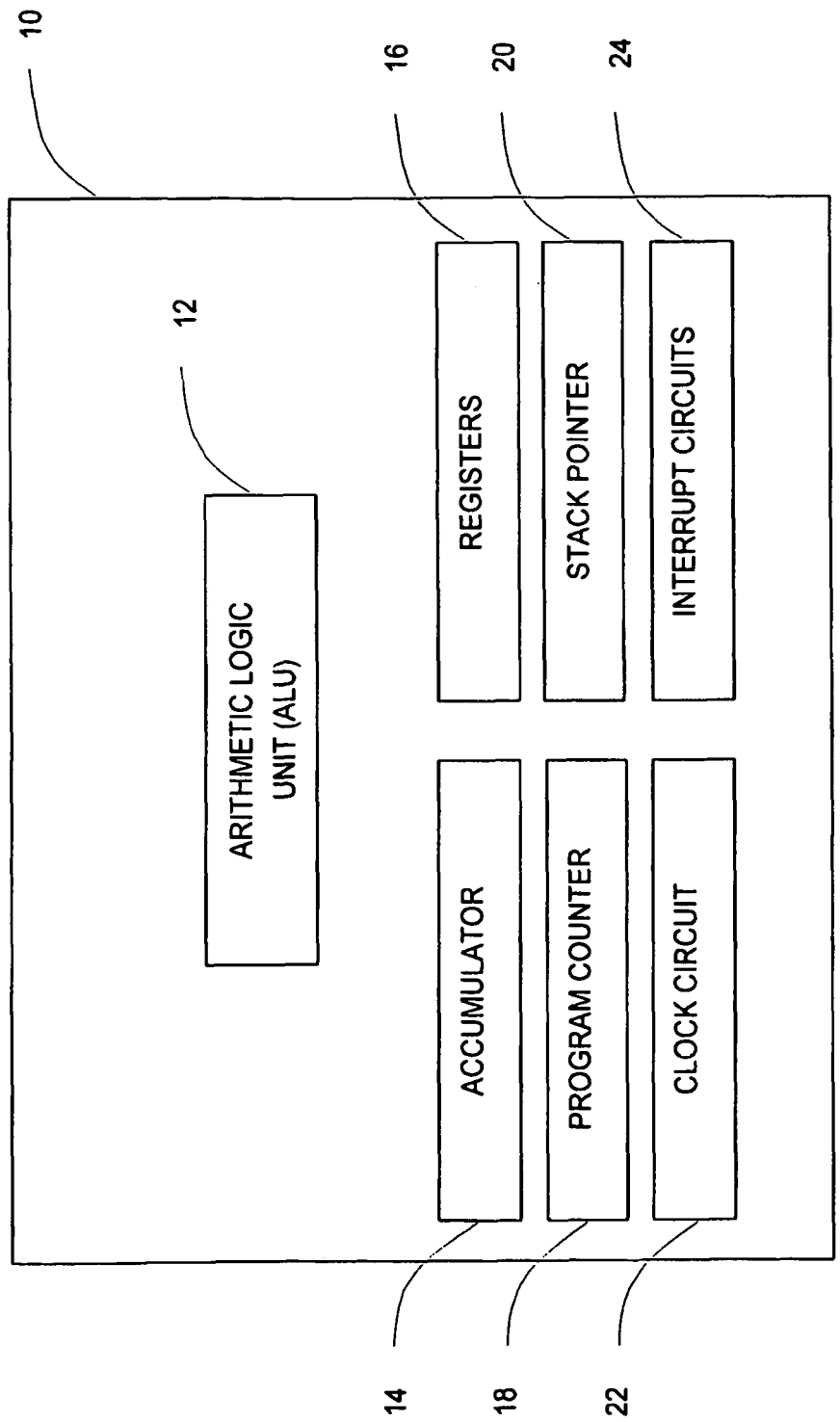
FIG. 1 is a schematic block diagram of a conventional microprocessor.

A microprocessor is a general-purpose computing architecture, also known as a central processing unit (CPU). Referring to FIG. 1, the microprocessor 10 includes an arithmetic logic unit (ALU) 12, an accumulator 14, a plurality of registers 16, a program counter 18, a stack pointer 20, a clock circuit 22, and a plurality of interrupt circuits 24. In building a complete computing system, the microprocessor 10 must be supplemented with external components, such as a random-access memory (RAM) and a read-only memory (ROM), an oscillator, a plurality of memory decoders, a plurality of Input/Output (110) interfaces (ports), and a plurality of other devices, such as video displays and disk drives. The microprocessor 10 is designed to perform a wide variety of calculations with data and return the results to a user or another machine. The microprocessor 10 achieves this computing power through the use of a sophisticated instruction set that may contain a plurality of instructions for performing arithmetic operations, bit movement operations, memory fetch and store operations, etc. Because of the complexity of the calculations that the microprocessor 10 performs, the programs that control its operation are generally relatively large, requiring the use of mass storage devices to house them. When needed for a specific calculation or task, a program is loaded into the system RAM and executed by the microprocessor 10.

The primary design factors related to the microprocessor 10 are flexibility and expandability, allowing the microprocessor 10 to handle almost any task. This adaptability has resulted in a relatively large demand for the microprocessor 10 and has enabled manufacturers to mass-produce them, resulting in a relatively inexpensive and disposable product.

Figure 2:
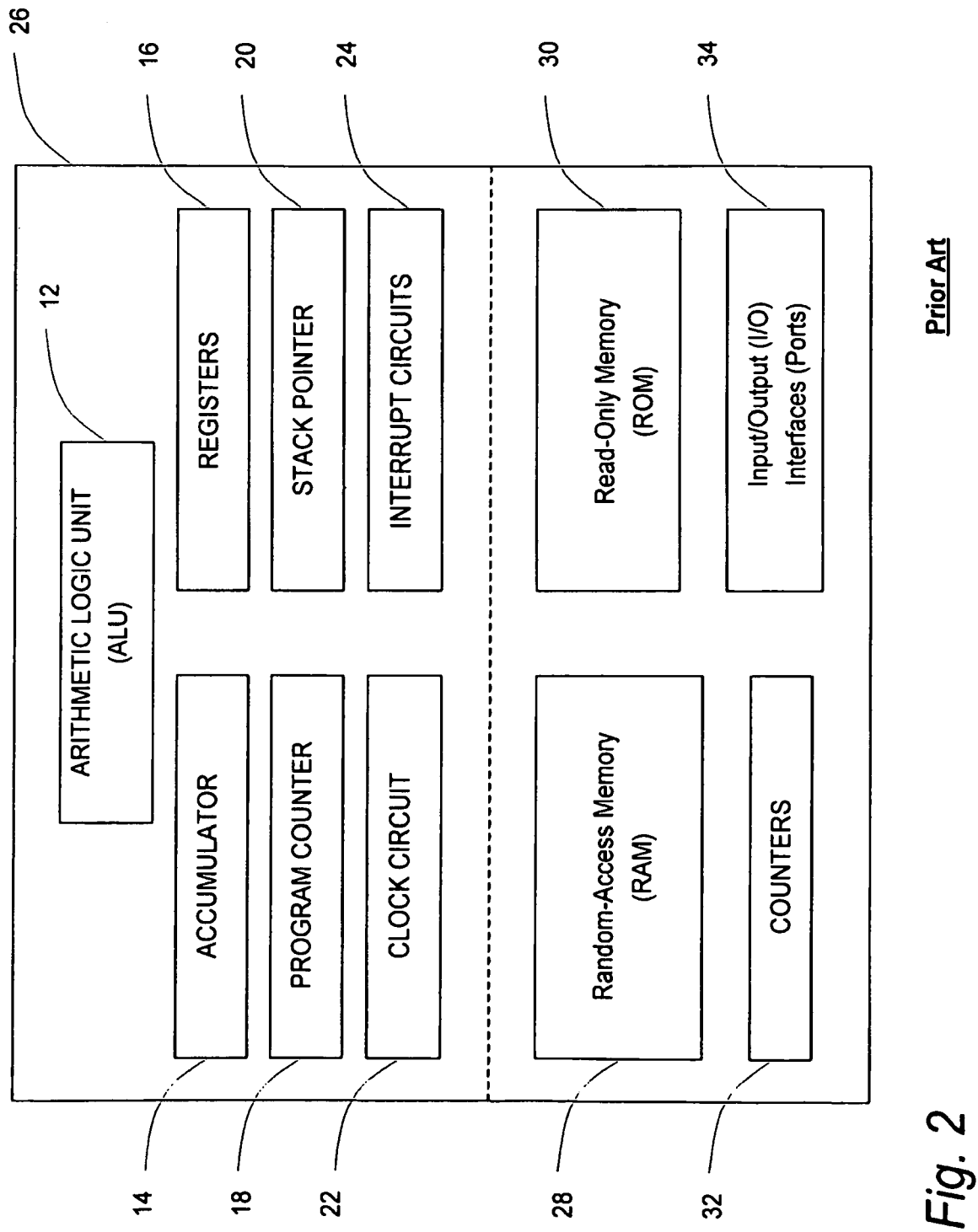
FIG. 2 is a schematic block diagram of a conventional microcontroller.

Like the microprocessor 10, a microcontroller is also a general-purpose computing architecture. The microcontroller differs from the microprocessor 10, however, in that it can operate as a complete, stand-alone computer system. Referring to FIG. 2, the microcontroller 26 includes all of the components of the microprocessor 10 (FIG. 1), in addition to its own RAM 28, ROM 30, plurality of counters 32, and I/O ports 34. The microcontroller 26 is also relatively flexible and can be used in a plurality of applications, however, the microcontroller 26 is intended for use in a relatively static environment, requiring its programs to change minimally over time. The microcontroller 26 is primarily intended to be used to control the environment within which it operates. The microcontroller 26 is typically used in embedded system applications for monitoring and automation purposes. The microcontroller 26 can be found in, for example, appliances (such as microwave ovens, refrigerators, televisions, VCRs, and stereos), automobiles (such as in engine control systems, diagnostics systems, and climate control systems), environmental control systems (such as in factories, greenhouses, and homes), instrumentation arrays, and aerospace systems.

The microprocessor 10 differs from the microcontroller 26 in their sets of operational codes. The microprocessor 10 has far more operational codes for moving data to and from an external memory than the microcontroller 26, which may only have a few such operational codes. From an internal bit-handling perspective, the microcontroller 26 has far more internal bit-handling operational codes than the microprocessor 10, which may only have a few. The architecture of both the microprocessor 10 and the microcontroller 26 are intended for mass use and are designed for flexibility and expandability. Each has the goal of supporting a wide range of applications. While the primary use of the microprocessor 10 is for calculation-intensive computing, the microcontroller 26 is designed to handle smaller calculations and to control its environment.

The short-circuit evaluation of a Boolean expression or operation is simply the abandonment of the remainder of the expression or operation once its value has been determined. If the outcome of the expression or operation can be determined prior to its full evaluation, it makes sense to save processing cycles by avoiding the remaining, unnecessary, conditional tests of the expression or operation. In other words, the short-circuit evaluation of a Boolean expression is a technique that specifies the partial evaluation of the expression involving an AND and/or an OR operation, or a plurality of each.

What is needed is a microprocessor and/or a microcontroller that is capable of evaluating complex Boolean expressions that are in Conjunctive Normal Form (CNF). Disjunctive Normal Form (DNF) Boolean expressions can also be incorporated into the architecture of the microprocessor and/or the microcontroller, however, there are inefficiencies associated with the processing of the DNF equivalents of CNF expressions.

A Boolean expression is in DNF if it is expressed as the sum (OR) of products (AND). That is, the Boolean expression B is in DNF if it is written as:

$$A1 \text{ OR } A2 \text{ OR } A3 \text{ OR} \ldots An \quad (1)$$

where each term Ai is expressed as:

$$T1 \text{ AND } T2 \text{ AND} \ldots \text{AND } Tm \quad (2)$$

where each term Ti is either a simple variable, or the negation (NOT) of a simple variable. Each term Ai is referred to as a "minterm". A Boolean expression is in CNF if it is expressed as the product (AND) of sums (OR). That is, the Boolean expression B is in CNF if it is written as:

$$O1 \text{ AND } O2 \text{ AND } O3 \text{ AND} \ldots On \quad (3)$$

On where each term 0i is expressed as:

$$T1 \text{ OR } T2 \text{ OR} \ldots \text{OR } Tm \quad (4)$$

where each term Ti is either a simple variable, or the negation (NOT) of a simple variable. Each term O1 is referred to as a "maxterm". The terms "minterm" and "maxterm" can also be referred to as "disjunct" and "conjunct", respectively.

The short-circuit evaluations of a CNF Boolean expression and a DNF Boolean expression are handled differently. In the case of a CNF expression, short-circuiting can occur if any of the conjuncts evaluates to false. In the following example, $$(A \lor B) \land (C \lor D) \quad (5)$$

if either of the conjuncts, (A ∨ B) or (C ∨ D), evaluates to false, the expression also evaluates to false. If (A ∨ B) evaluates to false, the remainder of the expression can be eliminated, thereby saving the time required to evaluate the other conjunct. In contrast to CNF short-circuit evaluation, a DNF expression can be short-circuited if any of the disjuncts evaluates to true. Using the previous example in DNF, $$(A\char`\^C)V(A\char`\^D)V(B\char`\^C)V(B\char`\^D) \qquad (6)$$

if any of the disjuncts, (A^C), (A^D), (B^C), or (B^D), evaluates to true, the expression also evaluates to true. For example, if (A^C) evaluates to true, the evaluation of the remaining three disjuncts can be eliminated, since their values are irrelevant to the outcome of the expression.

Thus, the short-circuit evaluation of both CNF and DNF expressions becomes increasingly valuable, in terms of cycle savings, as the complexity of the expressions increases. In large scale monitoring and automation applications, the short-circuit evaluation of both CNF and DNF expressions is essential.

Figure 3:
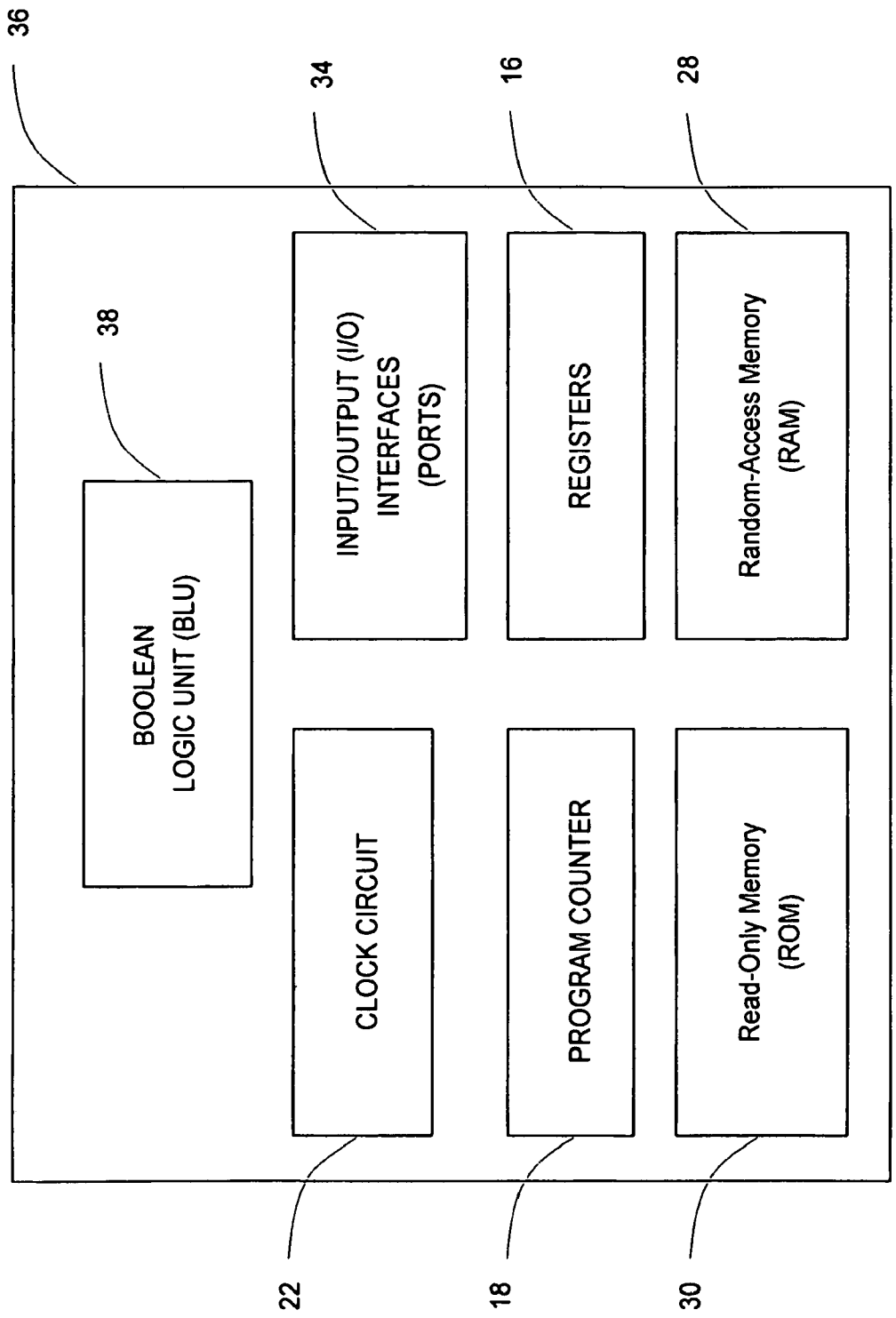
FIG. 3 is a schematic block diagram of one embodiment of the Boolean processor of the present invention.

Referring to FIG. 3, in one embodiment of the present invention, the architecture of the Boolean processor 36 can best be described as that of a microcontroller, at least functionally. The inputs of the microcontroller are compiled Boolean operations, or tests, and the outputs of the microcontroller are compiled result operations that are executed in conjunction with the results of the tests. The Boolean processor 36 includes a clock circuit 22, a program counter 18, a plurality of Input/Output (I/O) interfaces (ports) 34, a plurality of registers 16, a random-access memory (RAM) 28, and a read-only memory (ROM) 30. The Boolean processor 36 differs, however, from a conventional microcontroller in that the Boolean processor 36 does not contain an accumulator 14 (FIGS. 1 and 2), a plurality of counters (other than the program counter 18), a plurality of interrupt circuits 24 (FIGS. 1 and 2), or a stack pointer 20 (FIGS. 1 and 2). Additionally, in lieu of an arithmetic logic unit (ALU) 12 (FIGS. 1 and 2), the Boolean processor 36 includes a Boolean logic unit (BLU) 38. In terms of its size, speed, and functionality, the architecture of the Boolean processor 36 is designed to be inexpensive, scalable, and efficient. The Boolean processor 36 achieves these benefits through a simple design that is optimized for performing the short-circuit evaluation of complex Conjunctive Normal Form (CNF) Boolean expressions, Disjunctive Normal Form (DNF) Boolean expressions, or both.

Figure 4:
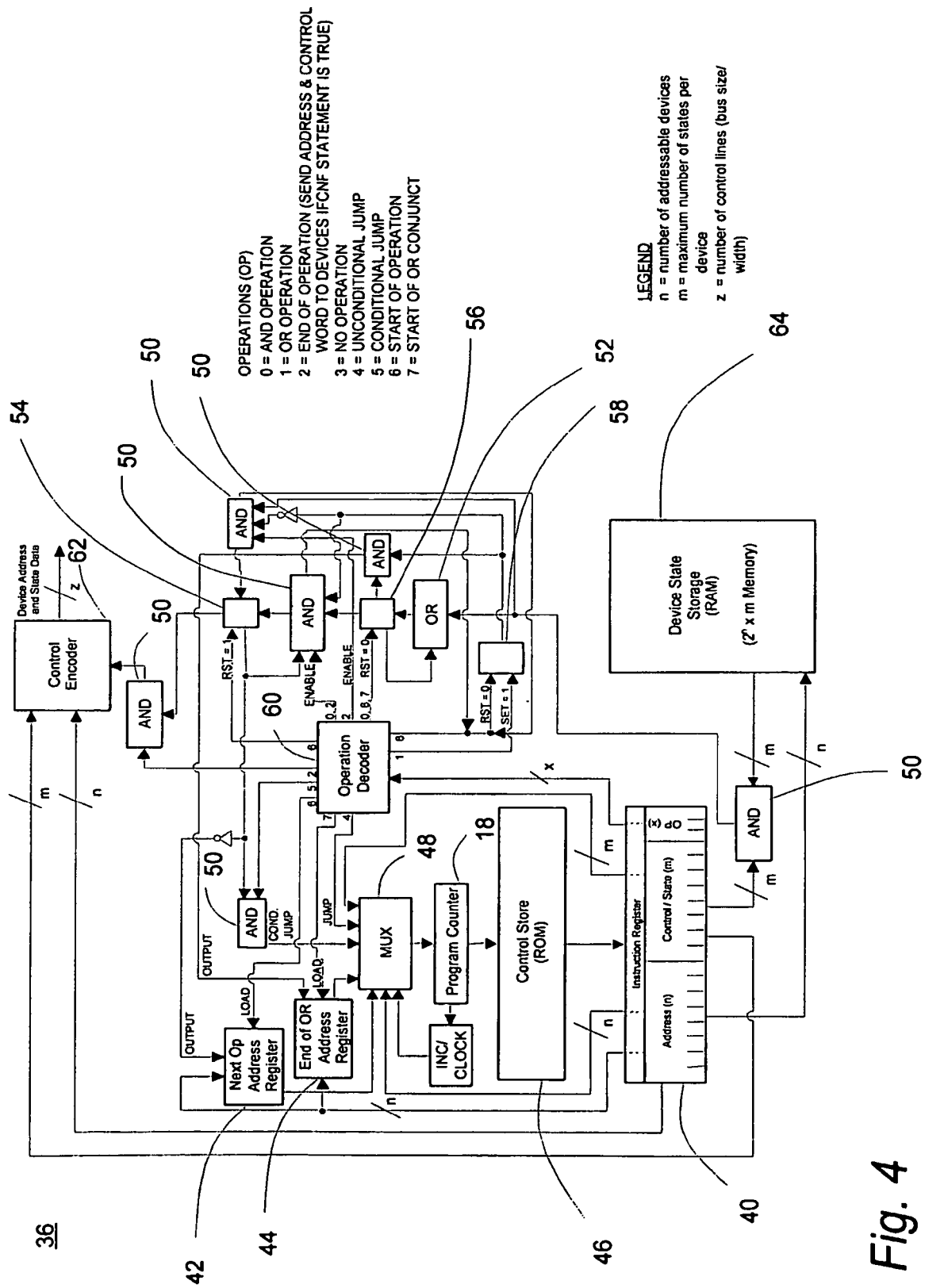
FIG. 4 is a schematic diagram of a CNF embodiment of the architecture of the Boolean processor of the present invention.

The architecture of a CNF Boolean processor 36 is illustrated in FIG. 4. For the purposes of describing the architecture of the CNF Boolean processor 36, 8-bit device addressing and 8-bit control words are used. This results in the architecture of the CNF Boolean processor 36 supporting 256 devices, each device having 256 possible states. Optionally, the architecture of the CNF Boolean processor 36 can be scaled to accommodate 2" devices, each device having 2 m possible states, where n and m are the number of device address bits and the number of possible states for each device, respectively. The defining feature of the architecture of the CNF Boolean processor 36 is its set of registers, or lack thereof. In contrast to conventional microprocessors and microcontrollers, which can have a plurality of registers (typically from 8 to 64 bits wide), the CNF Boolean processor 36 has only six registers. Of the six registers, the instruction register 40, the next operation address register 42, and the end of OR address register 44 are the only registers which are generally required to be multi-bit registers. The remaining three registers 54, 56, 58 hold AND truth states, OR truth states, and an indicator for conjuncts containing OR clauses. Each of these registers 54, 56, 58 may be only a single bit in size, although additional bits may be included if desired.

The CNF Boolean processor 36 includes the instruction register 40, which is an n+m+x-bit wide register containing an n-bit address, an m-bit control/state word, and an x-bit operational code. Using 8-bit device addressing, 8-bit control words, and 3-bit operational codes, the instruction register 40 is 19 bits wide. The CNF Boolean processor 36 also includes a control store (ROM) 46, which is used to hold a compiled micro-program, including (n+m+x)-bit instructions. The CNF Boolean processor 36 further includes the program counter 18, which is used for fetching the next instruction from the control store 46. The CNF Boolean processor 36 further includes a memory (MUX) 48, which is used to configure the program counter 18 for normal operation, conditional jump operation, unconditional jump operation, and Boolean short-circuit operation. Six AND gates 50 and one OR gate 52 are used to pass operation results and a plurality of signals that are operational code dependent.

The AND register 54 is used to roll up the results of the conjuncts. If the AND register 54 is one bit in size, then the default value of the AND register 54 is one and it initializes to a value of one after a start of operational code. The 1-bit AND register 54 remains at a value of one if all of the conjuncts in the Boolean expression being evaluated are true. If this bit is set to zero at any time during the evaluation, the entire CNF operation is false. In such a case, the remainder of the operation may be short-circuited and the evaluation of the next operation can begin. It should be apparent, however, that the AND register 54 may be modified such that one or more alternative values may be used to initialize the register 54 and represent a "true" value. The same applies to a "false" value as well, where any of another set of values (provided that the selected value is different from the one(s) used to represent a "true" value) may be used to represent a "false" value.

The OR register 56 is used to roll up the results of each of the individual conjuncts. If the OR register 56 is one bit in size, then it initializes to a value of zero and remains in that state until a state in a conjunct evaluates to one. The OR conjunct register 58 is used to indicate that the evaluation of a conjunct containing OR clauses has begun. It initializes to a value of zero and remains in that state until an OR operation sets its value to zero. It should be apparent, however, that the OR register 56 may be modified such that one or more alternative values may be used to initialize the register 56 and represent a "false" value. The same applies to a "true" value as well, where any of another set of values (provided that the selected value is different from the one(s) used to represent a "false" value) may be used to represent a "true" value. Finally, if the OR conjunct register 58 is one bit in size, then it initializes to a value of zero and remains in that state until an OR operation sets its value to one. In the event that the 1-bit OR conjunct register 58 is set to one and the 1-bit OR register 56 is set to one, the entire conjunct evaluates to true and short-circuits to the start of the next conjunct.

The CNF Boolean processor 36 further includes an operation decoder 60, which deciphers each operational code and controls the units that are dependent upon each operational code. In an embodiment preferred for its simplicity, the operational codes are 3 bits in length, and the functions of the operation decoder 60 by operational code include: Boolean AND (Op Code 0), Boolean OR (Op Code 1), End of Operation (Op Code 2), No Operation (Op Code 3), Unconditional Jump (Op Code 4), Conditional Jump (Op Code 5), Start of Operation (Op Code 6), and Start of Conjunct (Op Code 7). However, it will be apparent that the inclusion of one or more additional bits in the instruction register 40 would permit additional operational codes to be offered, and that the removal of a bit would reduce the number of operational codes offered, if either such design were to be desired.

A control encoder 62 accepts n+m bits in parallel (representing a device address and control word) and outputs them across a device bus (control lines) either serially or in parallel, depending upon the architecture of the given device bus. The next operation address register 42 stores the address used for Boolean short-circuiting. Short-circuiting occurs as soon as a conjunct evaluates to false. In such a case, the address is the address of the next operation. The end of OR address register 44 stores the address of the instruction immediately following a conjunct containing OR clauses. It is used for the short-circuiting of conjuncts that contain OR clauses. The CNF Boolean processor 36 further includes a device state storage (RAM) 64, which is responsible for storing the states of the devices that the CNF Boolean processor 36 monitors and/or controls. It has $2^n$ addresses, each of which are m-bits wide, where n is the address width and m is the control/state word width, in bits.

The CNF Boolean processor 36 evaluates micro-programs and controls its environment based upon the results of the above-described evaluations. The micro-programs define the actions to be taken by devices in the event that given Boolean tests evaluate to true. The CNF Boolean processor 36 works on the principle that the devices will be controlled based upon their states and the states of other devices, or after some period of time has elapsed. In order to evaluate a micro-program, conditional tests must be compiled into CNF.

The CNF Boolean processor 36 performs eight functions, as specified by operational code. Op Code 0—(Boolean AND) enables the AND gate 50 that loads the AND register 54 in the event that the conditional state of the device at the address in the instruction register 40 equals the state being tested in the instruction register 40. The Boolean AND instruction serves two purposes. First, the instruction is used to rollup results between OR conjuncts. This is accomplished by comparing a "zero" value to the value in location 0, which always results in a "false" evaluation. Secondly, the instruction may be used to evaluate stand-alone conjuncts, in which case a value is being compared to a device state. Op Code 1—(Boolean OR) sets the value of the OR conjunct register 58 to one, which enables short-circuiting within a conjunct containing OR clauses. Op Code 2—(End of Operation) enables the AND gate 50 that AND's the value of the OR register 56 with the value of the AND register 54. If the AND register 54 evaluates to a value of one, the control encoder 62 is enabled and the address and control word specified in the end of operation code is sent to the proper device. Op Code 3—(No Operation) does nothing. Op Code 4—(Unconditional Jump) allows the MUX 48 to receive an address from an address portion of the instruction register 40 and causes an immediate jump to the instruction at that address. Op Code 5—(Conditional Jump) provides that if the AND register 54 has a value of one, the test condition is met and the MUX 48 is enabled to receive the "jump to" address from the address portion of the instruction register 40. Op Code 6—(Start of Operation) provides the address of the line following the end of operation line for the current operation. This address is used to short-circuit the expression and keep the CNF Boolean processor 36 from having to evaluate the entire CNF expression in the event that one of the conjuncts evaluates to zero. In addition to loading the next operation address into the next operation address register 42, this operation also sets the AND register 54 to one, the OR register 56 to zero and the OR conjunct register 58 to zero. Op Code 7—(Start of OR Conjunct) provides the address of the line immediately following the conjunct and loads it into the end of OR address register 44. This address is used to provide short-circuiting out of a given conjunct in the event that one of the conjunct's terms evaluates to one.

The evaluation of a CNF expression begins with Start of Operation (Op Code 6) and proceeds to the evaluation of a conjunct. A conjunct may be either a stand-alone term (evaluated as an AND operation) or a conjunct containing OR clauses. In the latter case, each term of the conjunct is evaluated as part of an OR operation (Op Code 1). Each of these operations represents a test to determine if the state of a given device is equal to the state value specified in the corresponding AND or OR instruction. If the term evaluates to true, the OR-bit is set to a value of one. Otherwise, the OR-bit is set to a value of zero. In the case of a stand-alone term, this value automatically rolls up to the AND register 54. In conjuncts containing OR clauses, the result of each OR operation is OR'd with the current value of the OR register 56. This ensures that a true term anywhere in the conjunct produces a final value of true for the entire conjunct evaluation. In the event that the OR register 56 has a value of one and the OR conjunct register 58 is set to one, the conjunct will evaluate to true and may be short-circuited to the next conjunct. Next, the CNF Boolean processor 36 prepares for subsequent conjuncts (if any additional conjuncts exist). At this point, an AND operation (Op Code 0) joins the conjuncts and the value of the OR register 56 is rolled up to the AND register 54 by having the value of the OR register 56 AND'd with the value of the AND register 54. In the event that the OR-bit has a value of zero when the AND operation is processed, the AND-bit will change to a value of zero. Otherwise, the AND-bit's value will remain at one. If the AND-bit has a value of one, the next conjunct is evaluated. If the AND-bit has a value of zero, the final value of the CNF expression is false, regardless of the evaluation of any additional conjuncts. At this point, the remainder of the expression may be short-circuited and the next CNF expression can be evaluated.

Preferably, the CNF Boolean processor 36 requires that functions be compiled in CNF. A micro-code compiler builds the micro-instructions such that they follow a CNF logic. The logic statements for CNF Boolean processor programs are nothing more than IF-THEN-ELSE statements. For example: IF (Device A has State Ax), THEN (Set Device B to State By), ELSE (Set Device C to State Cz). The logic of the IF expression must be compiled into CNF. The expression must also be expanded into a set of expressions AND'd together, and AND'd with a pre-set value of "true". For the CNF operation, the pre-set value of "true" is the initial value of the AND register 54 at the start of each logical IF operation. The above IF-THEN-ELSE statement would result in the following micro-code logic: [(Device A has State Ax) A "true"]; if the AND statement is "true", then (SET Device B to State By); and if the AND statement is "false", then (SET Device C to State Cz).

The following are examples of how some common operations would be compiled to work with the architecture of the CNF Boolean processor 36. It should be noted that the Start of Operation Instruction (Op Code 6), as well as the Start of Conjunct Instruction (Op Code 7), have been omitted since ROM addresses are not listed in the examples. The notation in the following examples is of the form: DevX=Y, where X represents the device address and Y represents the current state of the device.

EXAMPLE 1

If (Dev1=8 or Dev2=0) and (Dev3=10 or Dev2=0) and (Dev4=1 or Dev2=0) then Dev9=20
 If (Dev1=8 or Dev2=0) and (Dev3=10 or Dev2=0) and (Dev4=1 or Dev2=0) then Dev9=20

| Sequence # | Micro-code Value of Instruction Register | Operation |
| --- | --- | --- |
| 1 | 00000001 00001000 001 | OR |
| 2 | 00000010 00000000 001 | OR |
| 3 | 00000000 00000000 000 | AND |

-continued

| Sequence # | Micro-code Value of Instruction Register | Operation |
|---|---|---|
| 4 | 00000011 00001010 001 | OR |
| 5 | 00000010 00000000 001 | OR |
| 6 | 00000000 00000000 000 | AND |
| 7 | 00000100 00000001 001 | OR |
| 8 | 00000010 00000000 001 | OR |
| 9 | 00001001 00010100 010 | End of Operation |

EXAMPLE 2

| Sequence # | Micro-code Value of Instruction Register | Operation |
|---|---|---|
| 1 | 00000111 00010110 001 | OR |
| 2 | 00000000 00000000 000 | AND |
| 3 | 00000000 11001000 101 | Conditional Jump |
| 4 | 00000000 01100100 100 | Unconditional Jump |

As illustrated in FIG. 4, the next operation address register 42 and the end of OR address register 44 may be loaded with values from the n-bit "address" portion of the instruction register 40. As described previously, these values specify the addresses of lines of code within the micro-program that are jumped to when performing short circuit operations. However, this design limits the number of micro-program lines (or micro-program addresses) that can be accessed by the next operation address register 42 and the end of OR address register 44 to $2^n$, where n is the width, in bits, of the address portion of the instruction register 40.

In order to expand the micro-program address values that can be stored in the next operation address register 42 and the end of OR address register 44, the architecture may be modified to use the bits from both the address and control/state portions of the instruction register 40 when loading the next operation address register 42 and the end of OR address register 44 with the values of micro-program addresses. This would expand the number of micro-program lines (or micro-program addresses) that can be accessed by the next operation address register 42 and the end of OR address register 44 to $2^{n+m}$, where n is the width, in bits, of the address portion of the instruction register 40 and m is the width, in bits, of the control/state portion of the instruction register 40. This approach would require the "control/state" portion of the instruction register 40 to be connected directly to the address registers 42, 44 in addition to the MUX 48.

Another solution for expanding the range of micro-program address values that may be used is to modify the control store portion of the architecture to include discrete "jump to" addresses that would only be utilized on instructions that are capable of being jumped to. While the limit on the number of instructions that may be jumped to would remain the same in this case, the inclusion of discrete jump to addresses would permit the "jump to" addresses to be dispersed throughout the entire micro-program, as opposed to being limited to the first $2^n$ instructions, where n is the width, in bits, of the address portion of the instruction register 40. In order to utilize this approach, the control store 46 may include a secondary addressing scheme to associate "jump to" addresses to widely dispersed primary physical address locations in the store. Primary addressing in the control store 46 would still need to be maintained for use by the program counter 18 and also for updating the program counter 18 when a location is "jumped to." For example, a word in the control store 46 could have a primary physical address of 10 and a secondary "jump to" address of 1. If the state of the processor 36 dictates a jump to "jump to" address 1, then the program counter 18 would need to be updated to 10, or the actual primary physical address of "jump to" address 1. The previously mentioned solution, however, in which the address and control/state portions of the instruction register 40 are utilized, is the preferred solution.

A distinct characteristic of the CNF Boolean processor 36 is the type of expressions it is designed to evaluate; namely expressions in CNF. Optionally, using a similar register design, a DNF-based architecture can also be implemented, as described herein below. However, the architecture of the CNF Boolean processor 36 focuses on CNF, providing the fastest and most scalable design.

Figure 5:
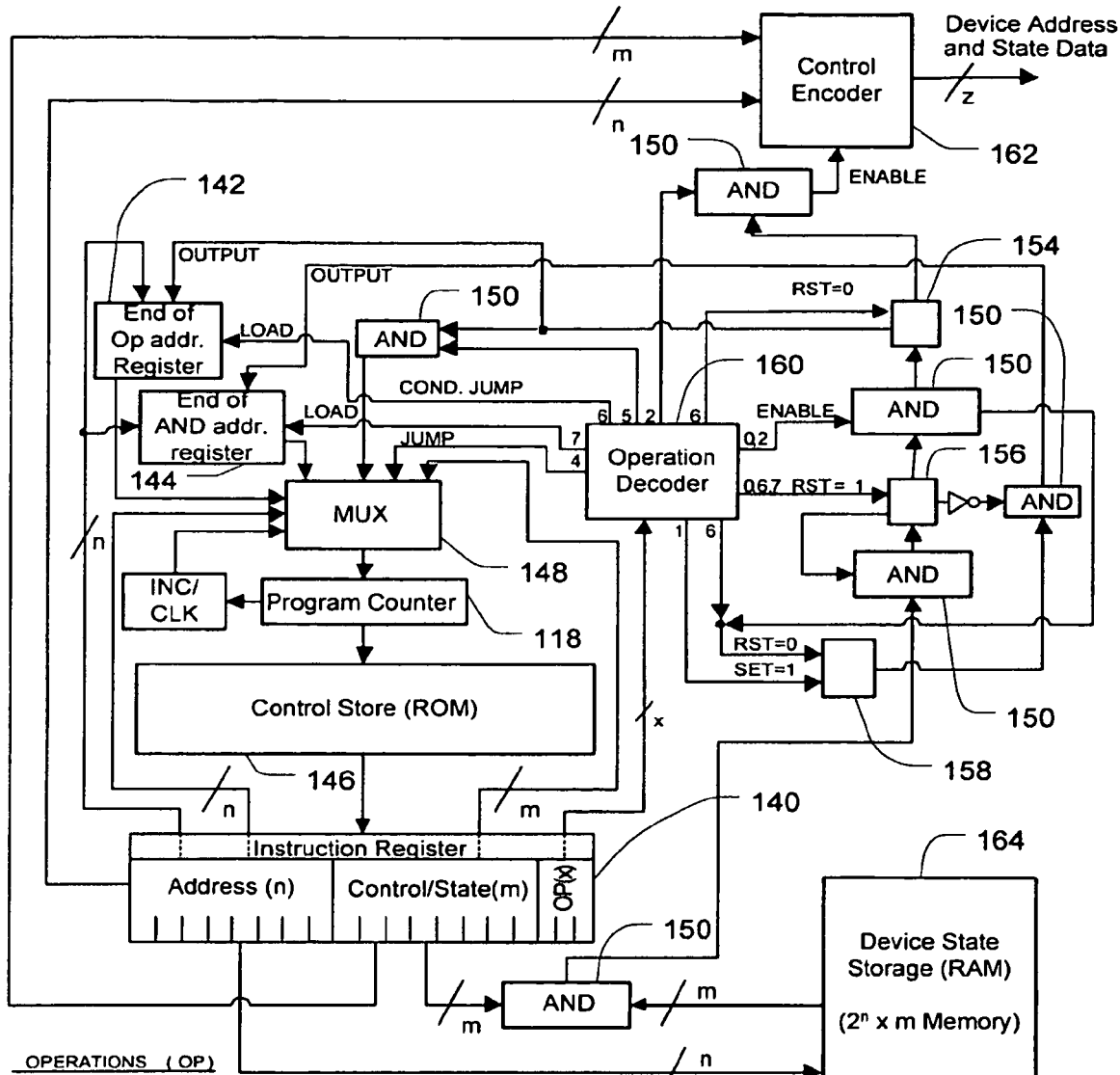
FIG. 5 is a schematic diagram of a DNF embodiment of the architecture of the Boolean processor of the present invention.

The architecture of the DNF Boolean processor 136 is illustrated in FIG. 5. For the purposes of describing the architecture of the DNF Boolean processor 136, 8-bit device addressing and 8-bit control words are used. This results in the architecture of the DNF Boolean processor 136 supporting 256 devices, each device having 256 possible states. Optionally, the architecture of the DNF Boolean processor 136 can be scaled to accommodate $2^n$ devices, each device having $2^m$ possible states, where n and m are the number of device address bits and the number of possible states for each device, respectively. The defining feature of the architecture of the DNF Boolean processor 136 is its set of registers, or lack thereof. In contrast to conventional microprocessors and microcontrollers, which can have a plurality of registers (typically from 8 to 64 bits wide), the DNF Boolean processor 136 has only six registers. Of the six registers, the instruction register 140, the end of operation address register 142, and the end of AND address register 144 are the only registers which are generally required to be multi-bit registers. The remaining three registers 154, 156, 158 hold AND truth states, OR truth states, and an indicator for disjuncts containing AND clauses. Each of these registers 154, 156, 158 may be only a single bit in size, although additional bits may be included if desired.

The DNF Boolean processor 136 includes the instruction register 140, which is an n+m+x-bit wide register containing an n-bit address, an m-bit control/state word, and an x-bit operational code. Using 8-bit device addressing, 8-bit control words, and 3-bit operational codes, the instruction register 140 is 19 bits wide. The DNF Boolean processor 136 also includes a control store (ROM) 146, which is used to hold a compiled micro-program, including (n+m+x)-bit instructions. The DNF Boolean processor 136 further includes the program counter 118, which is used for fetching the next instruction from the control store 146. The DNF Boolean processor 136 further includes a memory (MUX) 148, which is used to configure the program counter 118 for normal operation, conditional jump operation, unconditional jump operation, and Boolean short-circuit operation. Six AND gates 150 are used to pass operation results and a plurality of signals that are operational code dependent.

The OR register 154 is used to roll up the results of the disjuncts. If the OR register 154 is one bit in size, then the default value of the OR register 154 is zero and it initializes to a value of zero after a start of operational code. The 1-bit OR register 154 remains at a value of zero if all of the disjuncts in the Boolean expression being evaluated are false. If this bit is set to one at any time during the evaluation, the entire DNF operation is true. In such a case, the remainder of the operation may be short-circuited and the control operation that occurs as the result of a true evaluation can be executed. It should be apparent, however, that the OR register 154 may be modified such that one or more alternative values may be used to initialize the register 54 and represent a "false" value. The same applies to a "true" value as well, where any of another set of values (provided that the selected value is different from the one(s) used to represent a "false" value) may be used to represent a "true" value.

The AND register 156 is used to roll up the results of each of the individual disjuncts. If the AND register 156 is one bit in size, then it initializes to a value of one and remains in that state until a state in a disjunct evaluates to false. The AND disjunct register 158 is used to indicate that the evaluation of a disjunct containing AND clauses has begun. It initializes to a value of zero and remains in that state until an AND operation sets its value to one. It should be apparent, however, that the AND register 156 may be modified such that one or more alternative values may be used to initialize the register 156 and represent a "true" value. The same applies to a "false" value as well, where any of another set of values (provided that the selected value is different from the one(s) used to represent a "true" value) may be used to represent a "false" value. Finally, if the AND disjunct register 158 is one bit in size, then it initializes to a value of zero and remains in that state until an AND operation sets its value to one. In the event that the 1-bit AND disjunct register 158 is set to one and the 1-bit AND register 156 is set to zero, the entire disjunct evaluates to false and short-circuits to the start of the next disjunct.

The DNF Boolean processor 136 further includes an operation decoder 160, which deciphers each operational code and controls the units that are dependent upon each operational code. In an embodiment preferred for its simplicity, the operational codes are 3 bits in length, and the functions of the operation decoder 60 by operational code include: Boolean OR (Op Code 0), Boolean AND (Op Code 1), End of Operation (Op Code 2), No Operation (Op Code 3), Unconditional Jump (Op Code 4), Conditional Jump (Op Code 5), Start of Operation (Op Code 6), and Start of AND Disjunct (Op Code 7). However, it will be apparent that the inclusion of one or more additional bits in the instruction register 140 would permit additional operational codes to be offered, and that the removal of a bit would reduce the number of operational codes offered, if either such design were to be desired.

A control encoder 162 accepts n+m bits in parallel (representing a device address and control word) and outputs them across a device bus (control lines) either serially or in parallel, depending upon the architecture of the given device bus. The end of operation address register 142 stores the address used for Boolean short-circuiting. Short-circuiting occurs as soon as a disjunct evaluates to true. In such a case, the address is the address of the final control portion of the expression which results in the event that the entire DNF expression is true. The end of AND address register 144 stores the address of the instruction immediately following a disjunct containing AND clauses. It is used for the short-circuiting of disjuncts that contain AND clauses. The DNF Boolean processor 136 further includes a device state storage (RAM) 164, which is responsible for storing the states of the devices that the DNF Boolean processor 136 monitors and/or controls. It has $2^n$ addresses, each of which are m-bits wide, where n is the address width and m is the control/state word width, in bits.

The DNF Boolean processor 136 evaluates micro-programs and controls its environment based upon the results of the above-described evaluations. The micro-programs define the actions to be taken by devices in the event that the given Boolean tests evaluate to true. The DNF Boolean processor 136 works on the principle that the devices will be controlled based upon their states and the states of other devices, or after some period of time has elapsed. In order to evaluate a micro-program, conditional tests must be compiled into Boolean Disjunctive Normal Form (DNF).

The DNF Boolean processor 136 performs eight functions, as specified by operational code. Op Code 0—(Boolean OR) enables the AND gate 150 that loads the OR register 154 in the event that the conditional state of the device at the address in the instruction register 140 equals the state being tested in the instruction register 140. The Boolean OR instruction serves two purposes. First, the instruction is used to rollup results between AND disjuncts. This is accomplished by comparing a "zero" value to the value in location 0, which always results in a "true" evaluation. Secondly, the instruction may be used to evaluate stand-alone disjuncts, in which case a value is being compared to a device state. Op Code 1—(Boolean AND) sets the value of the AND disjunct register 158 to one, which enables short-circuiting within a disjunct containing AND clauses. Op Code 2—(End of Operation) enables the AND gate 150 that passes the value of the AND register 156 to the OR register 154. If the OR register 154 ever evaluates to a value of one, the program is short-circuited to the end of operation instruction (the control operation that executes in the event of a true evaluation) and the control encoder 162 is enabled and the address and control word specified in the end of operation code is sent to the proper device. Op Code 3—(No Operation) does nothing. Op Code 4—(Unconditional Jump) allows the MUX 148 to receive an address from the address portion of the instruction register 140 and causes an immediate jump to the instruction at that address. Op Code 5—(Conditional Jump) provides that if the OR register 154 has a value of one, the test condition is met and the MUX 148 is enabled to receive the "jump to" address from the address portion of the instruction register 140. Op Code 6—(Start of Operation) provides the address of the end of operation line for the current operation. This address is used to short-circuit the expression and keep the DNF Boolean processor 136 from having to evaluate the entire DNF expression in the event that one of the disjuncts evaluates to one. In addition to loading the end of AND address into the end of AND address register 144, this operation also sets the OR register 154 to zero, the AND register 156 to one and the AND disjunct register 158 to zero. Op Code 7—(Start of AND Disjunct) provides the address of the line immediately following the disjunct and loads it into the end of AND address register 144. This address is used to provide short-circuiting out of a given disjunct in the event that one of the disjunct's terms evaluates to zero.

The evaluation of a DNF expression begins with Start of Operation (Op Code 6) and proceeds to the evaluation of a disjunct. A disjunct may be either a stand-alone term (evaluated as an OR operation) or a disjunct containing AND clauses. In the latter case, each term of the disjunct is evaluated as part of an AND operation (Op Code 1). Each of these operations represents a test to determine if the state of a given device is equal to the state value specified in the corresponding OR or AND instruction. If the term evaluates to false, the AND-bit is set to a value of zero. Otherwise, the AND-bit is set to a value of one. In the case of a stand-alone term, this value automatically rolls up to the OR register 154. In disjuncts containing AND clauses, the result of each AND operation is AND'd with the current value of the AND register 156. This ensures that a false term anywhere in the disjunct produces a final value of false for the entire disjunct evaluation. In the event that the AND register 156 has a value of zero and the AND disjunct register 158 is set to one, the disjunct will evaluate to false and may be short-circuited to the next disjunct. Next, the DNF Boolean processor 136 prepares for subsequent disjuncts (if any additional disjuncts exist). At this point, an OR operation (Op Code 0) joins the disjuncts and the value of the AND register 156 is rolled up to the OR register 154 by having the value of the AND register 156 passed through to the OR register 154. In the event that the AND-bit has a value of one when the OR operation is processed, the OR-bit will change to a value of one. Otherwise, the OR-bit's value will remain at zero. If the OR-bit has a value of zero, the next disjunct is evaluated. If the OR-bit has a value of one, the final value of the DNF expression is true, regardless of the evaluation of any additional disjuncts. At this point, the remainder of the expression may be short-circuited and the end of operation instruction may be executed.

Preferably, the DNF Boolean processor 136 requires that functions be compiled in DNF. A micro-code compiler builds the micro-instructions such that they follow a DNF logic. The logic statements for DNF Boolean processor programs are nothing more than IF-THEN-ELSE statements. For example: IF (Device A has State Ax), THEN (Set Device B to State By), ELSE (Set Device C to State Cz). The logic of the IF expression must be compiled into DNF. The expression must also be expanded into a set of expressions OR'd together, and OR'd with a pre-set value of "false". For the DNF operation, the pre-set value of "false" is the initial value of the OR register 154 at the start of each logical IF operation. The above IF-THEN-ELSE statement would result in the following micro-code logic: [(Device A has State Ax) v "false"]; if the OR statement is "true", then (SET Device B to State By); and if the OR statement is "false", then (SET Device C to State Cz).

The following are examples of how some common operations would be compiled to work with the architecture of the DNF Boolean processor 136. It should be noted that the Start of Operation Instruction (Op Code 6), as well as the Start of Disjunct Instruction (Op Code 7), have been omitted since ROM addresses are not listed in the examples. The notation in the following examples is of the form: DevX=Y, where X represents the-device address and Y represents the current state of the device.

EXAMPLE 3

If (Dev1=8 and Dev2=0 or (Dev3=10 and Dev2=0) then Dev9=20

| Sequence # | Micro-code Value of Instruction Register | Operation |
| --- | --- | --- |
| 1 | 00000001 00001000 001 | AND |
| 2 | 00000010 00000000 001 | AND |
| 3 | 00000000 00000000 000 | OR |
| 4 | 00000011 00001010 001 | AND |
| 5 | 00000010 00000000 001 | AND |
| 6 | 00001001 00010100 010 | End of Operation |

EXAMPLE 4

If Dev7=22 goto 200
Else goto 100

| Sequence # | Micro-code Value of Instruction Register | Operation |
| --- | --- | --- |
| 1 | 00000111 00010110 001 | AND |
| 2 | 00000000 00000000 000 | OR |

-continued

| Sequence # | Micro-code Value of Instruction Register | Operation |
| --- | --- | --- |
| 3 | 00000000 11001000 101 | Conditional Jump |
| 4 | 00000000 01100100 100 | Unconditional Jump |

Once again, as illustrated in FIG. 5, the end of operation address register 142 and the end of AND address register 144 may be loaded with values from the n-bit "address" portion of the instruction register 140. However, in order to expand the micro-program address values that can be stored in the end of operation address register 142 and the end of AND address register 144, the architecture may be modified to use the bits from both the address and control/state portions of the instruction register 140 when loading the end of operation address register 142 and the end of AND address register 144 with the values of micro-program addresses. This approach would require the "control/state" portion of the instruction register 140 to be connected directly to the address registers 142, 144 in addition to the MUX 148. Further, as with the CNF Boolean processor 36, another solution is to modify the control store portion of the architecture to include discrete "jump to" addresses that would only be utilized on instructions that are capable of being jumped to, as described previously.

A distinct characteristic of the DNF Boolean processor 136 is the type of expressions it is designed to evaluate; namely expressions in DNF. It should be noted that the DNF Boolean processor 136 performs both inter and intra-term short-circuit evaluations, thereby providing maximum efficiency in processing expressions.

Upon initial inspection of the two forms, CNF and DNF, an individual might be inclined to believe that the short-circuit evaluation of DNF expressions has benefits over short-circuited CNF expressions because the terms are OR'd together and a positive result for any of the terms results in a completed evaluation. The same argument, in the false case, can be made for CNF evaluations. If any of the terms results in a false value, the entire evaluation is complete with a value of false. Additionally, CNF eliminates repeating terms, as shown in the following examples.

EXAMPLE 5

Conjunctive Normal Form

If Dev2=0 and (Dev1=8 or Dev3=10 or Dev4=1) then Dev9=20

| Sequence # | Micro-code Value of Instruction Register | Operation |
| --- | --- | --- |
| 1 | 00000010 00000000 000 | AND |
| 2 | 00000001 00001000 001 | OR |
| 3 | 00000011 00001010 001 | OR |
| 4 | 00000100 00000001 001 | OR |
| 5 | 00001001 00010100 010 | End of Operation |

EXAMPLE 6

Disjunctive Normal Form

If (Dev2=0 and Dev1=8) or (Dev2=0 and Dev3=10) or (Dev2=0 and Dev4=1) then Dev9=20

| Sequence # | Micro-code Value of Instruction Register | Operation |
|---|---|---|
| 1 | 00000010 00000000 000 | AND |
| 2 | 00000001 00001000 000 | AND |
| 3 | 00000000 00000000 001 | OR |
| 4 | 00000010 00000000 000 | AND |
| 5 | 00000011 00001010 000 | AND |

Notice, in the examples, that the testing of Dev2 is a single conjunct in the CNF expression and repeated in every disjunct in the DNF expression. This type of term is important as the outcomes of both the CNF and DNF expressions are almost fully dependent upon their values. These terms are referred to herein as "control states" or "control devices". Without a positive evaluation of a control state, any Boolean expression, whether in CNF or DNF, will evaluate to false. In the case of CNF, the false evaluation of a control state enables short-circuiting, and is what provides CNF with its advantage over DNF.

In the previous examples, CNF provides a savings of four instructions over DNF. DNF, however, has an advantage over CNF for a very small number of non-control, or "other" states (one or two). As the number of terms (both control and "other") grows, however, the short-circuiting of CNF expressions becomes a much more efficient means of evaluation.

Two types of short-circuiting exist in CNF and DNF operations, inter-term short-circuiting and intra-term short-circuiting. Inter-term short-circuiting causes the evaluation of an entire expression to evaluate to true, in the case of DNF, or false, in the case of CNF, if any term evaluates to true or false, respectively. Intra-term short-circuiting causes the evaluation of a conjunct or disjunct to terminate without full evaluation. In this instance, a CNF term, or conjunct, will evaluate to true if any of its sub-terms are true, while a DNF term, or disjunct, will evaluate to false if any of its sub-terms are false. Consider the following statements:

$$\text{CNF: If (A or B) and (C or D) then E} \qquad (7)$$

$$\text{DNF: If (A and B) or (C and D) then E} \qquad (8)$$

In the CNF statement, if A evaluates to true, the entire conjunct A or B evaluates to true. As a result, the evaluation of B is unnecessary and can be avoided using intra-term short-circuit evaluation. From an inter-term perspective, if the conjunct A or B evaluates to false, the entire CNF expression evaluates to false, making the evaluation of the conjunct C or D superfluous. In the case of DNF, both inter and intra-term short-circuit evaluation work similarly to that of CNF, except that the term values for DNF are the converse of those for CNF. It should be noted that the Boolean processors 36, 136 perform both inter and intra-term short-circuit evaluations, thereby providing maximum efficiency in processing expressions.

In examining the inter-term short-circuit evaluation of both CNF and DNF expressions, the following equations can be used to characterize the behavior of each:

$$\text{Avg. CNF Instructions} = ((ICS*CS)+(IOS*OS))*PCSD+(ICS*CS)*(1-PCSD)*FCSD \qquad (9)$$

$$\text{Avg. DNF Instructions} = ((ICS*CS)+IOS)*OS*(PCSD*POSD+(1-PCSD)) \qquad (10)$$

where: ICS=number of processor instructions required to process a control state; CS=number of control states; OS=other, or non-control, states; IOS=number of processor instructions required to process an "other" state; PCSD=positive control state distribution, the probability that all control states evaluate to true (e.g., a PCSD of 0.5 means that all of the control states evaluate to true in fifty percent of the expression evaluations); FCSD=false control state distribution, in the event that the control states evaluate to false, this number represents which of the control states caused the failure (e.g., a failure among 10 control states with an FCSD of 0.7 means the $7^{th}$ control state evaluated to false); POSD=positive "other" state distribution, the position within the expression that an "other" state evaluates to true (e.g., a POSD of 0.5 means the $5^{th}$ term of 10 evaluates to true).

The following charts represent the results of varying the number of control states and "other" states in the above-referenced equations. It should be noted that all control states are evaluated as soon as possible (i.e. moved as far left in the expression as possible). In this manner, the control states are the first conjuncts in CNF equations and the first terms in each disjunct of DNF equations. Additionally, in the case of DNF equations, each "other" state is combined with the control states to form a disjunct. This results in an equal number of "other" states and disjuncts. Data is generated using a CNFDNF emulation program and complementary CNF and DNF expression classes. A fixed number of control states is entered for each run of the program. The program then varies the number of "other" states from zero to one-thousand, for example. At each step, a random POSD (between 0 and 1) is used and averaged over one-million iterations.

Figure 6:
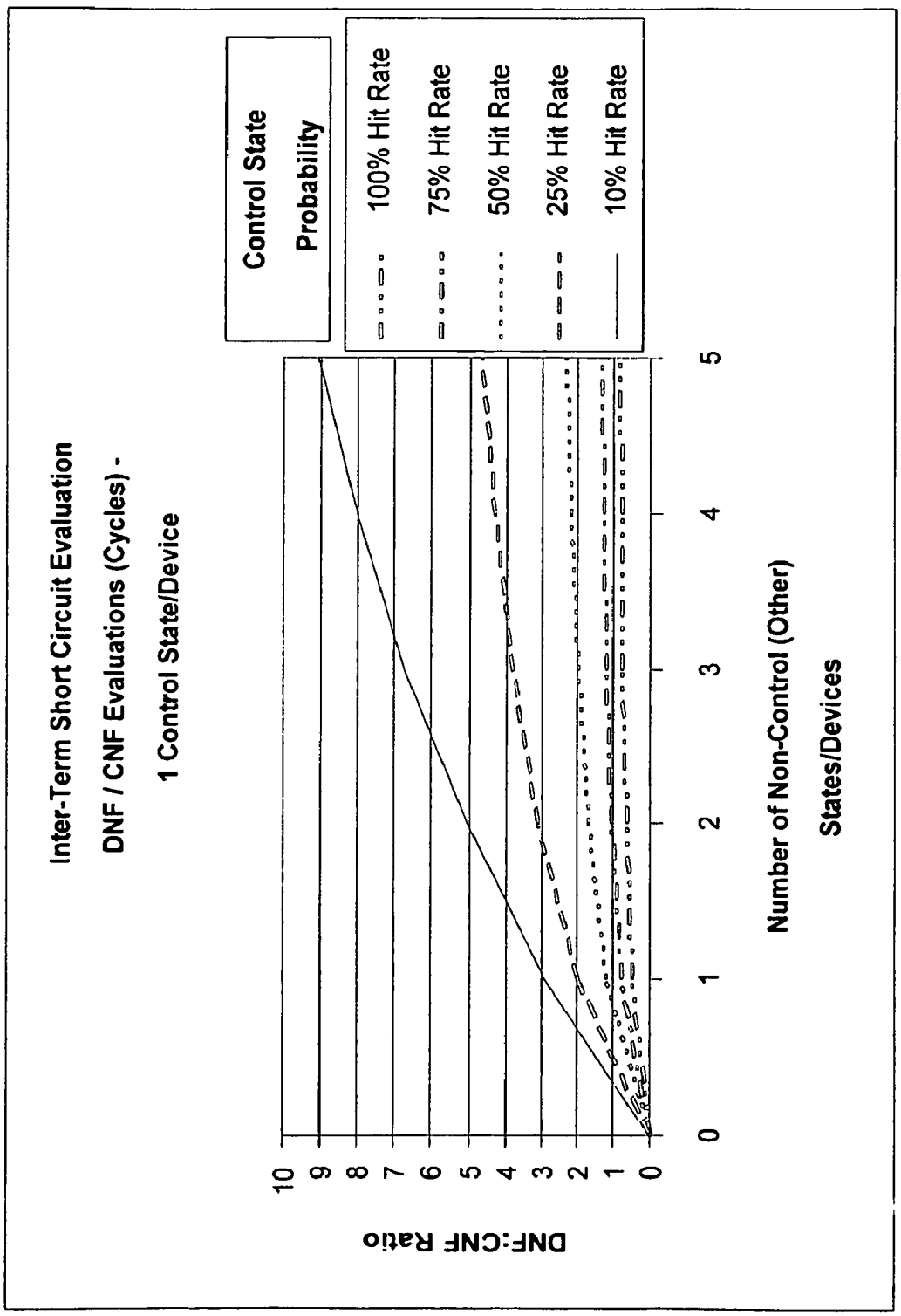
FIG. 6 is a graph of a DNF/CNF ratio using inter-term short-circuit evaluation, with 1 control state and a small number of "other" states.
Figure 7:
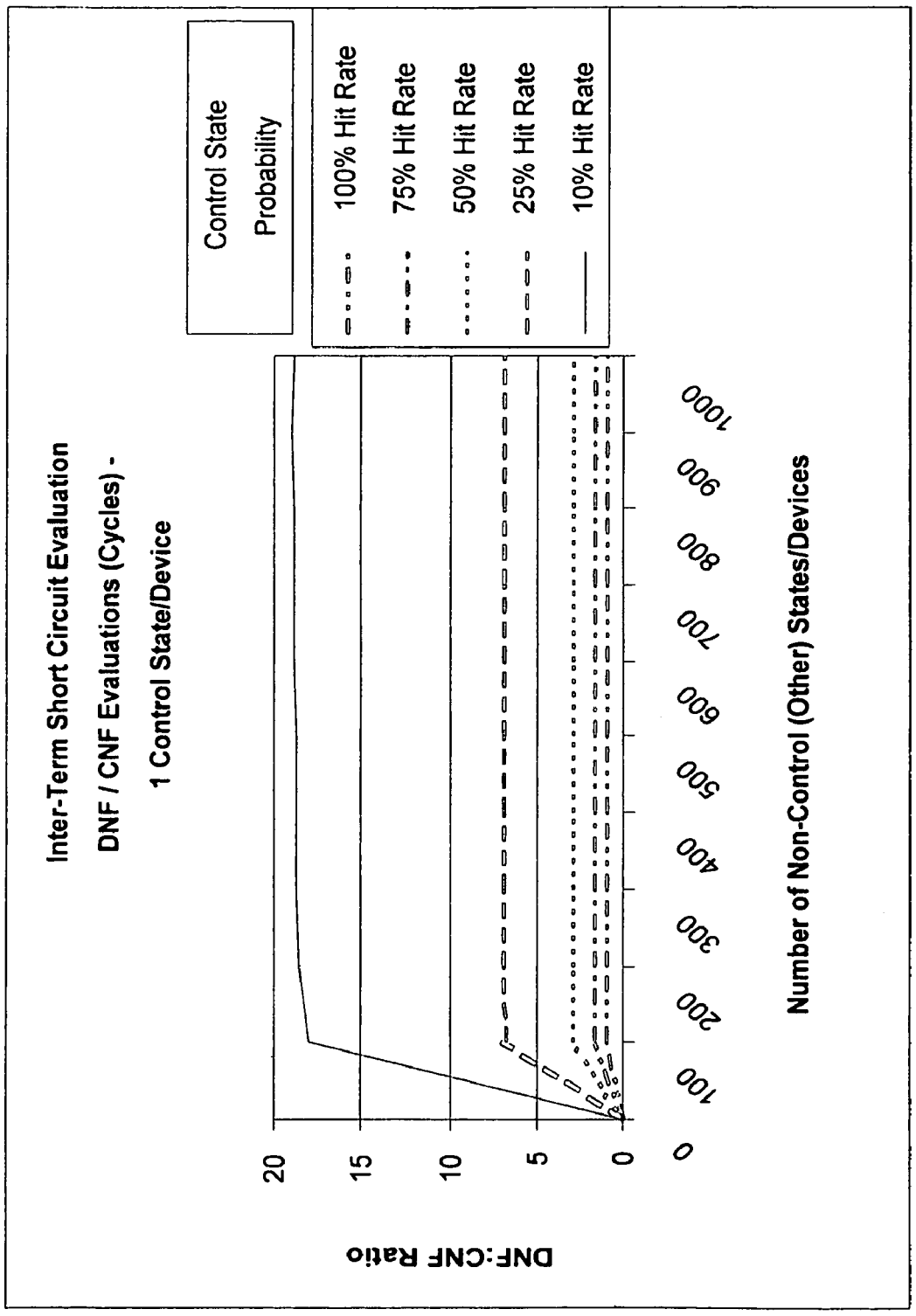
FIG. 7 is a graph of a DNF/CNF ratio using inter-term short-circuit evaluation, with 1 control state and a large number of "other" states.
Figure 8:
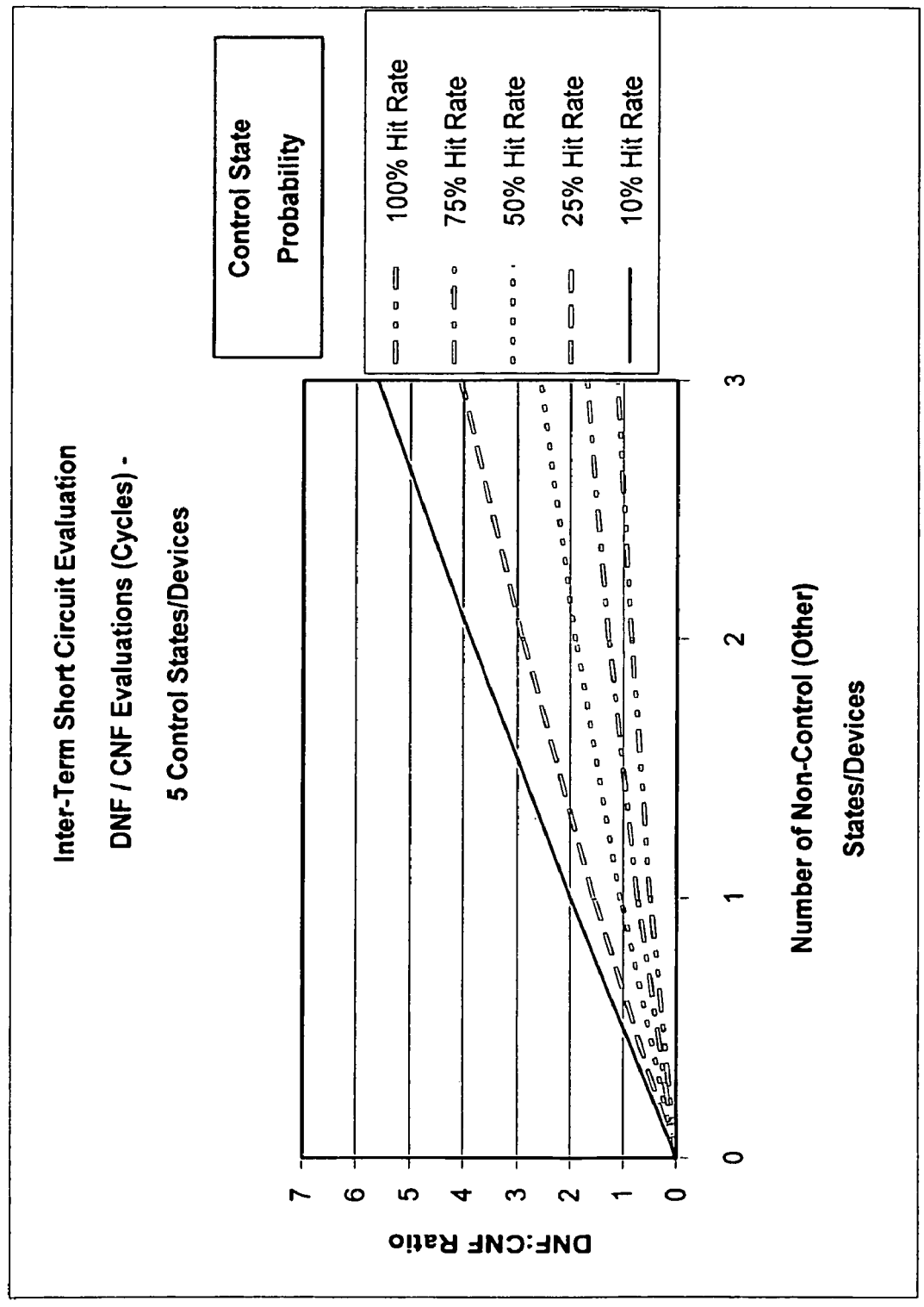
FIG. 8 is a graph of a DNF/CNF ratio using inter-term short-circuit evaluation, with 5 control states and a small number of "other" states.
Figure 9:
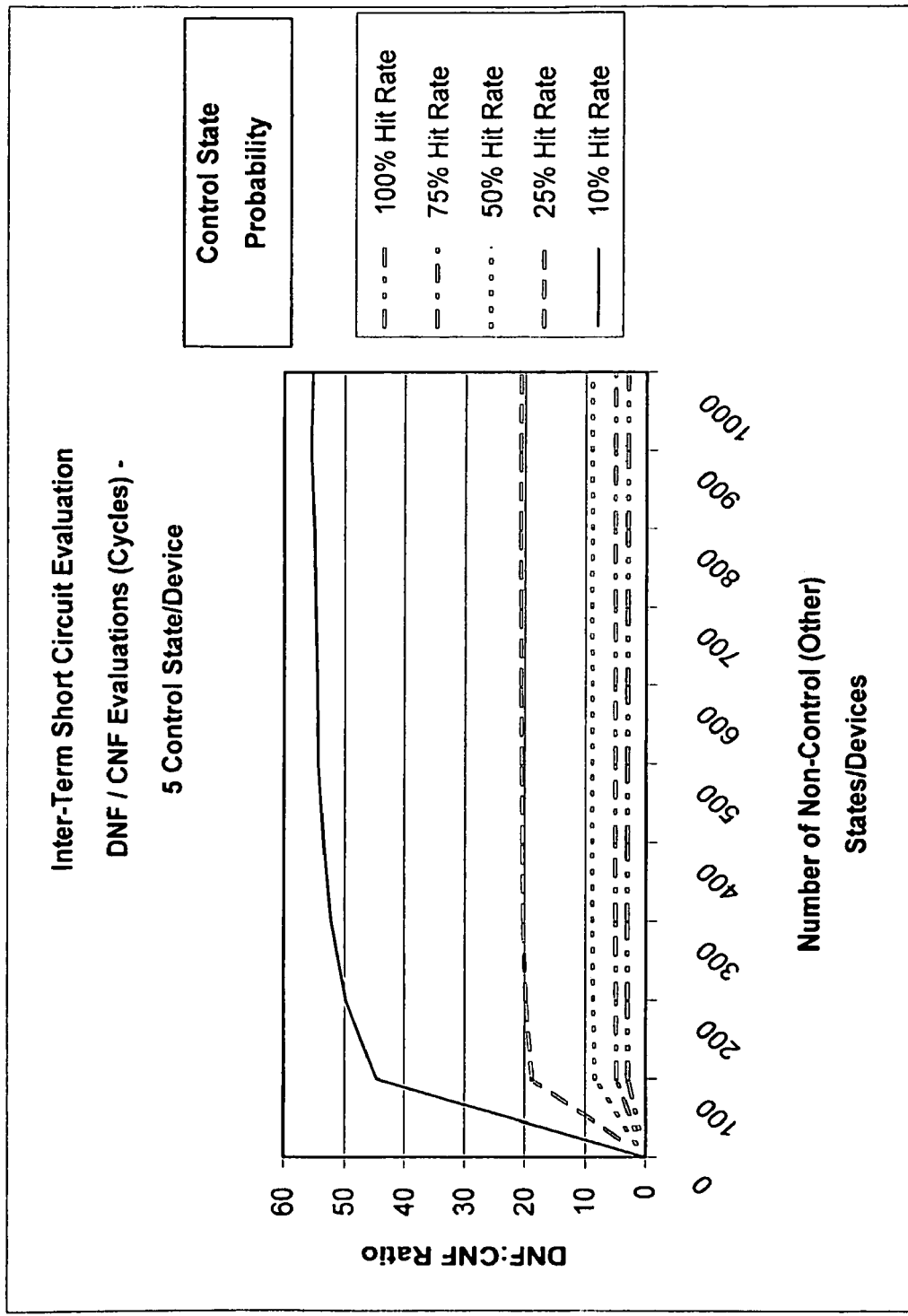
FIG. 9 is a graph of a DNF/CNF ratio using inter-term short-circuit evaluation, with 5 control states and a large number of "other" states.
Figure 10:
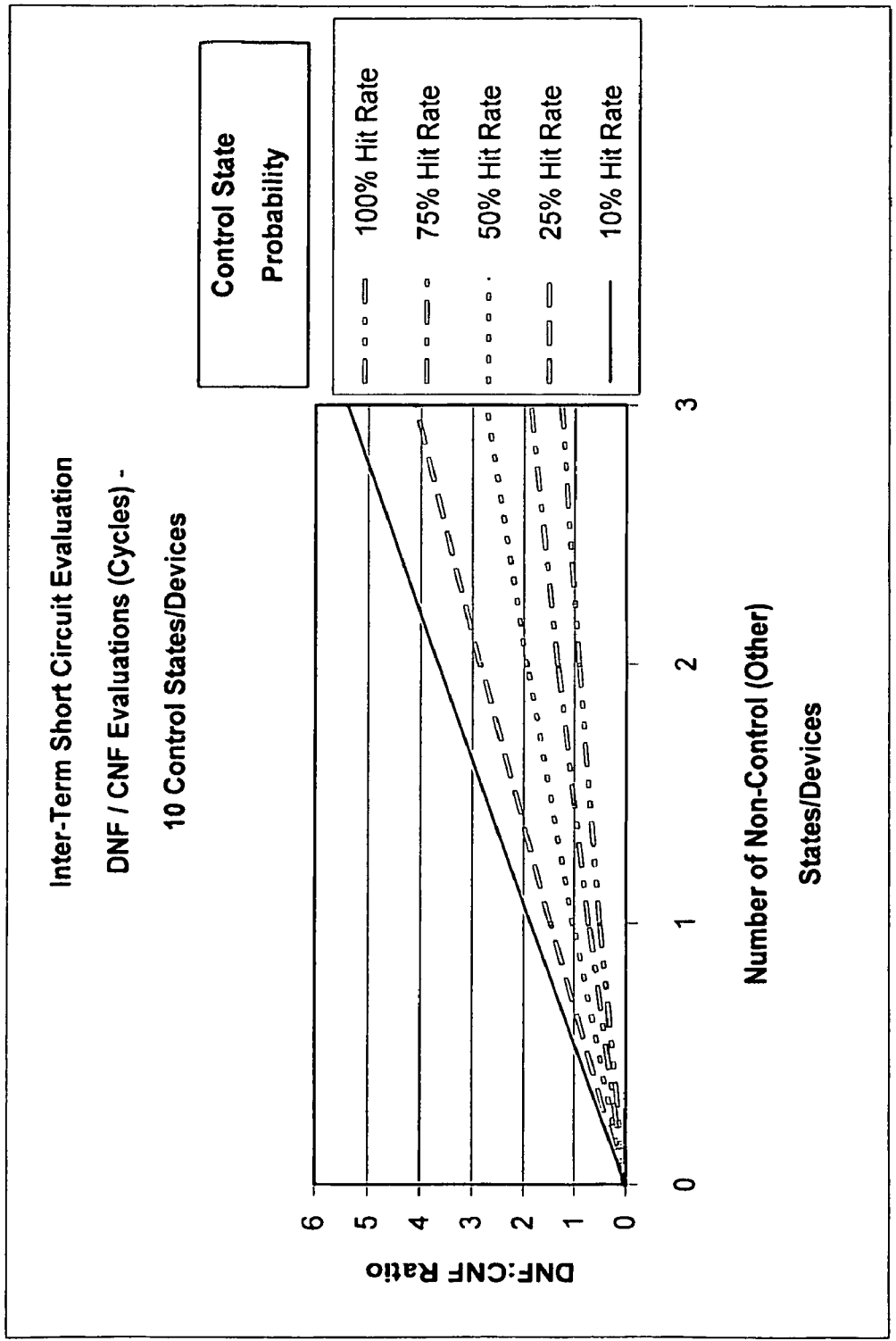
FIG. 10 is a graph of a DNF/CNF ratio using inter-term short-circuit evaluation, with 10 control states and a small number of "other" states.
Figure 11:
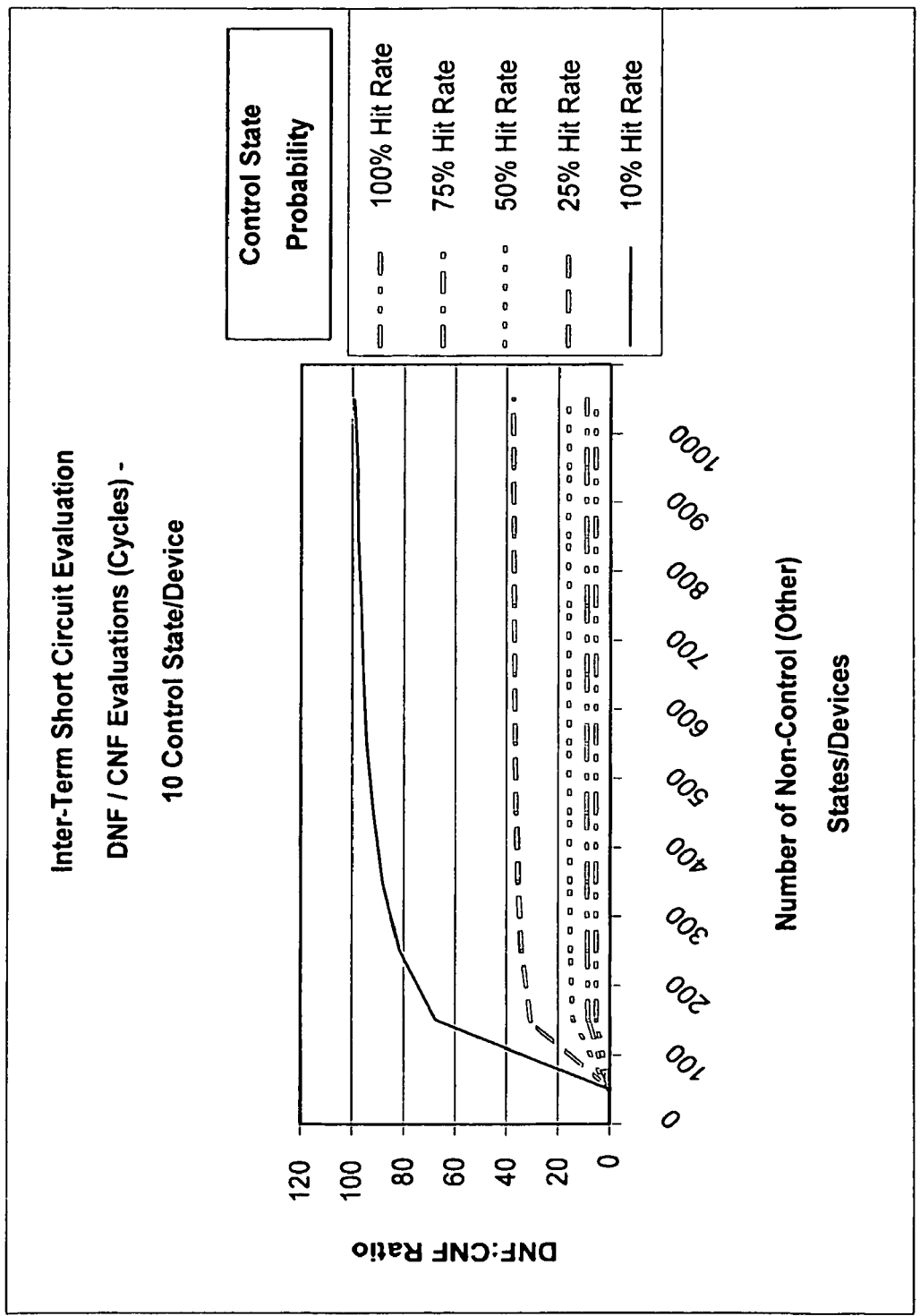
FIG. 11 is a graph of a DNF/CNF ratio using inter-term short-circuit evaluation, with 10 control states and a large number of "other" states.
Figure 12:
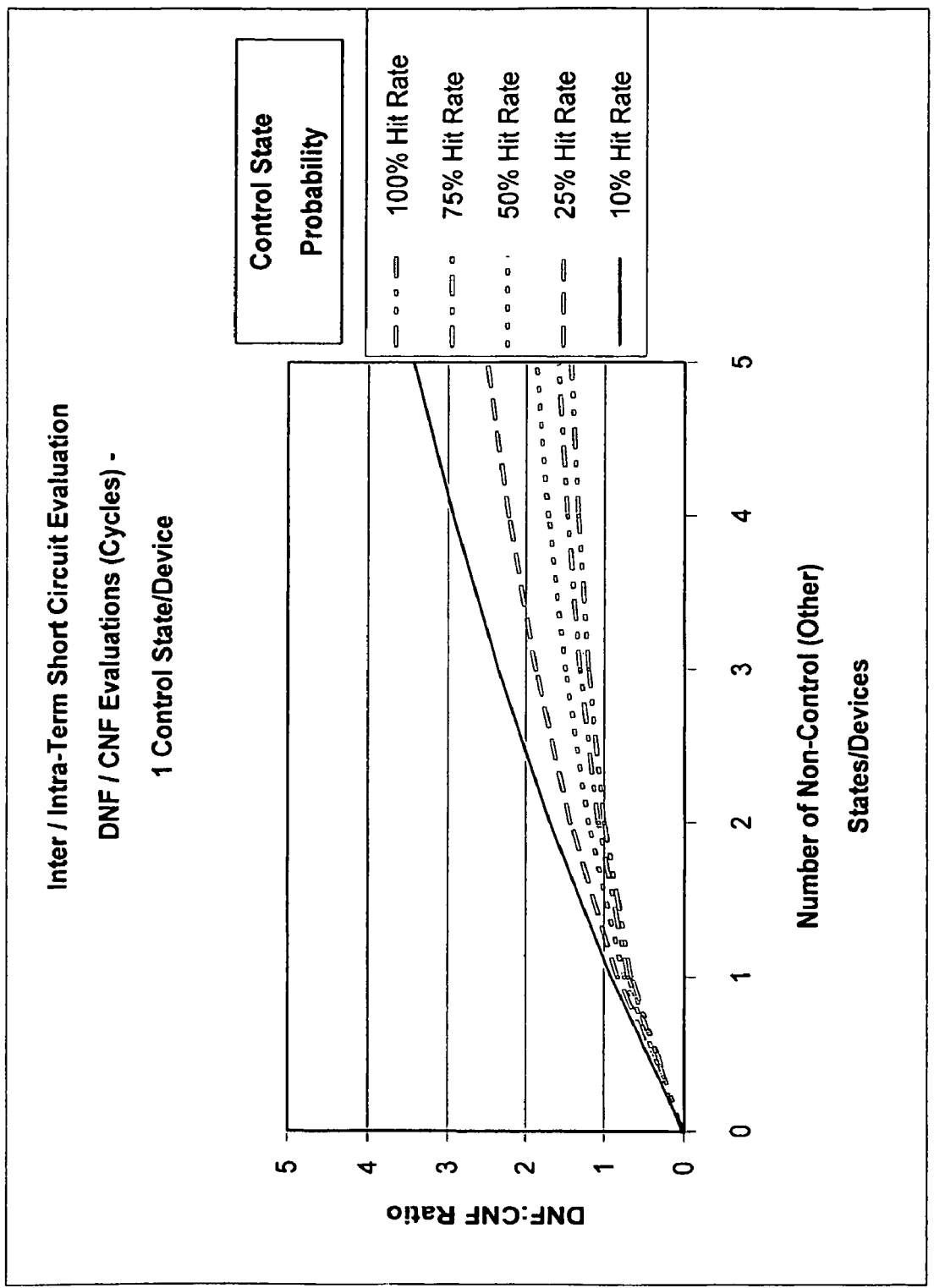
FIG. 12 is a graph of a DNF/CNF ratio using inter/intra-term short-circuit evaluation, with 1 control state and a small number of "other" states.
Figure 13:
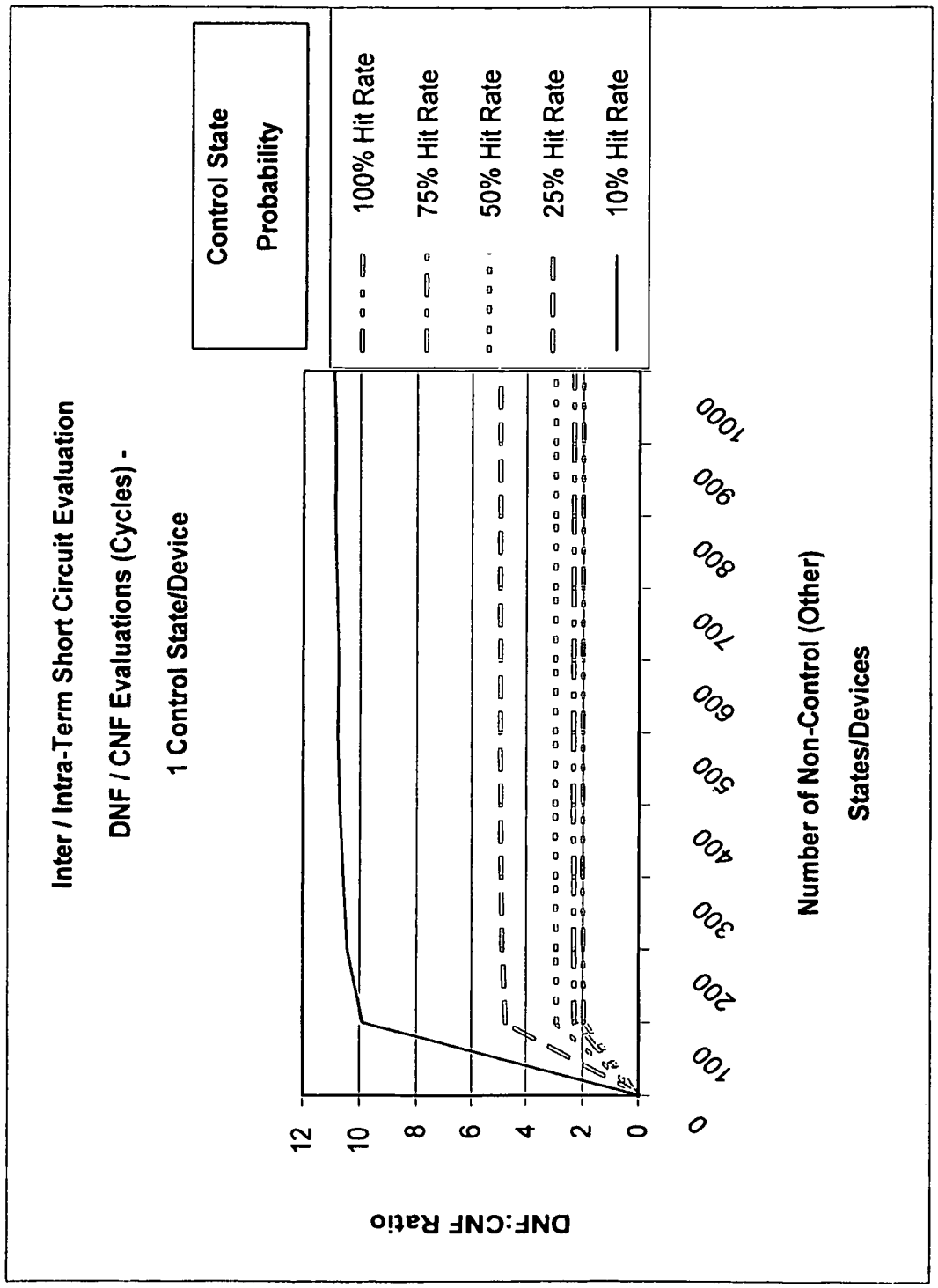
FIG. 13 is a graph of a DNF/CNF ratio using inter/intra-term short-circuit evaluation, with 1 control state and a large number of "other" states.
Figure 14:
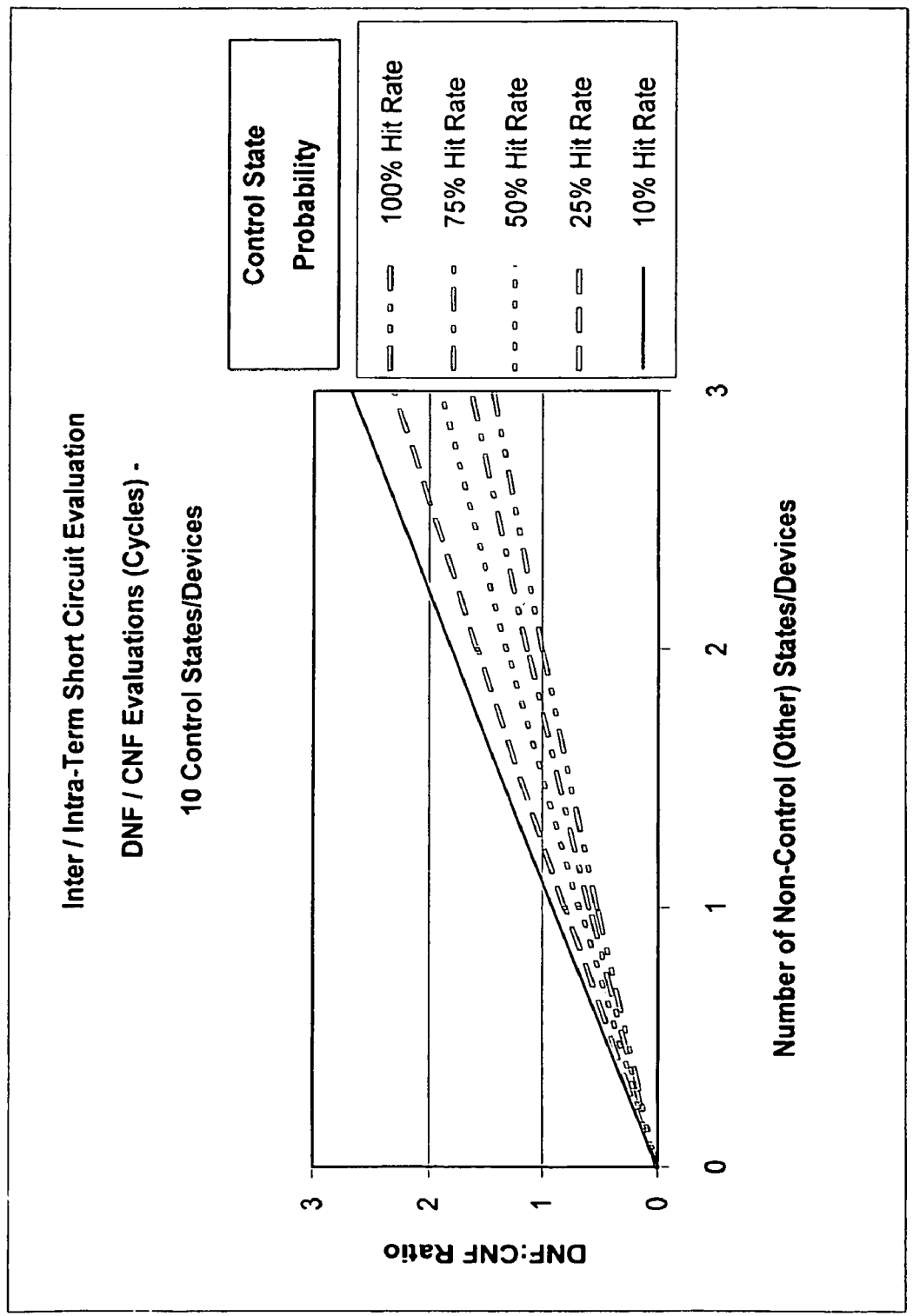
FIG. 14 is a graph of a DNF/CNF ratio using inter/intra-term short-circuit evaluation, with 10 control states and a small number of "other" states.
Figure 15:
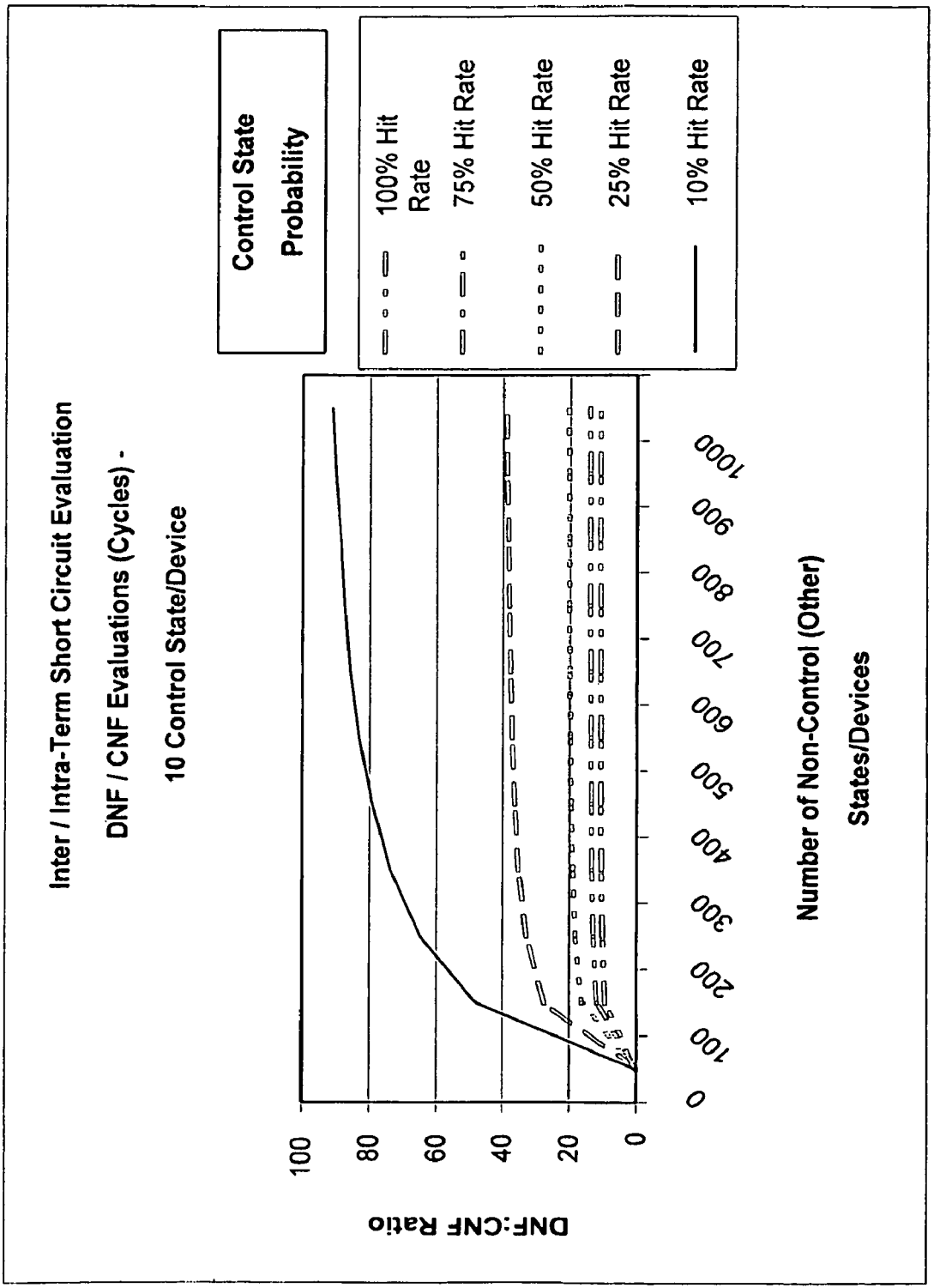
FIG. 15 is a graph of a DNF/CNF ratio using inter/intra-term short-circuit evaluation, with 10 control states and a large number of "other" states.

FIG. 6 illustrates the limited advantage of DNF. Only when the probability for the control state to evaluate to true is one-hundred percent, or the number of "other" states is less than two at a seventy-five percent control state probability, does DNF have an advantage over CNF. When the control state probability is one-hundred percent, meaning the control states are always true, and the number of "other" states becomes arbitrarily large, DNF retains its slight advantage over CNF, as illustrated in FIG. 7. This advantage becomes trivial as the difference in number of processor instructions is minimal at this small number of states. In addition, the likelihood of a one-hundred percent probability for a control state is very remote. For example, in the case of a home alarm system. An alarm will sound if the system is armed and a door or window is opened. In this case, the system being armed is the control state. In a real-world application, however, an alarm system is not continuously armed. Once the number of "other" states rises above two, CNF has a distinct advantage over DNF. This advantage becomes greater as the number of control states and "other" states rises, and the control state probability drops. This is apparent in FIGS. 6 through 11.

As the number of "other" states becomes arbitrarily large, the ratio of DNF evaluations to CNF evaluations becomes relatively constant. Taking a closer look at the formulas for DNF and CNF instructions as OS becomes relatively large and PCSD becomes relatively small, DNF becomes a function of (OS*CS), while CNF becomes a function of (OS*PCSD). Thus, the DNF to CNF instruction ratio can be expressed as an approximate function of the number of control states and their positive distribution, or hit rate, such that DNF/CNF Ratio≈CS/PCSD. Because a relatively large number of control states usually corresponds to a relatively low probability, the choice of CNF over DNF becomes advantageous as the size of the system grows.

The combination of inter and intra-term short-circuiting provides a significant performance gain over the use of either one alone. Assuming that only one of x "other" states will evaluate to true during any single evaluation of an expression, the addition of intra-term short-circuiting reduces the number of state evaluations by (0.5*# of "Other" States) and (0.5*# of Control States*# of "Other" States) on average for CNF and DNF expressions, respectively. Using both inter and intra-term short-circuiting, the above-referenced equations given to describe the average number of instructions for both CNF and DNF become:

$$\text{Avg. CNF Instructions } ((ICS*CS)+(IOS*OS*POSD))*PCSD+(ICS*CS)*(1-PCSD)*FCSD \quad (11)$$

$$\text{Avg. DNF Instructions}=((ICS*CS+IOS)*OS*PCSD*POSD)+((ICS*CS*(1-PCSD)*FCSD+!OS)*OS \quad (12)$$

FIGS. 12 through 15 illustrate the DNF/CNF ratio for 1 and 10 control states, each combined with small and large numbers of "other" states.

Using inter and intra-term short-circuiting together ultimately results in the identical DNF/CNF ratio (for large "other" states) as when using only inter-term short-circuiting. However, the number of average evaluations for each of the two Boolean forms is reduced by fifty percent. Prior to reaching the ratio limit, the effect of using both types of short-circuiting on DNF is especially prevalent, as illustrated by the reduction of the slope of the curve of FIG. 15 as compared with its inter-term short-circuiting counterpart of FIG. 11.

Thus, short-circuiting provides a performance gain by reducing the number of instructions evaluated by the Boolean processor 36 (FIGS. 3 and 4). The actual gain is a function of the number of control states, the number of "other" states, the number of instructions for each, and the positive distribution of each. Using the above-referenced equation for the average CNF evaluations for inter and intra-term short circuiting:

$$\text{Avg. CNF Instructions } ((ICS*CS)+(IOS*OS*POSD))*PCSD+(ICS*CS)*(1-PCSD)*FCSD \quad (13)$$

and the following formula for the number of evaluations for non-short-circuited CNF:

$$\text{CNF Instructions}=(ICS*CS)+(IOS*OS) \quad (14)$$

the improvement that short-circuiting provides can be evaluated, as illustrated in Table 1.

TABLE 1

Percentage of Instructions Saved Using CNF Short-Circuited Evaluation Instead of Non-Short-Circuited Evaluation

| Control States | "Other" States | Positive Control State Distribution | Positive "Other" State Distribution | Average Short-Circuit Evaluations (FCSD = 0.5) | Non-Short-Circuit Evaluations | % Savings Using Short-Circuiting |
|---|---|---|---|---|---|---|
| 1 | 5 | 1 | 0.5 | 3.5 | 6 | 41.67% |
| 1 | 10 | 1 | 0.5 | 6 | 11 | 45.45% |
| 1 | 10 | 0.5 | 0.5 | 3.25 | 11 | 70.45% |
| 1 | 10 | 0.25 | 0.5 | 1.875 | 11 | 82.95% |
| 1 | 10 | 0.1 | 0.5 | 1.05 | 11 | 90.45% |
| 1 | 100 | 1 | 0.5 | 51 | 101 | 49.50% |
| 1 | 100 | 0.5 | 0.5 | 25.75 | 101 | 74.50% |
| 1 | 100 | 0.25 | 0.5 | 13.125 | 101 | 87.00% |
| 1 | 100 | 0.1 | 0.5 | 5.55 | 101 | 94.50% |
| 1 | 1000 | 1 | 0.5 | 501 | 1001 | 49.95% |
| 1 | 1000 | 0.5 | 0.5 | 250.75 | 1001 | 74.95% |
| 1 | 1000 | 0.25 | 0.5 | 125.625 | 1001 | 87.45% |
| 1 | 1000 | 0.1 | 0.5 | 50.55 | 1001 | 94.95% |
| 5 | 5 | 1 | 0.5 | 7.5 | 10 | 25.00% |
| 5 | 10 | 1 | 0.5 | 10 | 15 | 33.33% |
| 5 | 10 | 0.5 | 0.5 | 6.25 | 15 | 58.33% |
| 5 | 10 | 0.25 | 0.5 | 4.375 | 15 | 70.83% |
| 5 | 10 | 0.1 | 0.5 | 3.25 | 15 | 78.33% |
| 5 | 100 | 1 | 0.5 | 55 | 105 | 47.62% |
| 5 | 100 | 0.5 | 0.5 | 28.75 | 105 | 72.62% |
| 5 | 100 | 0.25 | 0.5 | 15.625 | 105 | 85.12% |
| 5 | 100 | 0.1 | 0.5 | 7.75 | 105 | 92.62% |
| 5 | 1000 | 1 | 0.5 | 505 | 1005 | 49.75% |
| 5 | 1000 | 0.5 | 0.5 | 253.75 | 1005 | 74.75% |
| 5 | 1000 | 0.25 | 0.5 | 128.125 | 1005 | 87.25% |
| 5 | 1000 | 0.1 | 0.5 | 52.75 | 1005 | 94.75% |
| 10 | 10 | 1 | 0.5 | 15 | 20 | 25.00% |
| 10 | 20 | 1 | 0.5 | 20 | 30 | 33.33% |
| 10 | 10 | 0.5 | 0.5 | 10 | 20 | 50.00% |
| 10 | 10 | 0.25 | 0.5 | 7.5 | 20 | 62.50% |
| 10 | 10 | 0.1 | 0.5 | 6 | 20 | 70.00% |
| 10 | 100 | 1 | 0.5 | 60 | 110 | 45.45% |
| 10 | 100 | 0.5 | 0.5 | 32.5 | 110 | 70.45% |
| 10 | 100 | 0.25 | 0.5 | 18.75 | 110 | 82.95% |
| 10 | 100 | 0.1 | 0.5 | 10.5 | 110 | 90.45% |
| 10 | 1000 | 1 | 0.5 | 510 | 1010 | 49.50% |
| 10 | 1000 | 0.5 | 0.5 | 257.5 | 1010 | 74.50% |

TABLE 1-continued

Percentage of Instructions Saved Using CNF Short-Circuited Evaluation Instead of Non-Short-Circuited Evaluation

| Control States | "Other" States | Positive Control State Distribution | Positive "Other" State Distribution | Average Short-Circuit Evaluations (FCSD = 0.5) | Non-Short-Circuit Evaluations | % Savings Using Short-Circuiting |
|---|---|---|---|---|---|---|
| 10 | 1000 | 0.25 | 0.5 | 131.25 | 1010 | 87.00% |
| 10 | 1000 | 0.1 | 0.5 | 55.5 | 1010 | 94.50% |

Because the number of instructions required to evaluate a control state is typically the same as the number required to evaluate "other" states, one instruction is assumed for each. The savings illustrated in the Table 1 range from twenty-five to almost ninety-five percent. While the high-end of this range represents a typical system, in terms of the number of control states versus "other" states, the low-end of the range occurs when the number of control states is equal to or near the number of "other" states. In a typical configuration, the number of "other" states outweighs the number of control states, resulting in a relatively higher instruction evaluation savings. In light of all of the above, the use of CNF outweighs any benefit provided by DNF, thereby warranting an architectural design that uses Boolean expressions compiled into CNF.

Although, as described above, the overall processing efficiency for CNF expressions is generally greater than that of DNF expressions, it still may be advantageous to be able to efficiently process either type of expression in certain computing environments. In such situations, a combined CNF/DNF processor (not shown) may be implemented by combining the common portions of the respective processors disclosed in FIGS. 4 and 5 with appropriate combinatorial logic for controlling their operation according to the mode in which the combined processor is to be operating. By providing a switch or control means for controlling the operation mode, such a combined processor would encompass the benefits of both the CNF processor 36 and the DNF processor 136 by operating in the mode appropriate for the type of expression being evaluated. The switch or control means may be controlled by the use of an extra instruction or operation code. The design and control of such a combined processor would otherwise be apparent to one of ordinary skill in the art.

As described above, the Boolean processor 36 (FIGS. 3 and 4) is a general-purpose architecture that is intended to monitor and control its surrounding environment. The small instruction set and design of the Boolean processor 36 are intended to give it a significant speed advantage over its competition, namely other general-purpose architectures, such as microprocessors and microcontrollers. To demonstrate this advantage, the instruction set of the Boolean processor 36 is compared with the instruction sets of two other general-purpose architectures; the Intel 8051 microcontroller and the Intel 8088 family of microprocessors. In addition, the Motorola MMC2107 microcontroller is used for comparison purposes.

Like other microcontrollers, the main purpose of the 8051 is to control its surrounding environment. Because the 8051 is not optimized for Boolean operations, it requires the use of several instructions in order to emulate the functions of the Boolean processor 36 of the present invention. In addition, it also requires the use of two registers: one register to hold the intermediate results of OR calculations and another register for retrieving device states from memory. AND calculations resulting in a false value can be handled by issuing a jump past the operation that results from a true evaluation of the statement. The instructions required to perform the same operations as those of the Boolean processor 36 are illustrated in Table 2. It should be noted that the label SHORT is the label for the instruction immediately following the current CNF expression and is used for inter-term short-circuiting. The SHORTCON label is the label for the next OR term of a conjunct and is used for intra-term short-circuiting.

TABLE 2

Intel 8051 Equivalent Instructions

| Boolean Processor Instruction | 8051 Equivalent Instruction(s) | | Explanation |
|---|---|---|---|
| AND | MOV | Rr, add | Move the state of the device at add into register Rr, |
|  | CJNE | Rr, #n, SHORT | If the value in Rr is not equal to the state specified in #n, then the expression is false and may be short circuited. |
| OR |  | MOV Rr, add | Move the state of the device at add into register Rr, |
|  |  | CJNE Rn, #n, NEXT | If the value in Rr is not equal to the state specified |
|  |  | MOV Rx, #1 | in #n, we set Rx to 0 and move on to the next OR |
|  |  | SJMP SHORTCON | term or the next conjunct. If it is equal, we set the |
|  | NEXT | MOV Rx, #0 | value of Rx to 1 and short circuit the remainder of the conjunct. Rx will be used at the end of operation to determine the final outcome of the entire CNF expression. |
| End of Operation |  | CJNE Rx, #1, SHORT | If Rx does not equal one, then one of the conjuncts |
|  |  | MOV #n, add | containing OR terms did not evaluate to true. Therefore, the entire expression is false. If Rx is equal to one, the expression is true and the resulting state change may be made to the device at add. |

TABLE 2-continued

Intel 8051 Equivalent Instructions

| Boolean Processor Instruction | 8051 Equivalent Instruction(s) | Explanation |
|---|---|---|
| No Operation | NOP | PC = PC + 1 |
| Unconditional Jump | SJMP radd | Jump to the line specified by radd. |
| Conditional Jump | CJNE Rn, #n, radd | If the value in Rn is not equal to #n, then jump to the line specified by radd. |
| Start of Operation | MOV Rx, #1 | Move 1 into register Rx which is used to hold the result value of conjuncts containing OR terms. |
| Start of OR Conjunct | MOV Rx, #1 | See Start of Operation. |
| — | CJNE Rx, #1, SHORT | This operation is required at the end of an OR Conjunct. If the value of Rx is not equal to 1, the value of the conjunct and, hence, the value of the entire expression is false and may be short-circuited. |

EXAMPLE 7

| | | |
|---|---|---|
| BEGIN: | MOV R1, #1 | Initialize R1 to 1 (OR holder) |
| | MOV R0, dev1 | Move state of device 1 into R0 |
| | CJNE R0, #1, SHORT | If dev1 not = to 1 then goto SHORT |
| | MOV R0, dev2 | Move state of device 2 into R0 |
| | CJNE R0, #3, SHORT | If dev2 not = to 3 then goto SHORT |
| | MOV R0, dev3 | Move state of device 3 into R0 |
| | CJNE R0, #1, NEXT | If dev3 not = to 1 then goto NEXT |
| | MOV R1, #1 | If true set R1 to 1 |
| | SJMP SHORTCON | Jump to end of OR conjunct SHORT |
| | MOV R0, dev2 | Move state of device 2 into R0 |
| | CJNE R0, #3, SHORT | If dev2 not = to 3 then goto SHORT |
| | MOV R0, dev3 | Move state of device 3 into R0 |
| | CJNE R0, #1, NEXT | If dev3 not = to 1 then goto NEXT |
| | MOV R1, #1 | If true set R1 to 1 |
| | SJMP SHORTCON | Jump to end of OR conjunct |
| NEXT: | MOV R1, #0 | If false set R1 to 0 |
| | MOV R0, dev4 | Move state of device 4 into R0 |
| | CJNE R0, #2, NEXT2 | If dev4 not = to 2 then goto NEXT2 |
| | MOV R1, #1 | If true set R1 to 1 |
| | SJMP SHORTCON | Jump to end of OR conjunct |
| NEXT2: | MOV R1, #0 | If false set R1 to 0 |
| SHORTCON: | CJNE R1, #1, SHORT | If OR Holder not = 1 then goto SHORT |
| | MOV #8, dev6 | Expression is true, set dev6 = 8 |
| SHORT: | NOP | No Operation or start of next if then block |
| | SJMP BEGIN | Start again and keep testing |

The same statement is implemented for the Boolean processor 36 using the following code:

| Control Store Address | Instruction Register Address | | | |
|---|---|---|---|---|
| | Address | Control/State | Opcode | Functionality |
| 00000000 | 00000011 | 00000000 | 110 | Start of Boolean expr. |
| 00000001 | 00000001 | 00000001 | 000 | Dev1 = 1? (AND) |
| 00000010 | 00000010 | 00000011 | 000 | Dev2 = 3? (AND) |
| 00000011 | 00000110 | 00000000 | 111 | Start of OR conjunct |
| 00000100 | 00000011 | 00000001 | 001 | Dev3 = 1? (OR) |
| 00000101 | 00000100 | 00000010 | 001 | Dev4 = 2? (OR) |
| 00000110 | 00000110 | 00001000 | 010 | End of Operation |
| 00000111 | 00000000 | 00000000 | 100 | Jump to beginning |

What required eighteen instructions using the 8051, required only eight instructions using the Boolean processor 36. Using the differences in the number of instructions required for each operation, the extra number of instructions required to emulate the functionality of the Boolean processor 36 for an 8051 can be measured as such:

$$\text{Extra Instructions} = D\text{-And}*CS + D\text{-Or}*OS + OC + D\text{-}EoO \quad (15)$$

where: D–And=difference in number of instructions for an And operation=1; CS=number of control states; D–Or =difference in number of instructions for an Or Operation=4; OS=number of "other" states; OC=number of OR conjuncts; and D–EoO=difference in number of instructions for an End of Operation=1. Simplified, the resulting equation is:

$$\text{Extra Instructions} = CS + 4OS + OC + 1 \quad (16)$$

Figure 16:
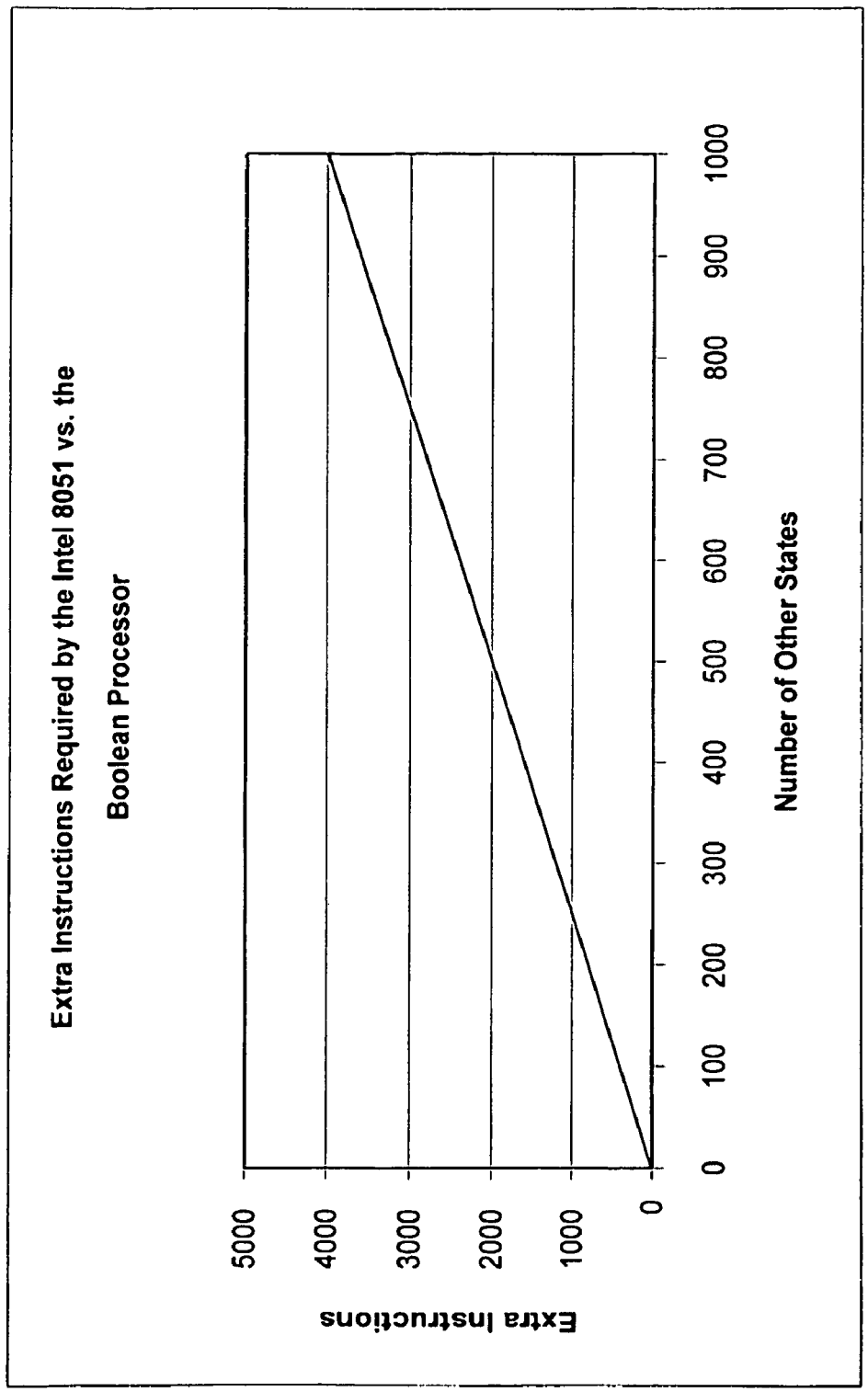
FIG. 16 is a graph of the relative performance of the Intel 8051 microcontroller versus the Boolean processor of the present invention.

The two jump codes, the two start codes, and the no-op code are not included in the calculation because they all require one instruction on each architecture and would, therefore, cancel out with a difference of zero. The number of OR conjuncts is taken into account since the 8051 requires an extra instruction to handle each one. Assuming, that as the size of system grows, the number of "other" states grows exponentially relative to the number of control states and the number of OR conjuncts; the number of extra instructions becomes a linear function such that: Extra Instructions=4OS. This difference becomes significant as the number of "other" states becomes relatively large, as illustrated in FIG. 16.

The Intel 8086 family of microprocessors includes upward-compatibility which allows code written for previous-generation chips to be run on its ancestors. The 8086 family includes the 8086, 80186, 80286, 80386, 80486, and the Pentium models, each offering enhancements to that of its predecessor in terms of performance, memory management, and, in some cases, instruction sets. The basic jump, test, and move instructions required to emulate the functionality of the Boolean processor 36 are part of each of the processor's basic instruction set and can be used to represent the entire family. Being general-purpose platforms, the Intel microprocessors, like the 8051, are not optimized for Boolean operations. As a result, they also require the use of two registers for holding the results of OR operations and for storing states retrieved from memory. The instructions required to perform the same operations as those of the Boolean processor are illustrated in Table 3.

| Boolean Processor Instruction | 8086 Family Equivalent Instruction(s) | | | Explanation |
|---|---|---|---|---|
| AND | MOV | Rr, add | | Move the state of the device at add into register Rr, If the value in Rr is not equal to the state specified in #n, then the expression is false and may be short circuited. |
| | CMP | Rr, #n | | |
| | JNE | SHORT | | |
| OR | | MOV | Rr, add | Move the state of the device at add into register Rr. If the value in Rr is not equal to the state specified in #n, we set Rx to 0 and move on to the next OR term or the next conjunct. If it is equal, we set the value of Rx to 1 and short circuit the remainder of the conjunct. Rx will be used at the end of operation to determine the final outcome of the entire CNF expression. |
| | | CMP | Rn, #n | |
| | | JNE | NEXT | |
| | | MOV | Rx, #1 | |
| | | JMP | SHORTCON | |
| | NEXT | MOV | Rx, #0 | |
| End of Operation | CMP | Rx, #1 | | If Rx does not equal one, then one of the conjuncts containing OR terms did not evaluate to true. Therefore, the entire expression is false. If Rx is equal to one, the expression is true and the resulting state change may be made to the device at add. |
| | JNE | SHORT | | |
| | MOV | #n, add | | |
| No Operation | NOP | | | PC = PC + 1 |
| Unconditional Jump | SJMP | radd | | Jump to the line specified by radd. |
| Conditional Jump | CMP | Rn, #n | | If the value in Rn is not equal to #n, then jump to the line specified by radd. |
| | JNE | radd | | |
| Start of Operation | MOV | Rx, #1 | | Move 1 into register Rx which is used to hold the result value of conjuncts containing OR terms. |
| Start of OR Conjunct | MOV | Rx, #1 | | See Start of Operation. |
| — | CMP | Rx, #1 | | This operation is required at the end of an OR Conjunct. If the value of Rx is not equal to 1, the value of the conjunct and, hence, the value of the entire expression is false and may be short-circuited. |
| | JNE | SHORT | | |

EXAMPLE 8

The statement given in the previous Intel 8051 example:
If dev1=1 and dev2=3 and (dev3=1 or dev4=2) then dev6=8
would be written for an 8086 processor as follows:

| BEGIN: | MOV R1, #1 | Initialize R1 to 1 (OR holder) |
|---|---|---|
| | MOV R0, dev1 | Move state of device 1 into R0 |
| | CM R0, #1 | Compare dev1 state to 1 |
| | JNE R0, #1, SHORT | If dev1 not = 1 then goto SHORT |
| | MOV R0, dev2 | Move state of device 2 into R0 |
| | CMP R0, #3 | Compare dev2 state to 3 |
| | JNE SHORT | If dev2 not = 3 then goto SHORT |
| | MOV R0, dev3 | Move state of device 3 into R0 |
| | CMP R0, #1 | Compare dev3 state to 1 |
| | JNE NEXT | If dev3 not = 1 then goto NEXT |
| | MOV R1, #1 | If true set R1 to 1 |
| | JMP SHORTCON | Jump to end of OR conjunct |
| NEXT: | MOV R1, #0 | If false set R1 to 0 |
| | MOV R0, dev4 | Move state of device 4 into R0 |
| | CMP R0, #2 | Compare dev4 state to 2 |
| | JNE NEXT2 | If dev4 not = 2 then goto NEXT2 |
| | MOV R1, #1 | If true set R1 to 1 |
| | JMP SHORTCON | Jump to end of OR conjunct |

-continued

| | | |
|---|---|---|
| NEXT2: | MOV R1, #0 | If false set R1 to 0 |
| SHORTCON: | CMP R1, #1 | Compare OR Holder to 1 |
| | JNE SHORT | If OR Holder not = 1 then goto SHORT |
| | MOV #8, dev6 | Expression is true, set dev6 = 8 |
| SHORT: | NOP | No Operation or start of next if then block |
| | JMP BEGIN | Start again and keep testing |

In the above-referenced example, the 8086 family requires twenty-four instructions to execute the same functionality that only requires eight instructions for the Boolean processor 36. Using the differences in the number of instructions required for each operation, the extra number of instructions required to emulate the functionality of the Boolean processor 36 for the 8086 can be measured as such:

$$\text{Extra Instructions} = D\text{-}And*CS + D\text{-}Or*OS + CJ + D\text{-}OC*OC + D\text{-}EoO \quad (17)$$

where: D–And=difference in number of instructions for an And operation=1; CS=number of control states; D–Or =difference in number of instructions for an Or Operation=4; OS=number of "other" states; CJ=number of conditional jumps (difference=1); D–OC=difference in number of instructions for an Or Conjunct=2; OC=number of OR conjuncts; and D–EoO=difference in number of instructions for an End of Operation. Simplified, the resulting equation is:

$$\text{Extra Instructions} = 2CS + SOS + CJ + 2OC + 2 \quad (18)$$

Figure 17:
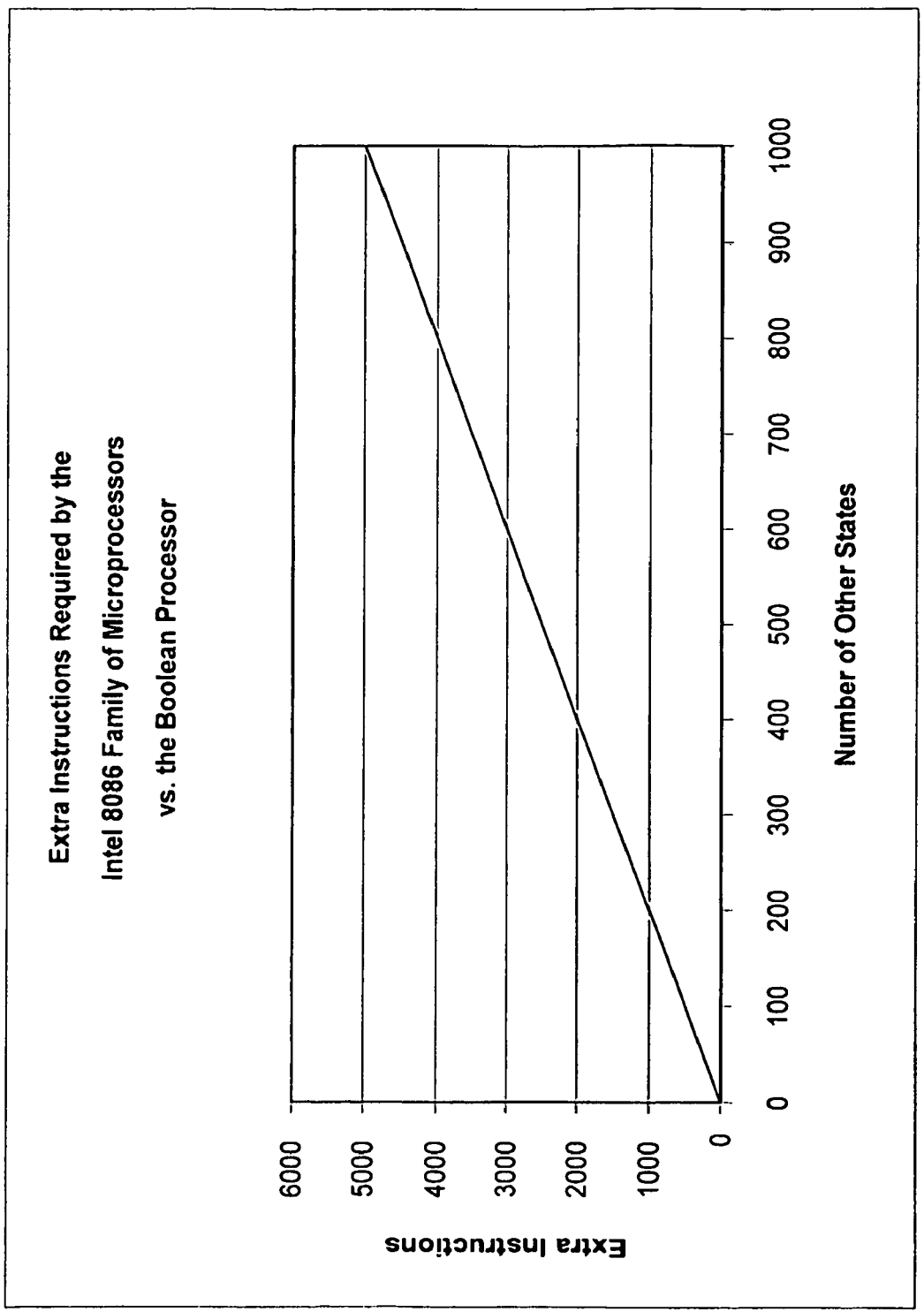
FIG. 17 is a graph of the relative performance of the Intel 8086 family of microprocessors versus the Boolean processor of the present invention.

The unconditional jump code, the two start codes, and the no-op code are not included in the calculation because they all require one instruction for each architecture and would, therefore, cancel out with a difference of zero. Assuming that as the size of system grows, the number of "other" states grows exponentially relative to the number of control states and the number of OR conjuncts, the number of extra instructions becomes a linear function such that: Extra Instructions=5OS, as illustrated in FIG. 17.

The Motorola MMC2107 is a microcontroller that is designed to meet the needs of distribution channel customers dealing with applications, such as vending machines, building management and heating-ventilation-air conditioning (HVAC) systems, exercise equipment and lighting control. Similar to the comparisons of the Boolean processor 36 to the 8051 and 8086 family, the emulation of the Boolean processor 36 by the MMC2107 requires the use of two registers for holding the results of OR operations and for storing states retrieved from memory. The instructions required to perform the same operations as those of the Boolean processor 36 are illustrated in Table 4.

TABLE 4

Motorola MMC2107 Equivalent Instructions

| Boolean Processor Instruction | Motorola MMC2107 Equivalent Instruction(s) | | Explanation |
|---|---|---|---|
| AND | LDB | Rr, add | Load the state of the device at add into register Rr, If the |
| | CMPNEI | Rr, imm5 | value in Rr is not equal to the state specified in imm5, |
| | BT | SHORT | then the expression is false and may be short circuited. (This is used for up to 32 states). |
| | -or- | | |
| | LDB | Rr, add | Load the state of the device at add into register Rr, Put |
| | MOVI | Rn, imm7 | the value of the state being compared in Rn, If the value |
| | CMPNE | Rr, Rn | in Rr is not equal to the state in Rn, then the expression |
| | BT | SHORT | is false and may be short circuited. (This is used for up to 128 states). |
| | -or- | | |
| | LDB | Rr, add | Load the state of the device at add into register Rr, Put |
| | MOVI | Rn, imm7 | the value of the state being compared in Rn, In order to |
| | LSLI | Rn, imm5 | compare Rr to a number greater than 127, the value must |
| | ADDI | Rn, oimm5 | be loaded into Rn via a series of Logical Left Shifts and |
| | CMPNE | Rr, Rn | Adds. If the value in Rr is not equal to the state in Rn. |
| | BT | SHORT | then the expression is false and may be short circulted. (This is used for states >128). |
| OR | | LDB Rr, add | Move the state of the device at add into register Rr. If |
| | | CMPNEI Rn, imm5 | the value in Rr is not equal to the state specified in |
| | | BT NEXT | imm5, we set Rx to 0 and move on to the next OR term |
| | | MOVI Rx, 1 | or the next conjunct. If it is equal, we set the value of |
| | | JMPI SHORTCON | Rx to 1 and short circuit the remainder of the conjunct. |
| | NEXT | MOVI Rx, 0 | Rx will be used at the end of operation to determine the final outcome of the entire CNF expression. (This block is used for up to 32 states.) |
| | -or- | | |
| | | LDB Rr, add | Move the state of the device at add into register Rr. |
| | | MOVI Rn, imm7 | Load the comparison value into Rn. If the value in Rr is |
| | | CMPNE Rr, Rn | not equal to Rn, we set Rx to 0 and move on to the next |
| | | BT NEXT | OR term or the next conjunct. If it is equal, we set the |
| | | MOVI Rx, 1 | value of Rx to 1 and short circuit the remainder of the |
| | | JMPI SHORTCON | conjunct. Rx will be used at the end of operation to |
| | NEXT | MOVI Rx, 0 | determine the final outcome of the entire CNF expression. (This block is used for up to 128 states.) |
| | -or- | | |
| | | LDB Rr, add | Move the state of the device at add into register Rr. |
| | | MOVI Rn, imm7 | Load the comparison value into Rn. In order to compare |
| | | LSLI Rn, imm5 | Rr to a number greater than 127, the value must be |
| | | ADDI Rn, oimm5 | loaded into Rn via a series of Logical Left Shifts and |
| | | CMPNE Rr, Rn | Adds. If the value in Rr is not equal to Rn, we set Rx to |

TABLE 4-continued

Motorola MMC2107 Equivalent Instructions

| Boolean Processor Instruction | Motorola MMC2107 Equivalent Instruction(s) | | | Explanation |
|---|---|---|---|---|
| | BT | NEXT | | 0 and move on to the next OR term or the next conjunct. If it is equal, we set the value of Rx to 1 and short circuit the remainder of the conjunct. Rx will be used at the end of operation to determine the final outcome of the entire CNF expression. (This block is used for >128 states.) |
| | MOVI | Rx, 1 | | |
| | JMPI | SHORTCON | | |
| | NEXT | MOVI | Rx, 0 | |
| End of Operation | CMPNEI | Rx, 1 | | If Rx does not equal one, then one of the conjuncts containing OR terms did not evaluate to true. Therefore, the entire expression is false. If Rx is equal to one, the expression is true and the resulting state change may be made to the device at add. (This block is used for up to 128 state values.) |
| | BT | SHORT | | |
| | MOVI | Rn, imm7 | | |
| | STB | Rn, add | | |
| | -or- | | | |
| | CMPNEI | Rx, 1 | | If Rx does not equal one, then one of the conjuncts containing OR terms did not evaluate to true. Therefore, the entire expression is false. If Rx is equal to one, the expression is true and the resulting state change may be made to the device at add. In order to make a state change to a value higher than 127, the value must be loaded into Rn via a series of Logical Left Shifts and Adds. (This block is used for >128 state values.) |
| | BT | SHORT | | |
| | MOVI | Rn, imm7 | | |
| | LSLI | Rn, imm5 | | |
| | ADDI | Rn, oimm5 | | |
| | STB | Rn, add | | |
| No Operation | ADDI PC, 1 | | | Increment the program counter by 1. PC = PC + 1 |
| Unconditional Jump | JMPI radd | | | Jump to the line specified by radd. |
| Conditional Jump | CMPNEI | Rr, imm5 | | If the value in Rr is not equal to imm5, then jump to the line specified by radd. (This block is used for comparison with values up to 32). |
| | BT | radd | | |
| | -or- | | | |
| | MOVI | Rr, imm7 | | Place the comparison state value in Rn. If the value in Rr is not equal to the value in Rn, then jump to the line specified by radd. (This block is used for comparison with values up to 127). |
| | CMPNE | Rr, Rn | | |
| | BT | radd | | |
| | -or- | | | |
| | MOVI | Rn, imm7 | | Place the comparison state value in Rn. In order to load Rn with a value higher than 127, the value must be loaded into Rn via a series of Logical Left Shifts and Adds. If the value in Rr is not equal to the value in Rn, then jump to the line specified by radd. (This block is used for comparison with values >127). |
| | LSLI | Rn, imm5 | | |
| | ADDI | Rn, oimm5 | | |
| | CMPNE | Rr, Rn | | |
| | BT | radd | | |
| Start of Operation | MOVI Rx, 1 | | | Move 1 into register Rx which is used to hold the result value of conjuncts containing OR terms. |
| Start of OR Conjunct | MOVI Rx, 1 | | | See Start of Operation. |
| — | CMPNEI | Rx, 1 | | This operation is required at the end of an OR Conjunct. If the value of Rx is not equal to 1, the value of the conjunct and, hence, the value of the entire expression is false and may be short-circuited. |
| | BT | SHORT | | |

EXAMPLE 9

The statement given in the previous 8051 and 8086 family examples: If dev1=1 and dev2=3 and (dev3=1 or dev4=2) then dev6=8, would be written for the MMC2107 as follows:

```
BEGIN:    MOVI R1, 1       Initialize R1 to 1 (OR holder)
          LDB R0, dev1     Move state of device 1 into R0
          CMPNEI R0, 1     Compare dev1 state to 1
          BT SHORT         If dev1 not = to 1 then goto SHORT
          LDB R0, dev2     Move state of device 2 into R0
          CMPNEI R0, 3     Compare dev2 state to 3
          BT SHORT         If dev2 not = to 3 then goto SHORT
          LDB R0, dev3     Move state of device 3 into R0
          CMPNEI R0, 1     Compare dev3 state to 1
          BT NEXT          If dev3 not = to 1 then goto NEXT
          MOVI R1, 1       If true set R1 to 1
          JMPI             Jump to end of OR conjunct
          SHORTCON
NEXT:     MOVI R1, 0       If false set R1 to 0
          LDB R0, dev4     Move state of device 4 into R0
          CMPNEI R0, 2     Compare dev4 state to 2
          BT NEXT2         If dev4 not = to 2 then goto NEXT2
          MOVI R1, 1       If true set R1 to 1
          JMPI             Jump to end of OR conjunct
          SHORTCON
NEXT2:    MOVI R1, #0      If false set R1 to 0
SHORTCON: CMPNEI R1, 1     Compare OR Holder to 1
          BT SHORT         If OR Holder not = 1 then goto SHORT
          MOVI R0, 8       Expression is true, set dev6 = 8
          STB              R0, dev6
SHORT:    NOP              No Operation or start of next if then
          block
          JMP BEGIN        Start again and keep testing
```

In the above-referenced example, the MMC2107 requires twenty-five instructions to execute the same functionality that only requires eight instructions for the Boolean processor 36. It should also be noted that the MMC2107's M•CORE™ instruction set requires the use of additional instructions for loading and comparing values greater than thirty-two (see the "Explanation" column of Table 4). Using the differences in the number of instructions required for each operation, the extra number of instructions required to emulate the functionality of the Boolean processor 36 for a Motorola MMC2107 can be measured as such:

$$\text{Extra Instructions} = D\text{-And}*CS + D\text{-Or}*OS + CJ + D\text{-}OC*OC + D\text{-EoO} \qquad (19)$$

where: D–And=difference in number of instructions for an And operation; CS=number of control states; D–Or =difference in number of instructions for an Or Operation; OS=number of "other" states; CJ=number of conditional jumps; D–OC=difference in number of instructions for an Or Conjunct; OC=number of OR conjuncts; and D–EoO=difference in number of instructions for an End of Operation. Simplified, the resulting equations are:

$$\text{Extra Instructions} = 2CS + SOS + CJ + 20C + 3 \text{ (for <32 states)} \qquad (20)$$

$$\text{Extra Instructions} = 3CS + 60S + 2CJ + 20C + 3 \text{ (for <=128 states)} \qquad (21)$$

and $$\text{Extra Instructions} = 5CS + 80S + 4CJ + 20C + 5 \text{ (for >128 states)} \qquad (22)$$

The unconditional jump code, the two start codes, and the no-op code are not included in-the calculation because they all require one instruction on each architecture and would, therefore, cancel out with a difference of zero. Assuming that as the size of system grows, the number of "other" states grows exponentially relative to the number of control states and the number of OR conjuncts, the number of extra instructions becomes a series of linear functions such that:

$$\text{Extra Instructions} = SOS \text{ (for <32 states)} \qquad (23)$$

$$\text{Extra Instructions} = 60S \text{ (for <=128 states)} \qquad (24)$$

$$\text{Extra Instructions} = 80S \text{ (for >128 states)} \qquad (25)$$

Figure 18:
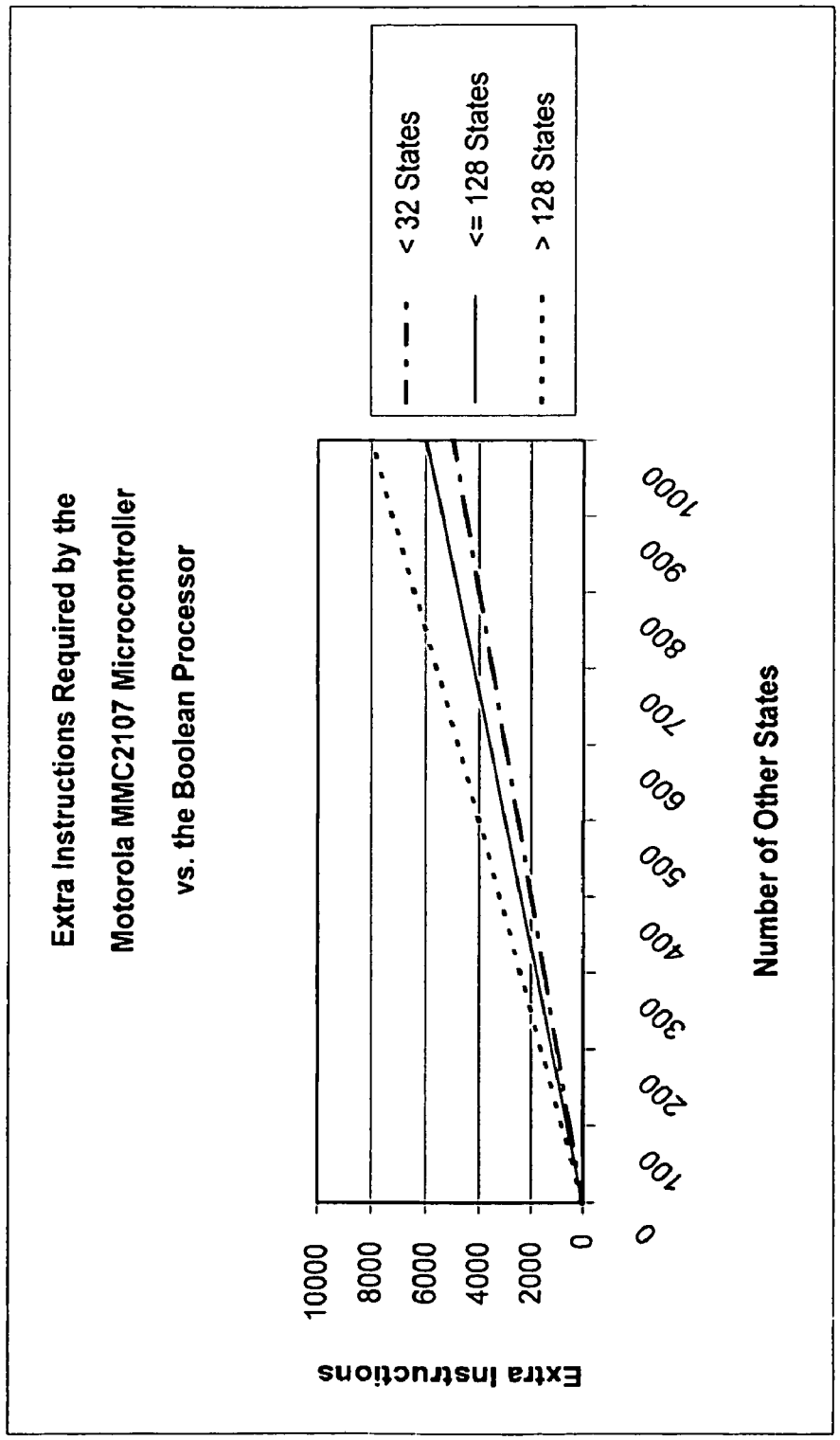
FIG. 18 is a graph of the relative performance of the Motorola MMC2107 microcontroller versus the Boolean processor of the present invention.

These functions are illustrated in FIG. 18. It will be apparent, however, that these values could change depending upon the size of the values being loaded and compared.

Still further efficiencies of Boolean processor technology, relative to conventional microcontrollers and microprocessors such as those described hereinabove, may be provided through the use of intelligent compiling or configuring when ordering terms, conjuncts, disjuncts and/or other operations. FIG. 19 is a flowchart diagram of a re-compiling process 1000 for use with the preferred embodiments of the present invention. This process may be used in conjunction with either a CNF Boolean processor 36 or a DNF Boolean processor 136.

In a CNF Boolean processor 36, the efficiency of the short circuiting of CNF expressions can be maximized by:

C1. Evaluating terms within conjuncts that are most likely to be true as early as possible in the overall evaluation of each conjunct.

C2. Evaluating conjuncts that are most likely to evaluate to false as early as possible in the overall evaluation of the CNF expression.

As shown in FIG. 19, the re-compiling process 1000 begins at step 1005 with an initial compiling of the code representing the Boolean expressions. The process 1000 then enters a loop which begins with the code actually being processed and the expressions themselves being evaluated at step 1010. The next step 1015 in the loop is to determine (or update) the probabilities of terms within conjuncts evaluating to true and/or false and to store the updated probability info in some form in a memory. As the CNF expressions are evaluated over multiple iterations, the stored probabilities tend to become more accurate. When at step 1020 it is determined that a sufficient amount of statistical data has been gathered and included in the calculation of probabilities, the process proceeds at step 1025 to re-compile the code representing the Boolean expressions in order to place it in an order likely to maximize the efficiency of the evaluations as described above in C 1 and C2. This process 1000 may be repeated as often as desired or as often as is likely to improve the efficiency of the operation of the CNF Boolean processor 36.

Similarly, in a DNF Boolean processor 136, the efficiency of the short circuiting of DNF expressions can be maximized by:

D1. Evaluating terms within disjuncts that are most likely to be false as early as possible in the overall evaluation of each disjunct.

D2. Evaluating disjuncts that are most likely to evaluate to true as early as possible in the overall evaluation of the DNF expression.

The re-compiling process 1000 is the same as that for the CNF Boolean processor 36, except that code represents DNF expressions that are evaluated and for which probabilities are determined before re-compiling the code in order to place it in an order likely to maximize the efficiency of the evaluations as described above in D1 and D2.

The comparisons provided previously between Boolean processors 36, 136 and typical conventional microcontrollers or microprocessors were based on the use of a Boolean processor 36, 136 instead of, or as a replacement for, the conventional microcontroller or microprocessor. However, in another aspect of the present invention, a Boolean processor 36, 136 may be used in conjunction with another microcontroller or microprocessor. In this case, the Boolean processor 36, 136 may function as a co-processor that is incorporated into larger chip designs such as other microcontrollers or microprocessors. Conceptually, this arrangement may serve a similar purpose to that of a math co-processor, except that the Boolean co-processor 336 would execute Boolean operations instead of mathematical operations, thus providing greater efficiency with regard to Boolean-intensive processing.

This may be accomplished in a variety of ways. For example, FIG. 20 is a high-level block diagram illustrating the functional relationship between a host computer device 308 and a separate Boolean co-processor 336. The Boolean co-processor 336 comprises a CNF Boolean processor 36 and/or a DNF Boolean processor 136, constructed as described previously but modified to accept portions of code from the host device 308, which may be a microcontroller, microprocessor, or the like. These portions of code represent Boolean expressions in Conjunctive Normal Form (CNF) and/or Disjunctive Normal Form (DNF) and are off-loaded to the Boolean co-processor to maximize the overall speed of the host device 308.

FIG. 21 is a high-level block diagram illustrating the functional relationship between a host computer device 308 and a Boolean co-processor 336 having a direct interface with one or more system devices 380. In this embodiment, greater efficiencies may be achieved by permitting the Boolean co-processor 336 to communicate directly with system devices 380, rather than gathering device states via the host device 308 and then passing that data on to the Boolean co-processor 336.

Figure 22:
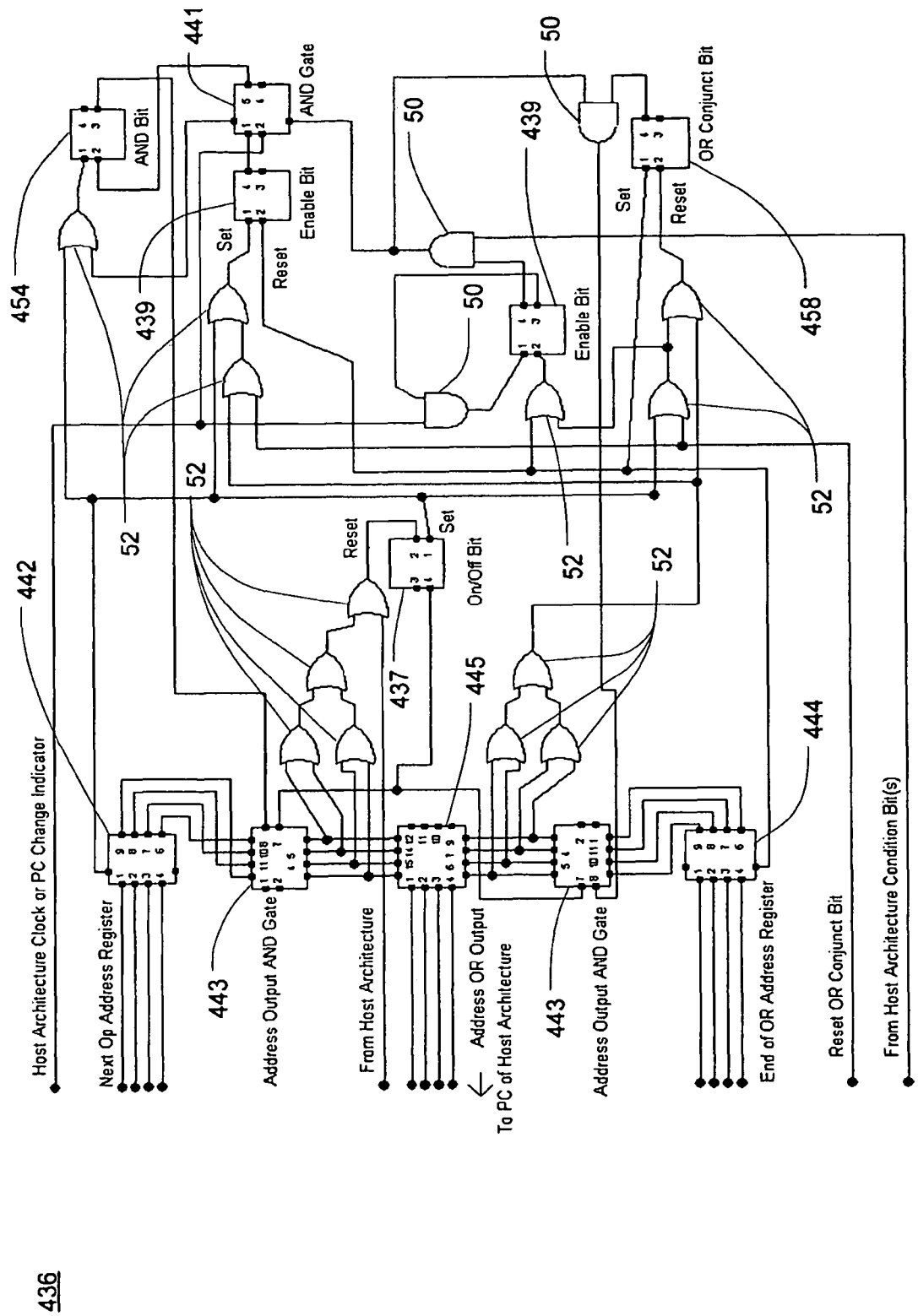
FIG. 22 is a schematic diagram of a CNF embodiment of a Boolean processor core in accordance with another preferred embodiment of the present invention.

In yet another arrangement, Boolean processing technology may be coupled with a conventional microcontroller, microprocessor, or the like by incorporating the core of a Boolean processor 36, 136 directly into a host computer device 408. FIG. 22 is a schematic diagram of a CNF embodiment of a Boolean processor core 436 in accordance with another preferred embodiment of the present invention. In order to simplify the illustration, the CNF Boolean processor core 436 described and illustrated herein utilizes 4-bit addresses, but it will be apparent that this architecture may be scaled to support any address size.

The CNF Boolean processor core 436 includes a next operation address register 442, and an end of OR address register 444, an on/off register 437, a pair of enable registers 439, a 4-input AND gate circuit 441, an AND register 454, an OR conjunct register 458, an address output AND gate 443 for each of the address registers 442, 444, an address OR output circuit 445, and a plurality of conventional 2-input AND gates 50 and 2-input OR gates 52. Each of these circuits will be described in more detail hereinbelow.

Figure 23:
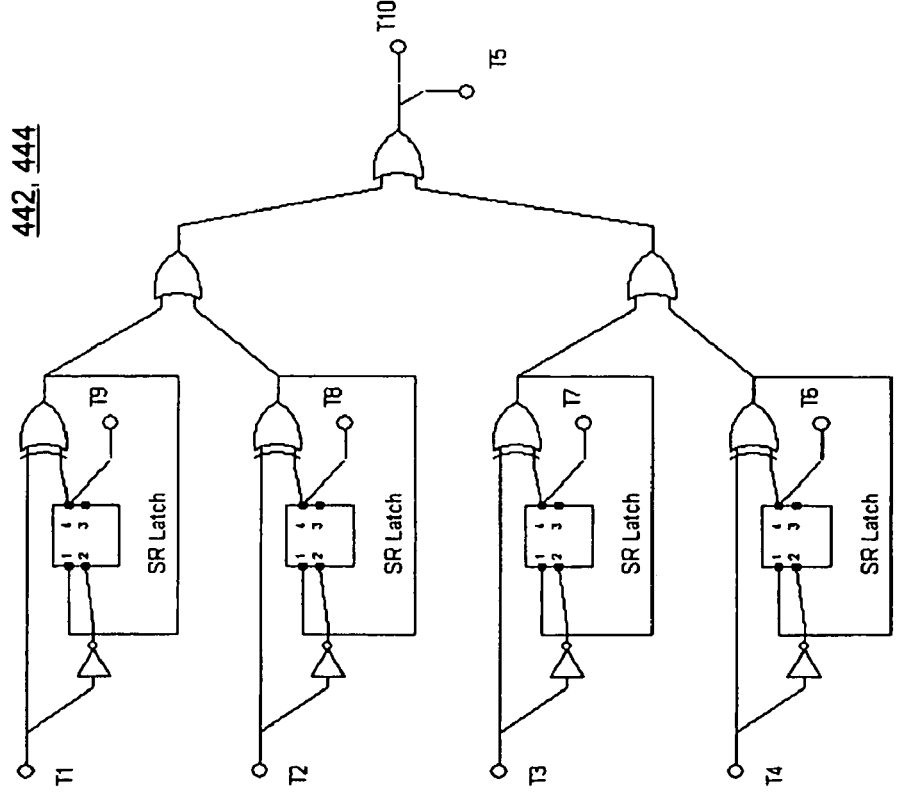
FIG. 23 is a detailed schematic diagram of a circuit suitable for use as either of the address registers shown in FIG. 22.

FIG. 23 is a detailed schematic diagram of a circuit suitable for use as either of the address registers 442, 444 shown in FIG. 22. Like the address registers 42, 44 of the CNF Boolean processor 36 described previously, the two address registers 442, 444 hold addresses used when a particular CNF expression is short circuited. The next operation address is the address of the instruction immediately following the Boolean expression that is being evaluated, and is provided to the next operation address register 442 by the host architecture (not shown) via an input bus. The stored value is then used to short circuit around a CNF expression when any of its conjuncts evaluate to false. Because modifying this address implies the beginning of the evaluation of a CNF Boolean expression, the entire circuit is triggered to an "on" state and the other single bit registers are set/reset to their respective initial states. Similarly, the end of OR address is the address of the instruction immediately following an OR conjunct (CNF conjunct with the terms OR'd together) that is being evaluated, and is provided to the end of OR address register 444 by the host architecture via an input bus. The stored value is then used to short circuit out of an OR conjunct whenever any of its terms evaluate to true. Modifying this address causes the OR conjunct register 458 to be set and an enable bit 439 to be reset. The circuit utilizes exclusive OR gates to provide an indication that the registers value has been modified. This signal is used for setting the on/off register 437 and the OR conjunct register 458 to true, or "on".

When the various enabling bits are properly set, the CNF Boolean processor core 436 operates to provide a short-circuit function by providing the contents of either the next operation address register 442 or the end of OR address register 444 back to the host architecture as a jump signal to the program counter (not shown), or to any other circuitry that permits the host architecture to jump to an address in its memory and/or microprogram. This function is similar to that of the CNF Boolean processor 36 in that when a particular term in a conjunct evaluates to "true," then the end of OR address is switched from the end of OR address register 444 through the address OR output circuit 445, and when a particular conjunct evaluates to "false," then the next operation address is switched from the next operation address register 442 through the address OR output circuit 445. This operation is summarized in Table 5.

TABLE 5

| Host Condition Bit Status (True/False) | Inside OR Conjunct? (currently evaluating terms OR'd together?) | Jump to Next Conjunct? | Jump Outside of Entire Boolean Expression? |
| --- | --- | --- | --- |
| True | No | No | No |
| True | Yes | Yes | No |
| False | No | No | Yes |
| False | Yes | No | No |

It should be noted that in an actual implementation of the CNF Boolean processor core 436, two or more of the inputs shown may in fact be combined into single "words" and stored in a combined register. For example, the on/off bit, the condition bit and the reset OR conjunct bit may be combined and set using a single word whose bits correspond to their respective values.

Figure 24:
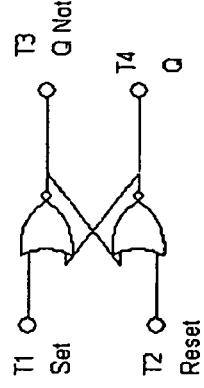
FIG. 24 is a detailed schematic diagram of a circuit suitable for use as any of the 1-bit registers shown in FIG. 22.

FIG. 24 is a detailed schematic diagram of a circuit suitable for use as any of the 1-bit registers 437, 439, 454, 458 shown in FIG. 22. The circuit is of conventional design and includes a pair of cross-connected NOR gates, forming a simple SR latch. The circuit preferably includes a "set" input and a "reset" input, and the value of the register is provided as an output. However, it will be apparent that the design of any of the register circuits is not limited to SR latches and may comprise any kind of circuit used to implement registers or memory devices. Other than their function, each register 437, 439, 454, 458 may be identical to each other.

Figure 25:
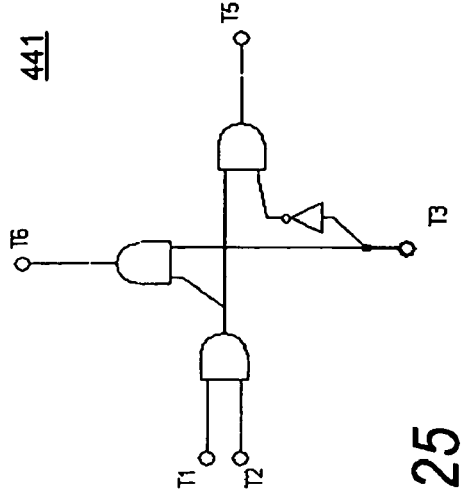
FIG. 25 is a detailed schematic diagram of the 4-input AND gate circuit 441 of FIG. 22.

FIG. 25 is a detailed schematic diagram of the 4-input AND gate circuit 441 of FIG. 22. The 4-input AND gate circuit 441 includes three AND gates and a NOT gate. One AND gate is used to synchronize a clock or similar signal from the host architecture with an enable bit from one of the enable bit registers 439. When synchronized, the other AND gates are used to propagate the value of a condition bit, received from the host architecture, to either set or reset the AND register 454.

Figure 26:
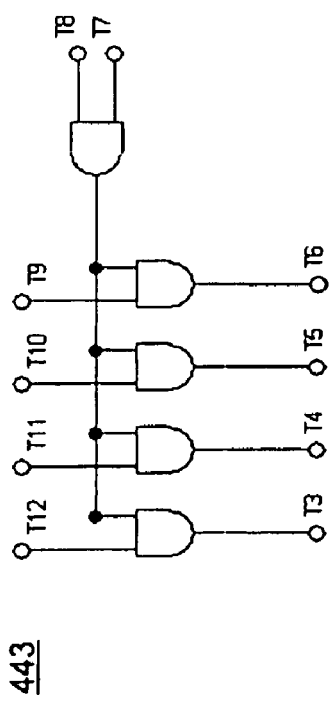
FIG. 26 is a detailed schematic diagram of a circuit suitable for use as either of the address output AND gates shown in FIG. 22.

FIG. 26 is a detailed schematic diagram of a circuit suitable for use as either of the address output AND gates 443 shown in FIG. 22. The circuit includes an AND gate for each addressing bit used by the CNF Boolean processor core 436 and an additional AND gate for gating those address bit AND gates. The two address output AND gates 443 are used to gate the value in the next operation address register 442 and the value in the end of OR address register 444, respectively, to the address outputs of the CNF Boolean processor core 436. The AND gates in the circuit are controlled by the additional AND gate, which propagates the next operation address on the input address bits only when the value of the AND register 454 is false and the value of the on/off register 437 is "true," or "on." Likewise, an AND gate propagates the end of OR address on the input address bits only when the value in the OR conjunct register 458 is "true" or one, the condition bit from the host architecture is "true," or one, and the value of the on/off register 437 is true, or "on."

Figure 27:
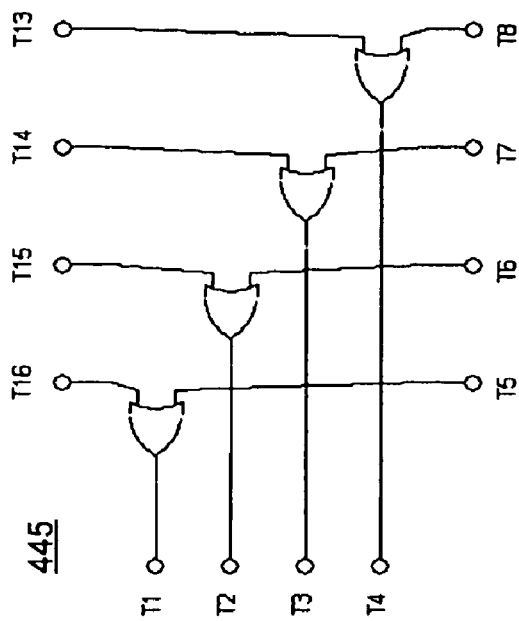
FIG. 27 is a detailed schematic diagram of the address OR output circuit.

FIG. 27 is a detailed schematic diagram of the address OR output circuit 445. The circuit 445 includes a plurality of OR gates, with the number corresponding to the number of addressing bits used by the CNF Boolean processor core 436. The OR gates simply output address data received from the two address output AND gates 443. Because those gates are controlled such that no more than one address output AND gate 443 produces a non-zero address at any given time, the circuit 445 functions simply as a means for funneling data from more than one source to a single output or set of outputs. Thus, it will be apparent that this same function may be provided in other ways, including the replacement of the entire circuit 445 with simple wire cross-connections. In any case, when a short-circuit occurs, either the next operation address or the end of OR address is outputted by the CNF Boolean processor core 436 to the host architecture.

In operation, when the CNF Boolean processor core 436 receives a new next operation address from the host architecture, it turns the processor 436 on by setting the on/off bit to "true," or "on." The CNF Boolean processor core 436 then monitors one or more condition bits and evaluates them in conjunction with the status of the AND bit 454, the OR conjunct bit 458, and the enable bits 439 to determine the status of the evaluation. It is these bits that determine the operation of the CNF Boolean processor core 436 and the address result that is subsequently provided back to the host architecture. Notably, although only a single condition bit is illustrated, it should be apparent that multiple condition bits may be incorporated, and that the bits may optionally be stored in a register in the CNF Boolean processor core 436. The various condition bits represent the outcome of various evaluations, such as whether the value of a particular device state is equal to, greater than, less than, greater than or equal to, or less than or equal to another value. For the sake of simplicity, however, only a single condition bit is shown.

In addition to receiving condition bit(s), end of OR addresses, next operation addresses, and host clock signals/PC change indicators as input, the CNF Boolean processor core 436 may also receive a reset OR conjunct bit signal and a reset on/off bit signal. The former may be used to signal to the CNF Boolean processor core 436 that the evaluation of an OR conjunct has just completed and prevents the circuit from outputting the contents of the end of OR address register 444 when an OR conjunct is not being evaluated. The latter may be used to reset the on/off register 437 to a value of "false", or "off." If the status of this bit is "off," then the CNF Boolean processor core 436 is prevented from reacting to changes in the condition bit(s), described below, that may occur when the host architecture is processing code that is not a Boolean expression.

Figure 28:
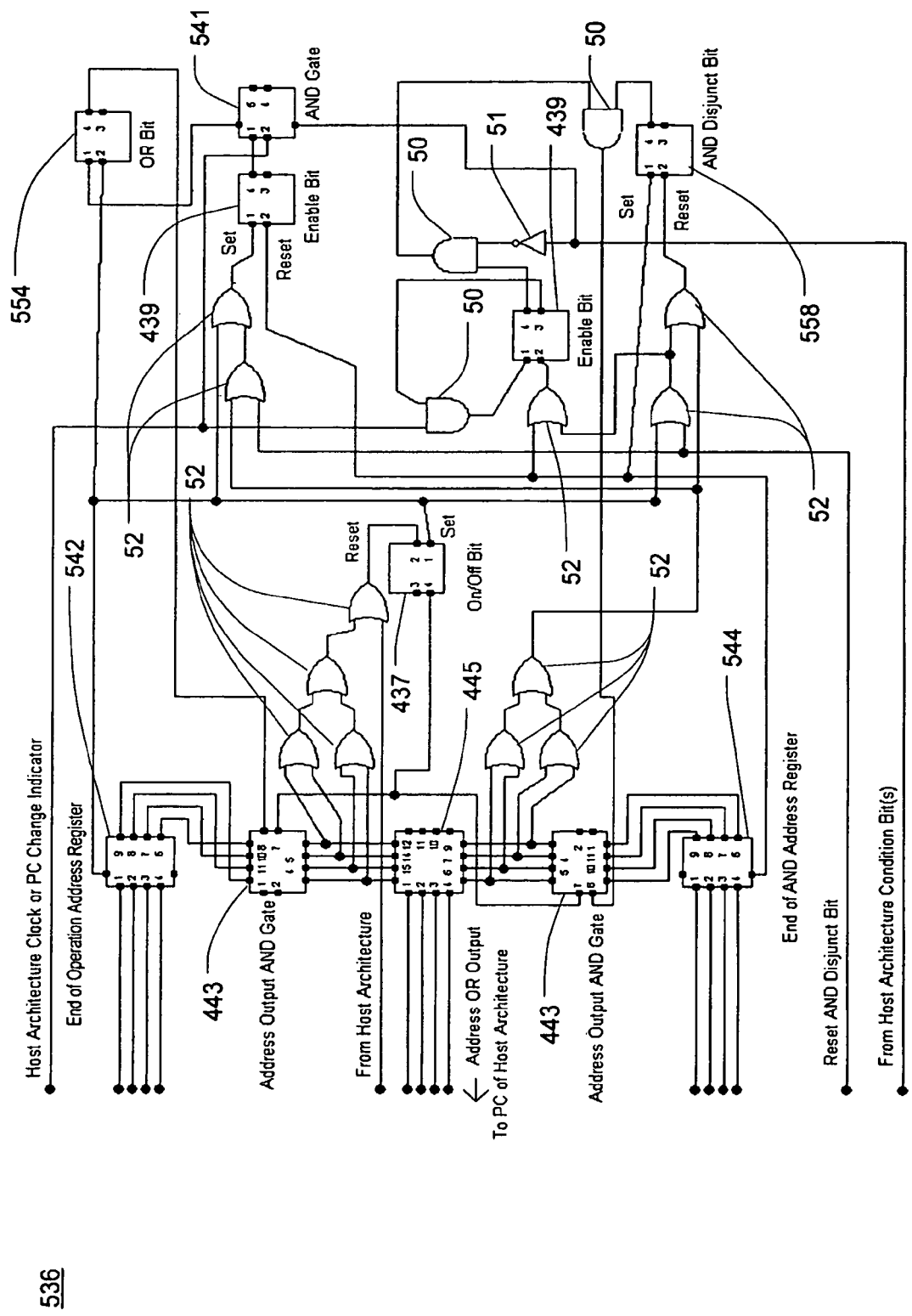
FIG. 28 is a schematic diagram of a DNF embodiment of a Boolean processor core in accordance with another preferred embodiment of the present invention.

A host architecture may likewise utilize a DNF embodiment of a Boolean processor core 536. FIG. 28 is a schematic diagram of a DNF embodiment of a Boolean processor core 536 in accordance with another preferred embodiment of the present invention. In order to simplify the illustration, the DNF Boolean processor core 536 described and illustrated herein utilizes 4-bit addresses, but it will be apparent that this architecture may be scaled to support any address size.

The DNF Boolean processor core 536 includes an end of operation address register 442, and an end of AND address register 544, an on/off register 437, a pair of enable registers 439, a 3-input AND gate circuit 541, an OR register 554, an AND disjunct register 558, an address output AND gate 443 for each of the address registers 442, 544, an address OR output circuit 445, a conventional NOT gate 51 and a plurality of conventional 2-input AND gates 50 and 2-input OR gates 52. Each of these circuits will be described in more detail hereinbelow.

The address registers 442, 544 are circuits that may be of the type shown in FIG. 23. Like the address registers 42, 44 of the DNF Boolean processor 136 described previously, the two address registers 442, 544 hold addresses used when a particular DNF expression is short circuited. The end of operation address is the address of the instruction that is executed when the overall result of the Boolean expression being evaluated is true, and is provided to the end of operation register 442 by the host architecture (not shown) via an input bus. The stored value is then used to short circuit around a DNF expression when any of its disjuncts evaluate to true. Because modifying this address implies the beginning of the evaluation of a DNF Boolean expression, the entire circuit is triggered to an "on" state and the other single bit registers are set/reset to their respective initial states. Similarly, the end of AND address is the address of the instruction immediately following an AND disjunct (DNF disjunct with terms AND'd together) that is being evaluated, and is provided to the end of operation register 544 by the host architecture via an input bus. The stored value is then used to short circuit out of a DNF disjunct when any of its terms evaluate to false. Modifying this address causes the AND disjunct register 558 to be set.

When the various enabling bits are properly set, the DNF Boolean processor core 536 operates to provide a short-circuit function by providing the contents of either the end of operation address register 542 or the end of AND address register 544 back to the host architecture as a jump signal to the program counter (not shown), or to any other circuitry that permits the host architecture to jump to an address in its memory and/or microprogram. This function is similar to that of the DNF Boolean processor 136 in that when a particular term in a disjunct evaluates to "false," then the end of AND address is switched from the end of AND address register 544 through the address OR output circuit 445, and when a particular disjunct evaluates to "true," then the end of operation address is switched from the end of operation address register 442 through the address OR output circuit 445. This operation is summarized in Table 6.

TABLE 6

Summary of Operation of DNF Boolean Processor Core

| Host Condition Bit Status (True/False) | Inside AND Disjunct? (currently evaluating terms AND'd together?) | Jump to Next Disjunct? | Jump Outside of Entire Boolean Expression? |
|---|---|---|---|
| True | No | No | Yes |
| True | Yes | No | No |
| False | No | No | No |
| False | Yes | Yes | No |

It should be noted that in an actual implementation of the DNF Boolean processor core 536, two or more of the inputs shown may in fact be combined into single "words" and stored in a combined register. For example, the on/off bit, the condition bit and the reset AND disjunct bit may be combined and set using a single word whose bits correspond to their respective values.

The various 1-bit registers 437, 439, 554, 558 are circuits that may be of the type shown in FIG. 24. As described previously, the circuit is of conventional design and includes a pair of cross-connected NOR gates, forming a simple SR latch. The circuit preferably includes a "set" input and a "reset" input, and the value of the register is provided as an output. However, it will be apparent that the design of any of the register circuits is not limited to SR latches and may comprise any kind of circuit used to implement registers or memory devices. Other than their function, each register 437, 439, 554, 558 may be identical to each other.

Figure 29:
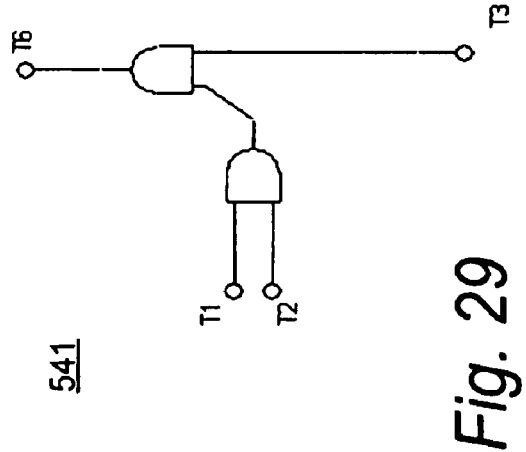
FIG. 29 is a detailed schematic diagram of the 3-input AND gate circuit of FIG. 28.

FIG. 29 is a detailed schematic diagram of the 3-input AND gate circuit 541 of FIG. 28. The 3-input AND gate circuit 541 includes two AND gates. One AND gate is used to synchronize a clock or similar signal from the host architecture with an enable bit from one of the enable bit registers 439. When synchronized, the other AND gate is used to propagate the value of a condition bit, received from the host architecture, to the OR register 554.

The two address output AND gates 443 are circuits that may be of the type shown in FIG. 26. The circuit includes an AND gate for each addressing bit used by the DNF Boolean processor core 536 and an additional AND gate for gating those address bit AND gates. The two address output AND gates 443 are used to gate the end of operation address and the end of AND address, respectively, to the address outputs of the DNF Boolean processor core 536. The AND gates in the circuit are controlled by the additional AND gate, which propagates the end of operation address on the input address bits only when the value of the OR register 554 is true and the value of the on/off register 437 is "true," or "on." Likewise, an AND gate propagates the end of AND address on the input address bits only when the value in the AND disjunct register 558 is "true" or one, the condition bit from the host architecture is "false," or zero, and the on/off bit is "on."

The address OR output circuit 445 may be of the type shown in FIG. 27. The circuit 445 includes a plurality of OR gates, with the number corresponding to the number of addressing bits used by the DNF Boolean processor core 536. The OR gates simply output address data received from the two address output AND gates 443. Because those gates are controlled such that no more than one address output AND gate 443 produces a non-zero address at any given time, the circuit 445 functions simply as a means for funneling data from more than one source to a single output or set of outputs. Thus, it will be apparent that this same function may be provided in other ways, including the replacement of the entire circuit 445 with simple wire cross-connections. In any case, when a short-circuit occurs, either the end of operation address or the end of OR address is outputted by the DNF Boolean processor core 536 to the host architecture.

In operation, when the DNF Boolean processor core 536 receives a new end of operation address from the host architecture, it turns the processor 536 on by setting the on/off bit to "true," or "on." The DNF Boolean processor core 536 then monitors one or more condition bits and evaluates them in conjunction with the status of the OR bit 554, the AND disjunct bit 558, and the enable bits 439 to determine the status of the evaluation. It is these bits that determine the operation of the DNF Boolean processor core 536 and the address result that is subsequently provided back to the host architecture. Notably, although only a single condition bit is illustrated, it should be apparent that multiple condition bits may be incorporated, and that the bits may optionally be stored in a register in the DNF Boolean processor core 536. The various condition bits represent the outcome of various evaluations, such as whether the value of a particular device state is equal to, greater than, less than, greater than or equal to, or less than or equal to another value. For the sake of simplicity, however, only a single condition bit is shown.

In addition to receiving condition bit(s), end of AND addresses, end of operation addresses, and host clock signals/PC change indicators as input, the DNF Boolean processor core 536 may also receive a reset AND disjunct bit signal and a reset on/off bit signal. The former may be used to signal to the DNF Boolean processor core 536 that the evaluation of an AND disjunct has just completed and prevents the circuit from outputting the contents of the end of AND address register 544 when an AND disjunct is not being evaluated. The latter may be used to reset the on/off register 437 to a value of "false," or "off." If the status of this bit is "off," then the DNF Boolean processor core 536 is prevented from reacting to changes in the condition bit(s), described below, that may occur when the host architecture is processing code that is not a Boolean expression.

Figure 30:
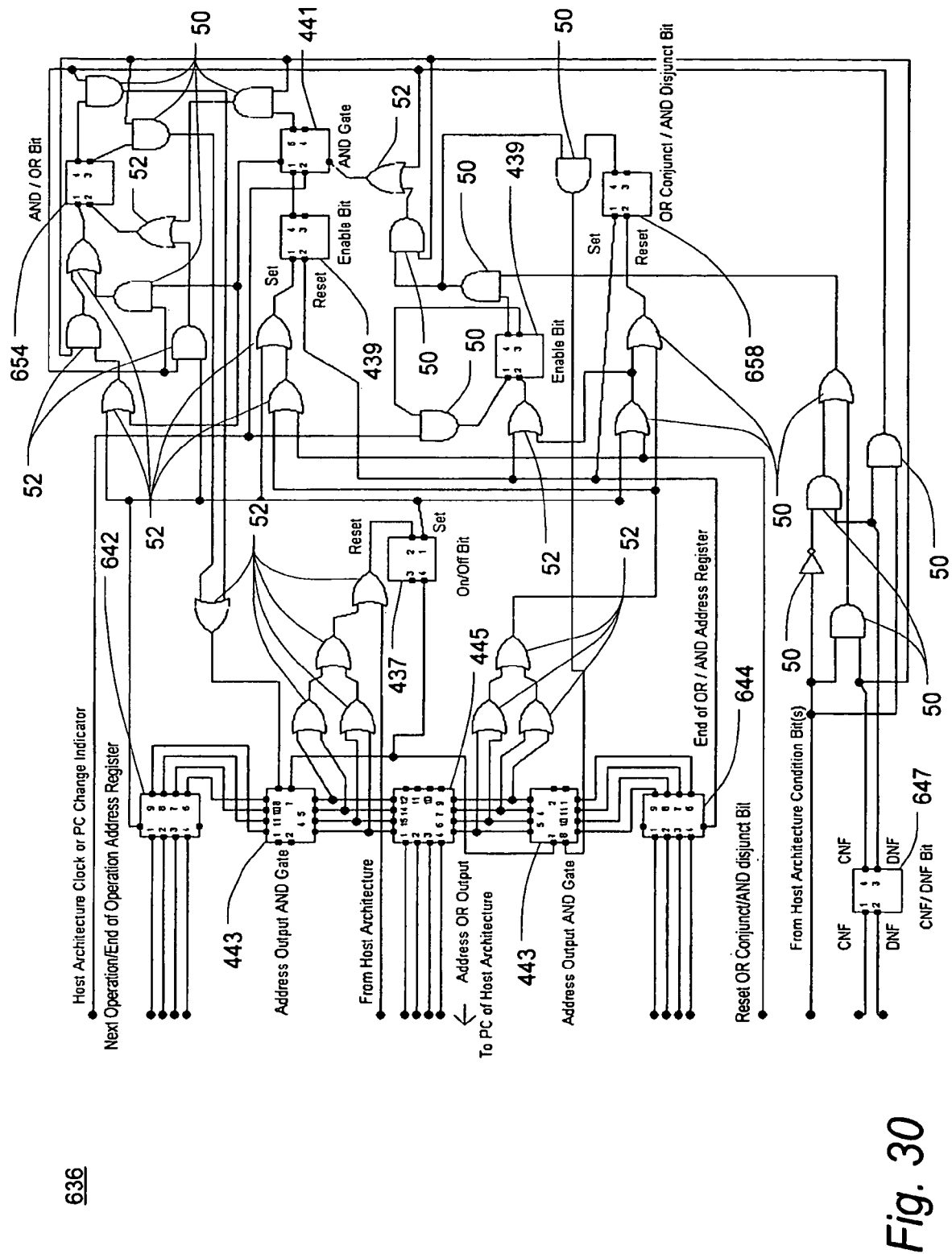
FIG. 30 is a schematic diagram of a combined CNF/DNF Boolean processor core in accordance with another preferred embodiment of the present invention.

In still another arrangement, a host architecture may incorporate both a CNF Boolean processor core 436 and a DNF Boolean processor core 536 for added efficiency. FIG. 30 is a schematic diagram of a combined CNF/DNF Boolean processor core 636 in accordance with another preferred embodiment of the present invention. Once again, in order to simplify the illustration, the combination CNF/DNF Boolean processor core 636 described and illustrated herein utilizes 4-bit addresses, but it will be apparent that this architecture may be scaled to support any address size.

The CNF/DNF Boolean processor core 636 includes a combined next operation/end of operation address register 642, and an end of OR/AND address register 644, an on/off register 437, a pair of enable registers 439, a CNF/DNF register 647, a 4-input AND gate circuit 441, an AND/OR register 654, a combination OR conjunct/AND disjunct register 658, an address output AND gate 443 for each of the address registers 642, 644, an address OR output circuit 445, a conventional NOT gate 51 and a plurality of conventional 2-input AND gates 50 and 2-input OR gates 52. Each of these circuits will be described in more detail hereinbelow.

The address registers 642, 644 are circuits that may be of the type shown in FIG. 23. Like the address registers 42, 44 of the CNF and DNF Boolean processors 36, 136 described previously, the two address registers 642, 644 hold addresses used when a particular CNF or DNF expression is short circuited. In CNF mode, the next operation/end of operation address is the address of the instruction immediately following the Boolean expression that is being evaluated, while in DNF mode, the next operation/end of operation address is the address of the instruction that is executed when the overall result of the Boolean expression being evaluated is true. In either case, the next operation/end of operation address is provided to the next operation/end of operation address register 642 by the host architecture (not shown) via an input bus. The stored value is then used to short circuit around a CNF or DNF, expression when any of its conjuncts or disjuncts, respectively, evaluate to false or true, respectively. Because modifying this address implies the beginning of the evaluation of a new Boolean expression, the entire circuit is triggered to an "on" state and the other single bit registers are set/reset to their respective initial states.

Similarly, the end of OR/AND address is the address of the instruction immediately following an OR conjunct (CNF conjunct with terms OR'd together) or an AND disjunct (DNF disjunct with terms AND'd together) that is being evaluated and is provided to the next operation/end of operation address register 644 by the host architecture via an input bus. The stored value is then used to short circuit out of a CNF conjunct when any of its terms evaluate to true, or out of a DNF disjunct when any of its terms evaluate to false. Modifying this address causes the OR conjunct/AND disjunct register 658 to be set.

When the various enabling bits are properly set, the CNF/DNF Boolean processor core 636 operates to provide a short-circuit function by providing the contents of either the next operation/end of operation address register 642 or the end of OR/AND address register 644 back to the host architecture as a jump signal to the program counter (not shown), or to any other circuitry that permits the host architecture to jump to an address in its memory and/or microprogram.

The various 1-bit registers 437, 439, 647, 654, 658 are circuits that may be of the type shown in FIG. 24. As described previously, the circuit is of conventional design and includes a pair of cross-connected NOR gates, forming a simple SR latch. The circuit preferably includes a "set" input and a "reset" input, and the value of the register is provided as an output. However, it will be apparent that the design of any of the register circuits is not limited to SR latches and may comprise any kind of circuit used to implement registers or memory devices. Other than their function, each register 437, 439, 654, 658 may be identical to each other.

The 4-input AND gate circuit 441 may be of the type shown in FIG. 25. As described previously, the 4-input AND gate circuit 441 includes three AND gates and a NOT gate. One AND gate is used to synchronize a clock or similar signal from the host architecture with an enable bit from one of the enable bit registers 439. When synchronized, the other AND gates are used to propagate the value of a condition bit, received from the host architecture, to either set or reset the AND/OR register 654.

The two address output AND gates 443 are circuits that may be of the type shown in FIG. 26. The circuit includes an AND gate for each addressing bit used by the CNF/DNF Boolean processor core 636 and an additional AND gate for gating those address bit AND gates. The two address output AND gates 443 are used to gate the next operation (or end of operation) address and the end of OR/AND address, respectively, to the address outputs of the CNF/DNF Boolean processor core 636. The AND gates in the circuit are controlled by the additional AND gate, which propagates the next operation or end of operation address on the input address bits only in the following two scenarios:
1. The CNF/DNF register 647 is set for CNF, the AND/OR bit is "false," and the status of the on/off bit register 437 is "on."
2. The CNF/DNF register 647 is set for DNF, the AND/OR register is "true," and the status of the on/off bit register 437 is "on."

Likewise, the end of OR/AND address is propagated on the input address bits in the following two scenarios:
1. The CNF/DNF register 647 is set for CNF, the OR conjunct/AND disjunct register 658 is set to "true," or one, the condition bit from the host architecture is "true," or one, and the on/off bit 437 is "on."
2. The CNF/DNF register 647 is set for DNF, the OR conjunct/AND disjunct register 658 is set to "true," or one, the condition bit from the host architecture is "false," or one, and the on/off bit 437 is "on."

The address OR output circuit 445 may be of the type shown in FIG. 27. The circuit 445 includes a plurality of OR gates, with the number corresponding to the number of addressing bits used by the CNF/DNF Boolean processor core 636. The OR gates simply output address data received from the two address output AND gates 443. Because those gates are controlled such that no more than one address output AND gate 443 produces a non-zero address at any given time, the circuit 445 functions simply as a means for funneling data from more than one source to a single output or set of outputs. Thus, it will be apparent that this same function may be provided in other ways, including the replacement of the entire circuit 445 with simple wire cross-connections. In any case, when a short-circuit occurs, either the next operation address or the end of OR/AND address are outputted by the CNF/DNF Boolean processor core 636 to the host architecture.

The CNF/DNF Boolean processor core 636 operates as either a CNF Boolean processor core 436 or a DNF Boolean processor core 536, depending upon the state of one or more special CNF/DNF bits received from the host architecture and stored in the CNF/DNF register 647. Combinatorial logic is included to control the rest of the circuit appropriately, but otherwise the operation of the CNF/DNF Boolean processor core 636 is similar to that of the CNF Boolean processor core 436 and DNF Boolean processor core 536. When the CNF/DNF Boolean processor core 636 receives a new next operation address or end of operation address from the host architecture, it turns the processor 636 on by setting the on/off bit to "true," or "on." The CNF/DNF Boolean processor core 636 then monitors one or more condition bits and evaluates them in conjunction with the status of the AND/OR register 654, the OR conjunct/AND disjunct register 658, and the enable registers 439 to determine the status of the evaluation. It is these bits that determine the operation of the CNF/DNF Boolean processor core 636 and the address result that is subsequently provided back to the host architecture. Once again, it should be noted that although only a single condition bit is illustrated, it will be apparent that multiple condition bits may be incorporated, and that the bits may optionally be stored in a register in the CNF/DNF Boolean processor core 636. The various condition bits represent the outcome of various evaluations, such as whether the value of a particular device state is equal to, greater than, less than, greater than or equal to, or less than or equal to another value. For the sake of simplicity, however, only a single condition bit is shown.

In-addition to receiving condition bit(s), end of OR/AND addresses, next operation/end of operation addresses, and host clock signals/PC change indicators as input, the CNF/DNF Boolean processor core 636 may also receive a reset OR conjunct/AND disjunct bit signal and a reset on/off bit signal. The former may be used to signal to the CNF/DNF Boolean processor core 636 that the evaluation of an OR conjunct or AND disjunct has just completed and prevents the circuit from outputting the contents of the end of OR/AND address register 644 when an OR conjunct or AND disjunct, respectively, is not being evaluated. The latter may be used to reset the on/off register 437 to a value of "false," or "off." If the status of this bit is "off," then the CNF/DNF Boolean processor core 636 is prevented from reacting to changes in the condition bit(s), described below, that may occur when the host architecture is processing code that is not a Boolean expression.

In addition, in order to take advantage of the CNF, DNF or CNF/DNF Boolean processor cores 436, 536, 636, conventional compilers would need to be modified slightly. Applications that can reap the benefits of the Boolean processor technology will only need to be re-compiled. The modifications to existing compilers should be minimal. The only changes that need to occur are changes in the way the compilers handle Boolean expressions. The compiler modifications should be designed to assemble the Boolean expressions such that terms that are most likely to trigger short circuiting are evaluated as early as possible in the execution. It should also be designed to group similar types of comparisons (=, !=, <, >, etc.) together. In addition, the intelligent compiling process 1000 described previously may be used to re-compile the code containing the Boolean expressions on an ongoing basis.

The CNF/DNF Boolean processor core 636 also requires a small amount of additional overhead since an extra instruction needs to be executed to set the type of Boolean expression being evaluated. This overhead is only incurred when the host architecture with which the CNF/DNF Boolean processor core 636 is used employs only a single condition bit. In the event that the CNF/DNF Boolean processor core 636 is used with a multiple condition bit host architecture, the CNF/DNF bit can be set in combination with the condition bit set-up circuitry, thus requiring only a single register load operation.

Other variations of a CNF, DNF or CNF/DNF Boolean processor core 436, 536, 636 are also possible. For example, it may not be necessary to include the address registers 442, 444, 544, 644 in the core itself. Instead, any of the Boolean processor cores 436, 536, 636 may take advantage of appropriate registers in the host architecture. Alternatively, the address registers 442, 444, 544, 644 may be replaced by a separate register (not shown), either within the host architecture or within the Boolean processor core 436, 536, 636, that can be set with a single instruction or a series of instructions and that subsequently sets or resets the values of the appropriate 1-bit registers in the core. Still further, the various 1-bit registers in the core may be set or reset directly with load instructions or any other register-modifying instruction from either the host architecture and/or the Boolean processor core 436, 536, 636.

The foregoing discussion of Boolean processor cores 436, 536, 636 generally assumes that the output of the core 436, 536, 636 is a direct update of the host architecture's program counter to the instruction address specified in either the next operation address register 442, end of operation address register 542 or next operation/end of operation address register 642 (as appropriate), or the end of OR register 444, the end of AND register 544, or the end of OR/AND register 644 (as appropriate). Alternatively, however, the output of the Boolean processor core 436, 536, 636 may result in the execution of an instruction by the host architecture that makes the value of any of the registers of the Boolean processor core 436, 536, 636 accessible to the host architecture. In yet another alternative, the output of the Boolean processor core 436, 536, 636 may be a feed to an interrupt in the host architecture triggered by the changing of any of the registers of the Boolean processor core 436, 536, 636. Other outputs or outcomes from the Boolean processor core 436, 536, 636 will also be apparent to those of ordinary skill in the art.

Inclusion of a Boolean processor core 436, 536, 636 in a host architecture has many advantages. Overall, use of a Boolean processor core 436, 536, 636 enables its host architecture to realize a savings in the number of instructions required to evaluate complex Boolean expressions in CNF, DNF, or both. This savings is achieved by adding short circuit capabilities into the hardware of the host architecture, thereby eliminating the need for the branch statements that are normally required to perform short circuiting. As a result, a host architecture with a Boolean processor core 436, 536, 636 can perform up to twice the number of calculations than without the Boolean processor core 436, 536, 636. Further, with a very small electrical footprint (for example, a CNF Boolean processor core 436 may require only 262 gates to support a 16-bit host architecture), a Boolean processor core 436, 536, 636 can be easily incorporated into a host architecture. In addition, because each Boolean processor core 436, 536, 636 utilizes the instruction set of its host architecture and does not require the addition of new instructions, each is capable of providing backward compatibility with all existing applications. Existing programs will simply ignore the presence of a core 436, 536, 636 unless they are recompiled to take advantage of the enhanced processing benefits.

An exemplary application for the Boolean processor 36 (FIGS. 3 and 4) is to manage the state of a set of devices, where the state of one or more devices may necessitate a change in one or more other devices. An example is a home alarm system: "If a door or window is opened while the system is armed, sound an alarm". The architecture provides a mechanism for a device to report information about itself, that is, its state information, and also a mechanism for changing the state of any device attached to the system. For example, a home automation and alarm system could constantly monitor the state of any number of devices in a house; from doors and windows, to lamps, to televisions, to VCRs. It provides a means for checking the open/closed status of doors and windows, checking whether or not an electrical device is on or off, and also changing the state of the devices (e.g., change the TV channel or turn a lamp on).

Another exemplary use for the Boolean processor 36 is for automobile automation. For example, a proximity sensor could be attached to a car. It is responsible for sensing how close the car is to an object. If the distance between the car and the object closes to within a predetermined distance, the proximity sensor reports a state of 'too close' to the Boolean processor 36. The Boolean processor 36 recognizes this state and initiates a state change to the brake system, thereby slowing the car until a safe distance is achieved.

As described above, the Boolean processor 36 is designed for monitoring and automation applications ranging from small to large-scale. These applications can range from home automation and alarm systems to aeronautical and automobile control systems. The Boolean processor 36 is capable of monitoring any type of device provided that the device meets the following criteria: it is capable of receiving an n-bit address from the processor 36 (this address is used by both the device and the processor 36 to recognize state reporting and enable state changes); it is capable of recognizing its address and reporting its state in an m-bit word, where m is the word size of the device stage storage unit (RAM) 64; and it is capable of recognizing its address and changing its operating state on demand. While the outbound portion of the communications between the processor 36 and the devices it controls is achieved via a direct connection, the inbound portion is achieved by a complementary architecture that polls devices for their states and loads the states in the RAM 64 of the processor 36. In order to meet the above listed requirements for using the processor 36 in practical applications, two complementary architectures have been designed: a device polling unit and a device interface unit.

Figure 31:
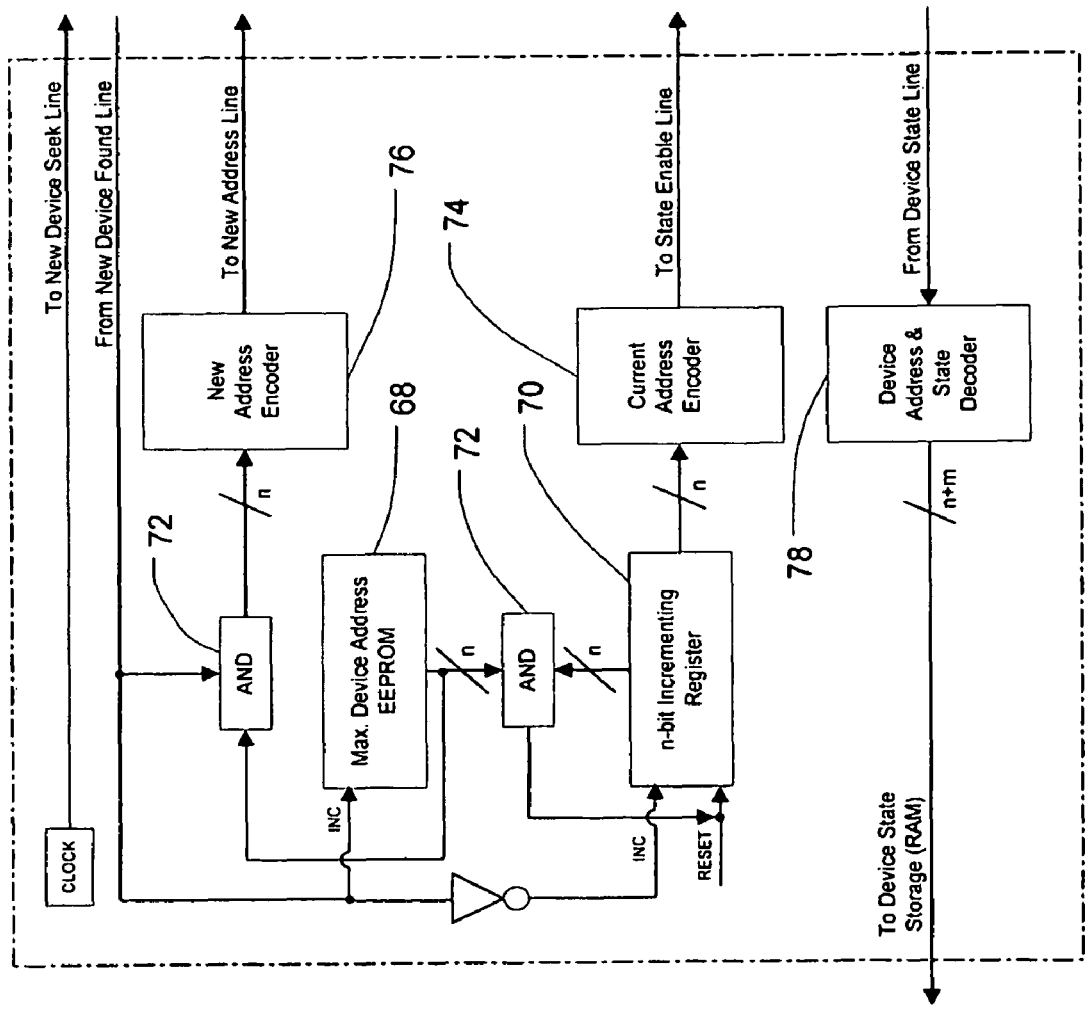
FIG. 31 is a schematic diagram of one embodiment of the architecture of the device polling unit of the present invention.

FIG. 31 is a schematic diagram of one embodiment of the architecture of the device polling unit 66 of the present invention. The device polling unit 66 functions as the main interface between the peripheral devices and the RAM 64. The device polling unit 66 is responsible for finding new devices, assigning device addresses, polling the devices for their current states, and updating the RAM 64 with those states. The device polling unit 66 includes a maximum device address electrically-erasable programmable read-only memory (EEPROM) 68, which stores the highest address of all known devices on the system. The maximum device address EEPROM 68 has an increment line, which increments its value by one whenever it is asserted. It also has n output lines, which constantly output its value. Its value is incremented when a new device is added to the system via the assertion of the new device found line. The device polling unit 66 also includes an n-bit incrementing register 70, which holds an n-bit number representing the current address of the device being polled. It has a reset line, which sets the register to zero when asserted. It also has an increment line and n output lines, which constantly output its value to an AND unit 72 and a current address encoder 74. If a new device is not found on the system, the negation of the new device found line asserts the increment line on the register, enabling it to cycle through and poll all of the attached devices by address. The device polling unit 66 includes two AND units 72. One unit allows the value of the maximum device address EEPROM 68 to be sent to a new address encoder 76 if the new address line has been asserted (i.e. a new device has been detected). The second AND unit 72 is used to reset the incrementing register 70 if it equals the maximum device address. The latter is used to conserve clock cycles. Without it, the register would reset upon overflow. In its absence, however, the design would work with n devices; it saves $2^n$–(# of attached devices) clock cycles each time it polls all of the attached devices. The device polling unit 66 includes two address encoders. These units are designed to take n bits in parallel and output them serially. One encodes new addresses, while the other encodes the address of the device being polled. The device polling unit 66 further includes a device address and state decoder 78, which accepts serial input in blocks of n+m bits, representing the device address and the state of the device, respectively, and outputs them in parallel to the RAM 64. It should be noted that the encoder and decoder are not mandatory, and are only required in the case that a serial bus device is used.

The device polling unit 66 operates in a continuous loop after it is started. First, it checks for new devices added to the system. If a new device is found (the new device found line is asserted), the device polling unit 66 assigns a system address to it. If a new device is not present in the system, the n-bit incrementing register 70 is incremented, the device polling unit 66 polls the device corresponding to the address in the incrementing register 70, and then copies the device's current state into the RAM 64. The loop is then repeated. Once the device polling unit 66 is running, it continues to loop, polling for new devices and retrieving device states.

The device polling unit 66 finds new devices by clocking (asserting) the new device seek line. If a new device exists, the new device found line is asserted, incrementing the maximum device address EEPROM 68 and activating the AND gate 72, which allows the address to pass into the new address encoder 76.

Device polling is achieved via the incrementing register 70, which constantly outputs its value to the current address encoder 74. It loops through all of the device addresses. The end of the series of devices is recognized when the current device address reaches the maximum device address. This is determined when the result of the current device address AND's with the maximum device address EEPROM's value, resetting the incrementing register 70 to zero. For each address, the device polling unit 66 asserts the state enable line, requesting the device's state. When a device detects its address on the state enable line, it outputs (e.g., serially) its address and state on the device state line. The device address and state decoder 78 then outputs the n+m bits (representing the device address and state, respectively) to the RAM 64.

Figure 32:
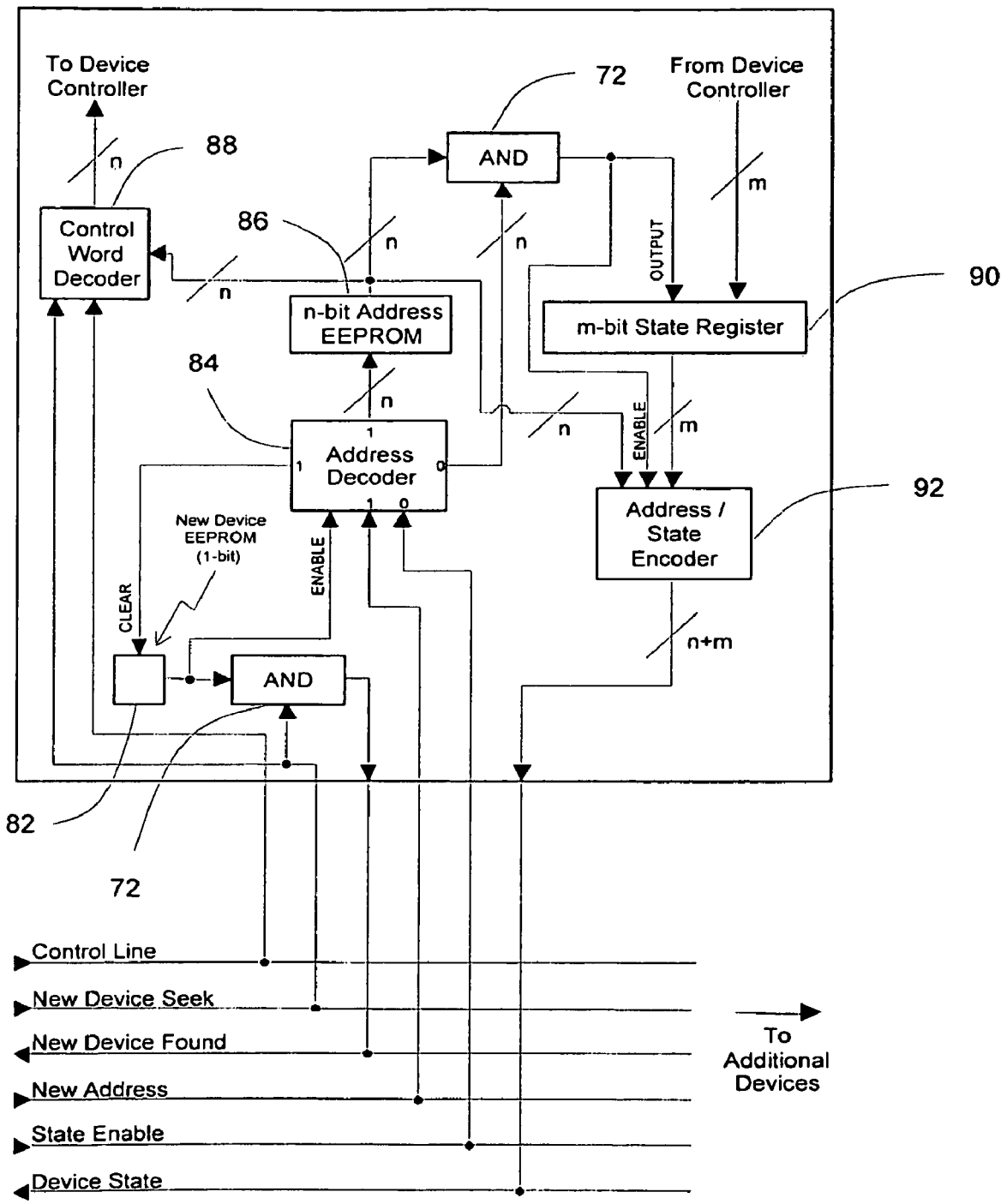
FIG. 32 is a schematic diagram of one embodiment of the architecture of the device interface unit of the present invention.

FIG. 32 is a schematic diagram of one embodiment of the architecture of the device interface unit 80 of the present invention. Each device that interfaces with the Boolean processor 36 (FIGS. 3 and 4) is assumed to be a relatively intelligent device that can accept an n-bit address and has up to m states. Accordingly, the device interface unit 80 includes a new device EEPROM 82, which is a 1-bit store that is set to one when the device is built. When the new device seek line is asserted, this bit (on a new device) will assert the new device found line. The device interface unit 80 also includes an address decoder 84. If the new device EEPROM bit is set, it will allow the address passed on the new address line to be placed in the n-bit address EEPROM 86 and then clear the new device EEPROM 82. Once the new device EEPROM 82 has been cleared, it will only pass addresses to the AND gate 72 that tests to see if the device is being asked for its state. The device interface unit 80 further includes a control word decoder 88, which reads the serial bits off of the control line. If the address matches the address in the address EEPROM, the control bits output to the device controller to change its state. It is reset via internal logic that counts the assertion of the new device seek line and resets every n+m clock cycles. The device interface unit 80 further includes the n-bit address EEPROM 86, which stores the address of the device and constantly outputs it, an m-bit state register 90, which holds the current state of the device and has an output enable line that allows it to output its value, and an address/state encoder 92, which accepts an n-bit address and an m-bit state and outputs them (e.g., serially) on the device state line.

The device interface unit 80 is designed to listen for the following assertions: New Device Seek, New Address, State Enable, and Control Line. The unit determines whether or not it has any work to do as a result of any such assertion. If so, it may assert any of the following back to the caller: New Device Found and Current State of the Device. When a device is attached to the bus, its value for the new device EEPROM 82 is set to '1'. This indicates that it has not yet been incorporated into the system. When the new device seek line is asserted, its value ('1') is passed to an AND gate 72 along with the value e1') for the new device EEPROM 82. If it is a new device, i.e. the result of the AND is the new device found line is asserted, informing the device polling unit 66 of the existence of a new device.

By default, the device interface unit 80 "listens" for a new address on the new address line. The assertion of the new device found line forces the device polling unit 66 to return the next device address. The new address is placed in the n-bit address EEPROM 86. The address decoder 84 then clears the new device EEPROM 82. The next time the device receives the new device seek line assertion, it does not assert the new device line. The device has now been assimilated. Once assimilated, the device may be polled for its state. During the polling phase of the device polling unit 66, each device is queried by its address. When queried, the device interface unit 80 recognizes its address and returns its current state. When the state enable line is asserted to the device, the address decoder 84 compares the address on the line with the device address stored in the address EEPROM 86. This comparison is performed via an AND gate 72. If the addresses match, then the request for state information is directed to this device. The positive result of the AND causes the output enable line to the state register to be asserted and the address/state encoder 92 to be enabled. The state information is sent to the address/state encoder 92. The address/state encoder 92 accepts the n-bit address and the m-bit state and outputs them serially or in parallel on the device state line(s).

If the Boolean processor 36 detects a combination of states that requires a change in another state, it will send the information over the control line. Each device interface unit accepts and reads the data from the asserted control line. The control word decoder 88 compares the incoming address to the address in the address EEPROM 86. If the addresses match, the request to make a state change is made to the current device. The control bits are then output to the device controller to initiate a change to its state.

Figure 33:
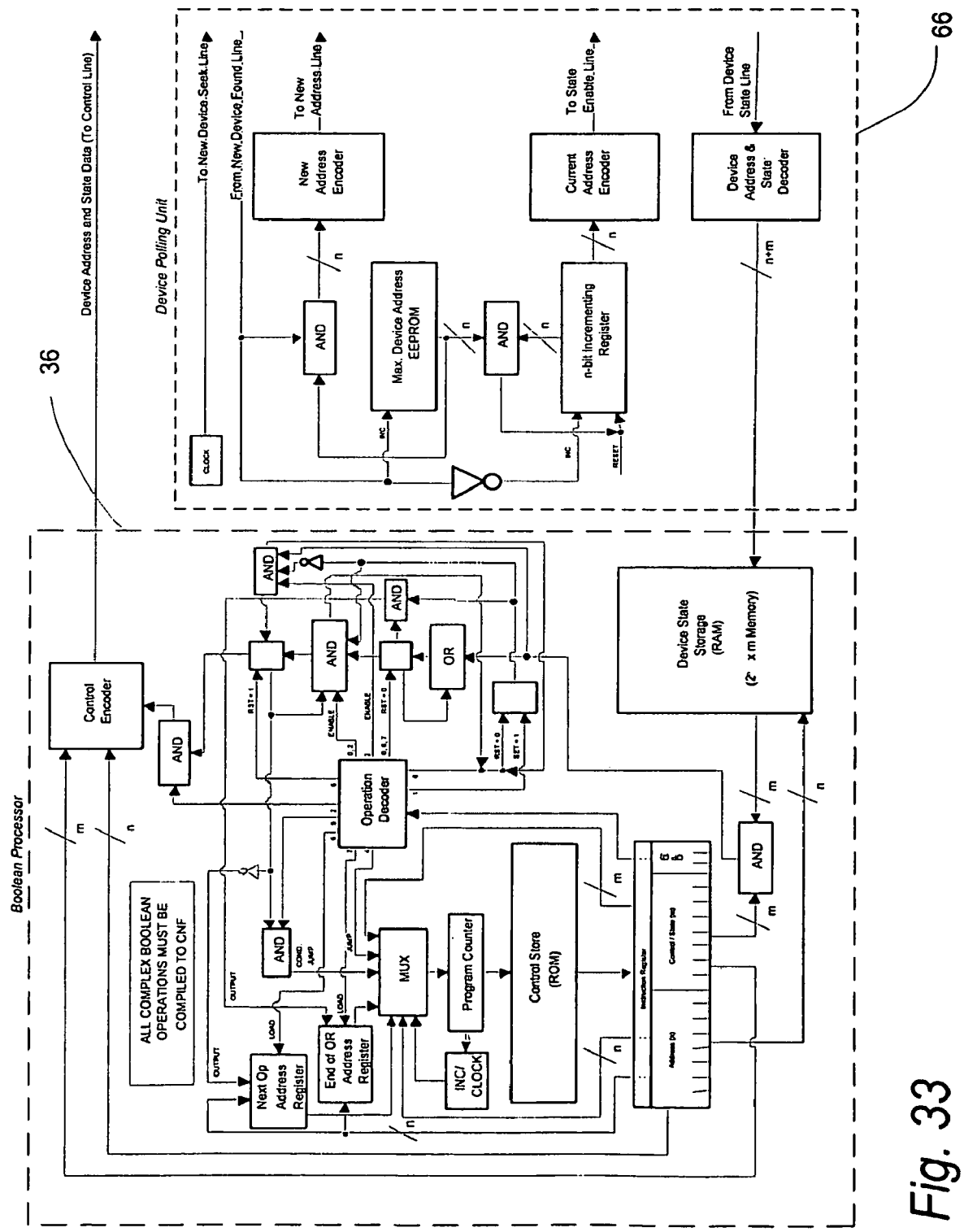
FIG. 33 is a schematic diagram of one embodiment of a system that includes the Boolean processor and the device polling unit of the present invention.
Figure 34:
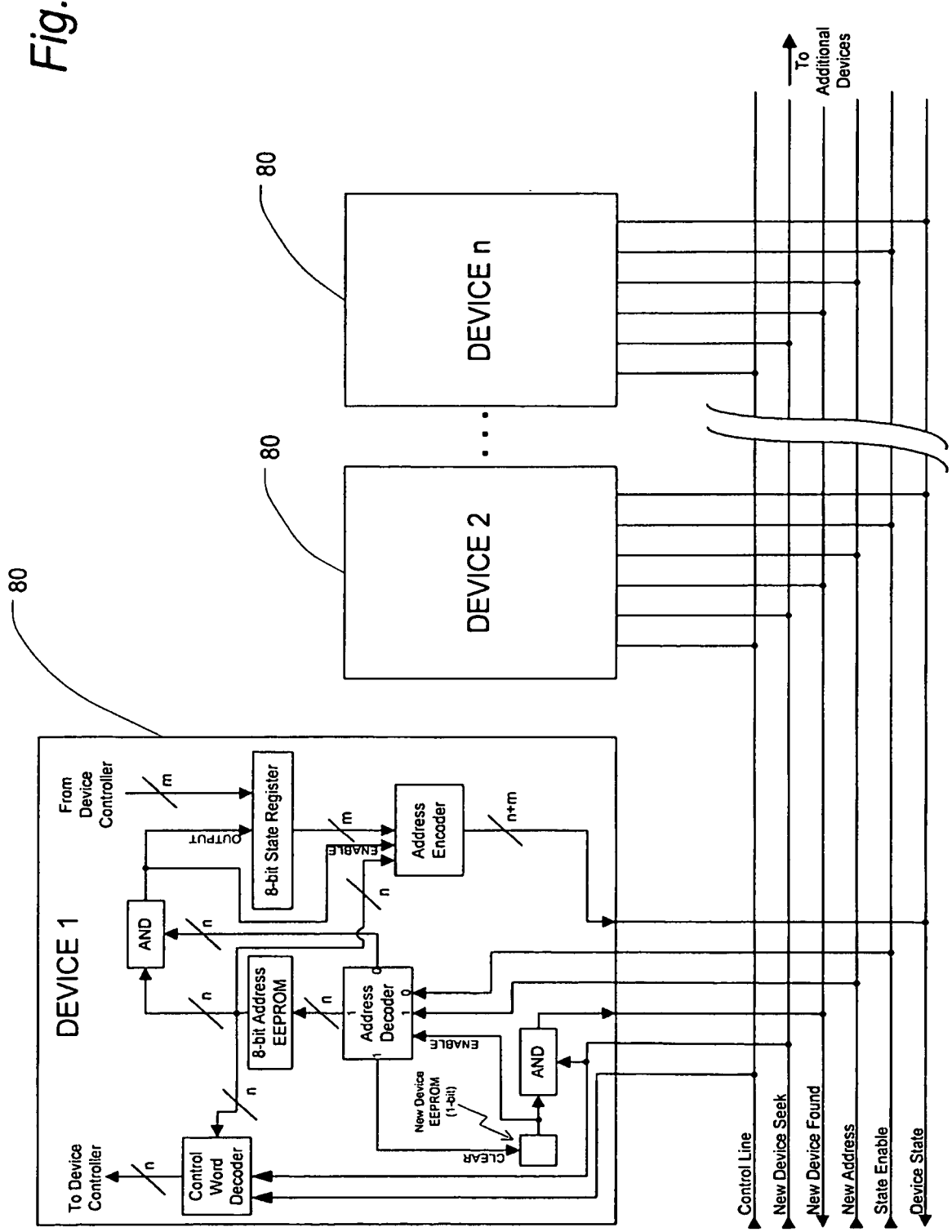
FIG. 34 is a schematic diagram of one embodiment of a system that includes n devices, each incorporating the device interface unit of the present invention.

FIG. 33 is a schematic diagram of one embodiment of a system that includes a CNF Boolean processor 36 and the device polling unit 66 of the present invention, and FIG. 34 is a schematic diagram of one embodiment of a system that includes n devices, each incorporating the device interface unit 80 of the present invention. Referring to FIGS. 33 and 34, one of the advantages of having a system including the Boolean processor 36, the device polling unit 66, and a plurality of devices 94 is that the slowest operation of the system, namely the polling of devices, is decoupled from the processing performed by the Boolean processor 36. This allows the Boolean processor 36 to run at full speed, unencumbered by the relative speed of the device polling unit 66 and the device bus.

Overall reliability and integrity of the data in the device state storage 64 may be enhanced by including additional logic designed to properly synchronize operation of the Boolean processor or processor core with the process of updating the state data in the device state storage 64. To ensure system accuracy, it is important that a memory location is not read while its contents are being modified. Doing so could result in erroneous results. To ensure that the aforementioned situation does not occur, the Boolean Processor architecture may be modified so that the processor either waits for the modification operation to end before reading a location in memory, or skips the operation. In the event that the value of the memory location is critical to the operation being performed by the system, putting the system in a wait state is preferable.

The addition of a wait state or skip operation can be achieved by adding some form of indicator, including, but not limited to, a single bit added to each memory location, that will indicate whether or not a memory location is in the process of being modified. The processor will then wait for the modification to end before accessing the location or skip the reading of the location.

Additionally, the processor may write state change information directly across a bus to devices attached to it. FIG. 35 is a high-level block diagram illustrating a first approach for ensuring data integrity in a Boolean processor system. The processor may be designed to process its micro-program at a much faster rate than its devices operate. In the event that two or more device states are changed in a timeframe that is shorter than the time required to update a device's state, a buffer 61, as illustrated in FIG. 35, will need to be used to store state change commands until the bus is clear. Once an update message has been sent, the next message in the buffer 61 may be sent. To ensure system accuracy, the single bit in RAM, mentioned above, that indicates that the state of the corresponding device is being modified can be set to true to prevent the system from reading an expired state from device state storage.

Another method for updating device states would be the addition of another RAM module 63 that will store updated states. FIG. 36 is a high-level block diagram illustrating a second approach for ensuring data integrity in a Boolean processor system. The Boolean processor would write state updates to that module 63. The devices could then request their own updated states from the RAM module 63. This configuration would operate similarly to the configuration described above except that instead of having device states "pushed" out to the devices via the control encoder 62, devices would "pull" their states from the additional RAM module, as illustrated in FIG. 36.

An exemplary Boolean processor-based system is a home automation/alarm system. The Boolean processor 36 monitors and controls, for example, 256 devices (n=8), each device having, for example, 256 states (m=8). The system includes, for example, a door, a window, a lamp, and a motion detector. In addition to these units, the system uses a clock, an arm/disarm unit, and a siren. Although the majority of possible device states and control words are not used in this example, the full eight bits for addressing, state reporting, and state changes are used. Each device functions as follows:

| Device | States/Control Functions | 8-bit value |
| --- | --- | --- |
| Door Sensor | Open | 00000000 |
| (System Address = 00000001) | Closed | 00000001 |
| Window Sensor | Open | 00000000 |
| (System Address = 00000010) | Closed | 00000001 |

-continued

| Device | States/Control Functions | 8-bit value |
| --- | --- | --- |
| Motion Detector | No Motion | 00000000 |
| (System Address = 00000011) | Motion Occurring | 00000001 |
| Lamp | Off | 00000000 |
| (System Address = 00000100) | On | 00000001 |
|  | Turn Off | 00000000 |
|  | Turn On | 00000001 |
|  | Flash | 00000010 |
|  | Stop Flashing (return to pre-flash state) | 00000011 |
| Clock | Get Current Time | Value |
| (System Address = 00000101) | Ex: | corresponds |
|  | 12:30 am = 00000011 | to 10 minute |
|  | 10:10 am = 00111101 | increments from 00:00. |
| Arm/Disarm Unit | System Disarmed | 00000000 |
| (System Address = 00000110) | System Armed | 00000001 |
|  | Disarm System | 00000000 |
|  | Arm System | 00000001 |
| Siren | Off | 00000000 |
| (System Address = 00000111) | On | 00000001 |

In addition to the above assumptions, it is assumed that a personal computer (PC) is interfaced with the system and is used to translate code into micro-code and to load the control store. The home automation/alarm system functions as follows: at 6:00 am, disarm the alarm system; at 8:30 am, arm the alarm system; at 5:00 pm, disarm the alarm system; at 5:30 pm, turn the lamp on; at 10:30 pm, arm the alarm system; and at 10:30 pm, turn the lamp off.

If the alarm system is armed and the door or window is open, the siren sounds and the light flashes until the alarm system is disarmed. The high-level code entered into the PC is as follows:

```
10: if time = 6am then arm/disarm = disarm;
    if time = 8:30am then arm/disarm = arm;
    if time = 5pm then arm/disarm= disarm;
    if time = 5:30pm then lamp = on;
    if time = 10:30pm then arm/disarm = arm;
    if time = 10:30pm then lamp = off;
    if arm/disarm = armed and (door = open or window = open) then
        while arm/disarm = armed
            siren = on;
            lamp = flash;
        end while;
    go to 10;
```

The compiled micro-program for this functionality is illustrated in Table 7.

TABLE 7

| Control Store Address | Instruction Register Address | Control/State | Opcode | Functionality |
| --- | --- | --- | --- | --- |
| 00000000 | 00000011 | 00000000 | 110 | Start of Boolean expr. |
| 00000001 | 00000101 | 00100100 | 000 | Time = 6 am? (AND) |
| 00000010 | 00000110 | 00000000 | 010 | Disarm system if TRUE. |
| 00000011 | 00000101 | 00000000 | 110 | Start of Boolean expr. |
| 00000100 | 00000101 | 00110011 | 000 | Time = 8:30 am? (AND) |
| 00000101 | 00000110 | 00000001 | 010 | Arm system if TRUE |
| 00000110 | 00001001 | 00000000 | 110 | Start of Boolean expr. |
| 00000111 | 00000101 | 01100110 | 000 | Time = 5 pm? (AND) |
| 00001000 | 00000110 | 00000000 | 010 | Disarm system if TRUE |
| 00001001 | 00001100 | 00000000 | 110 | Start of Boolean expr. |
| 00001010 | 00000101 | 01101001 | 000 | Time = 5:30 pm? (AND) |
| 00001011 | 00000100 | 00000001 | 010 | Turn lamp on if TRUE |
| 00001100 | 00001111 | 00000000 | 110 | Start of Boolean expr. |

TABLE 7-continued

| Control | Instruction Register | | | |
|---|---|---|---|---|
| Store Address | Address | Control/ State | Opcode | Functionality |
| 00001101 | 00000101 | 10000111 | 000 | Time = 10:30 pm? (AND) |
| 00001110 | 00000110 | 00000001 | 010 | Arm System if TRUE |
| 00001111 | 00010010 | 00000000 | 110 | Start of Boolean expr. |
| 00010001 | 00000101 | 10000111 | 000 | Time = 10:30 pm? (AND) |
| 00010001 | 00000100 | 00000000 | 010 | Turn lamp off if TRUE |
| 00010010 | 00011001 | 00000000 | 110 | Start of Boolean expr. |
| 00010011 | 00000110 | 00000001 | 000 | System Armed? (AND) |
| 00010100 | 00010111 | 00000000 | 111 | Start of Conjunct |
| 00010101 | 00000001 | 00000000 | 001 | Door Open? (OR) |
| 00010110 | 00000010 | 00000000 | 001 | Window Open? (OR) |
| 00010111 | 00000111 | 00000001 | 010 | Turn Siren on if TRUE |
| 00011000 | 00000100 | 00000010 | 010 | Flash lamp if TRUE |
| 00011001 | 00011101 | 00000000 | 110 | Start of Boolean expr. |
| 00011010 | 00000110 | 00000000 | 000 | System Disarmed? (AND) |
| 00011011 | 00000111 | 00000000 | 010 | Turn siren off |
| 00011100 | 00000100 | 00000011 | 010 | Stop flashing lamp |
| 00011101 | 00000000 | 00000000 | 100 | Loop to beginning of control store |

Figure 37:
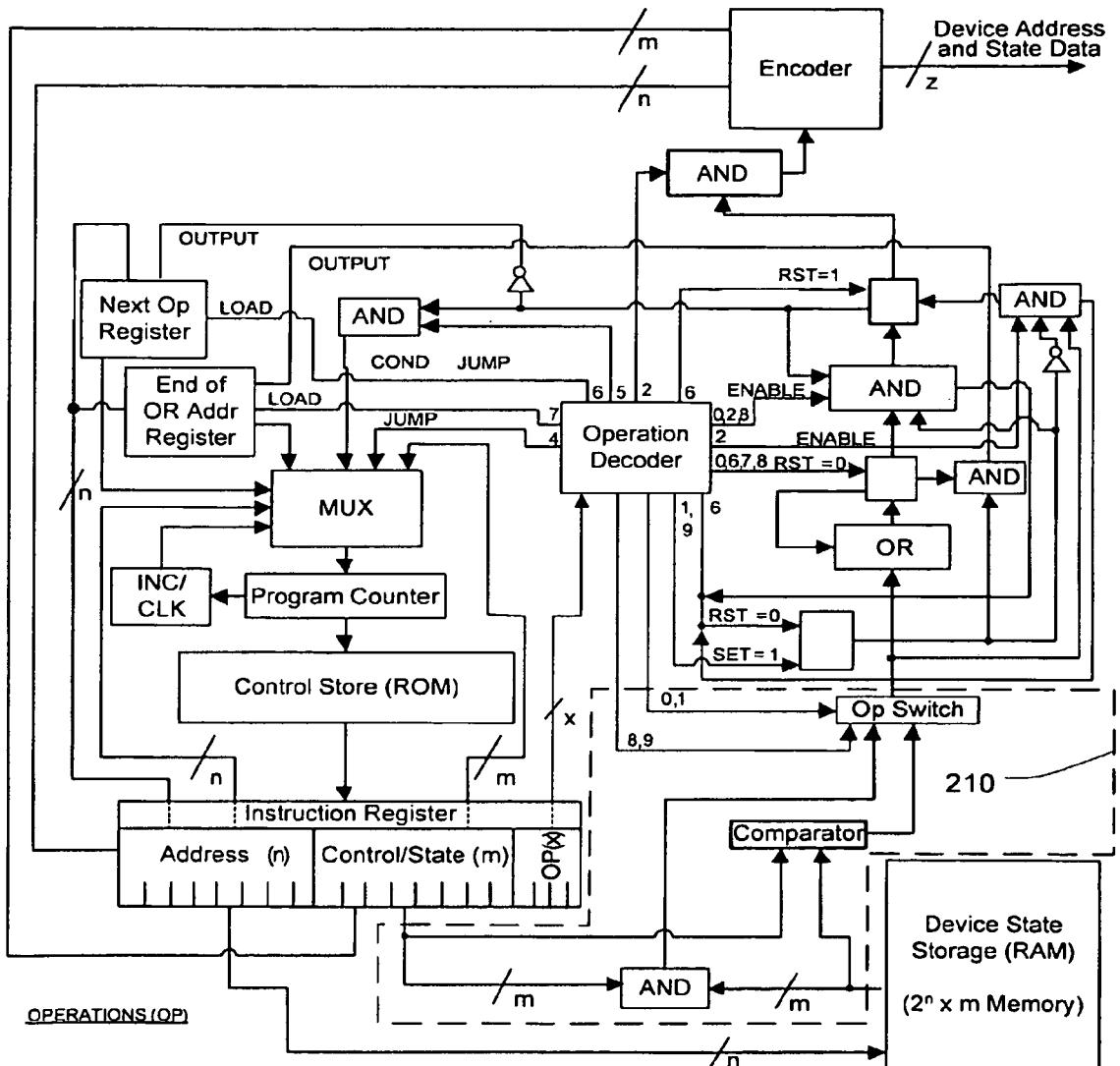
FIG. 37 is a schematic diagram of a CNF Boolean processor having a first enhanced logic unit in accordance with another preferred embodiment of the present invention.
Figure 38:
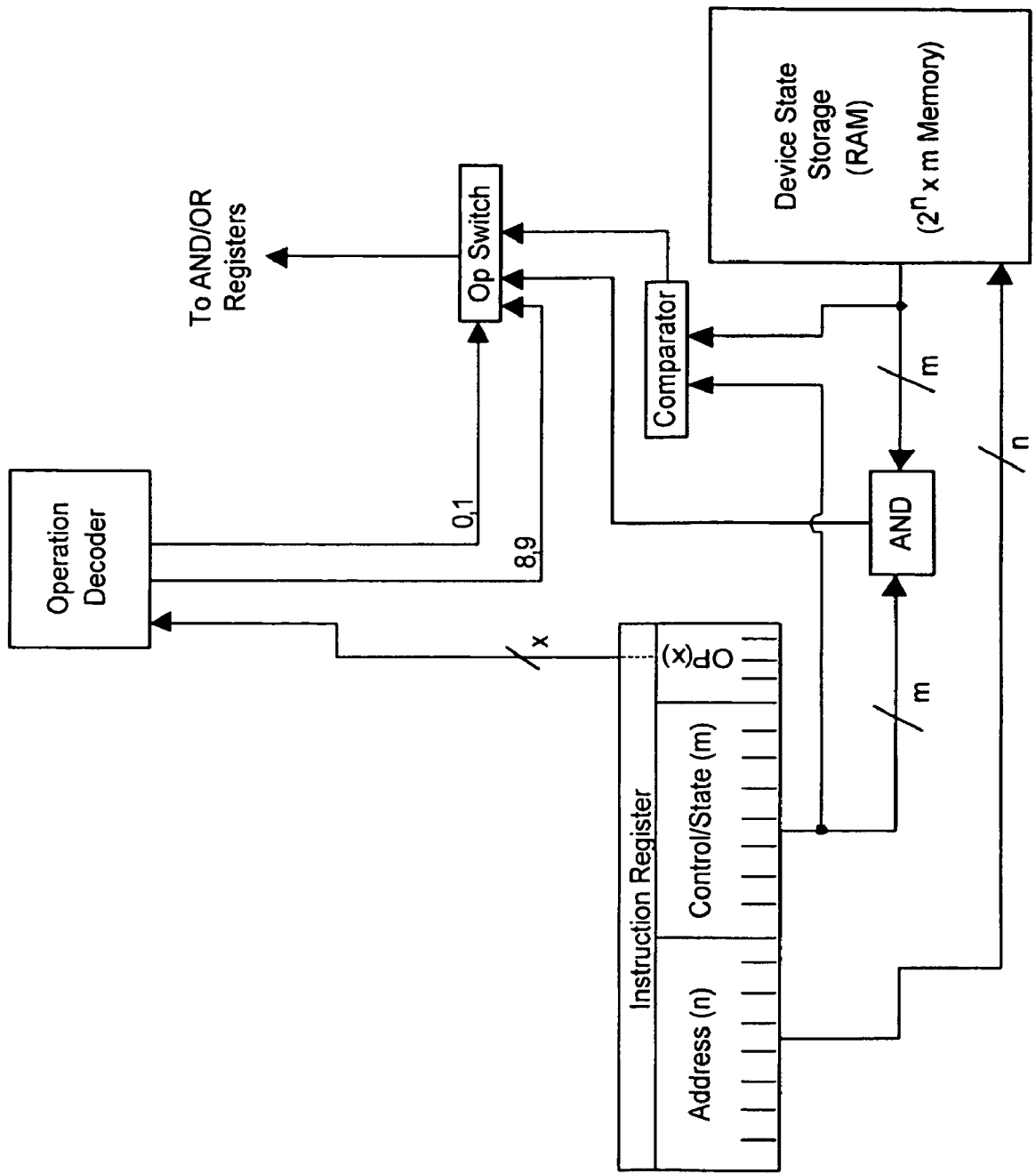
FIG. 38 is an enlarged schematic diagram of a portion of the Boolean processor of FIG. 37.

The performance of a Boolean processor 36, 136 may be further enhanced by the inclusion of an enhanced logic unit 210, 310 capable of providing such additional functionality as comparing a device state to a threshold value, comparing one device state (or the value from one memory location) to another device state or value from memory, loading a value directly into a particular memory location, or the like, or a combination thereof FIG. 37 is a schematic diagram of a CNF Boolean processor 236 having a first enhanced logic unit 210, and FIG. 38 is an enlarged schematic diagram of a portion of the CNF Boolean processor 236 of FIG. 37. The first enhanced logic unit 210 may incorporate one of the AND gates 50 along with a comparator 211 and a switch 213. The operation of the switch 213 is controlled by the operation decoder 60 such that the switch 213 passes the output of either the AND gate 50 or the comparator 211 to the OR gate 52, depending on the control input received from the operation decoder 60. As with the Boolean processors 36, 136 of the previous embodiments, the AND gate 50 simply indicates whether a device state value (the value from a memory location) is equal to a specific value received from the control/state portion of the instruction register 40. On the other hand, the comparator 211 is a simple device that compares a device state value to a threshold value, likewise received from the control/state portion of the instruction register 40, to determine whether the device state value is greater than (or, depending on how the comparator 211 is implemented, less than, greater than or equal to, or less than or equal to) the threshold value. This information is then reflected in the output of the comparator 211, which is generally a single bit.

In order to utilize this additional functionality, two new instructions, represented by two new operation codes (Op Codes 8 and 9) may be provided. Op Code 8 (AND Compare) enables the AND gate 50 that loads the AND register 54 in the event that the conditional state of the device at the address specified in the instruction register 40 meets the threshold requirement specified by the value in control/state portion of the instruction register 40. Op Code 9 (OR Compare) sets the value of the OR conjunct register 58 to one, which enables short-circuiting (based on a threshold being met) within a conjunct containing OR clauses. As perhaps most easily understood from FIG. 38, it will be appreciated that the operation of these two instructions is similar to the operation of the instructions represented by Op Codes 0 and 1, respectively (Boolean AND and Boolean OR), except that AND Compare and OR Compare utilize a threshold comparison instead of an examination for exact equality. The comparator 211 and the adjacent AND gate 50 each receive the same input data, from the instruction register 40 and the device state storage 64, respectively, and their respective outputs are used in the same way that the output of the AND gate 50 is in the other embodiments of the Boolean processor 36, 136. The only difference is in which input source (the AND gate 50 or the comparator 211) is provided as an output to the rest of the processor 236, as controlled by the operation decoder 60 on the basis of the operation code.

It will also be appreciated that the inclusion of two new Op Codes may require an increase in the size of the operation code portion of the instruction register 40, such as from 3 bits to 4 bits. Alternatively, however, the two new instructions proposed here may replace Op Codes 0 and 1 respectively, since their operation is so similar, as described previously.

Figure 39:
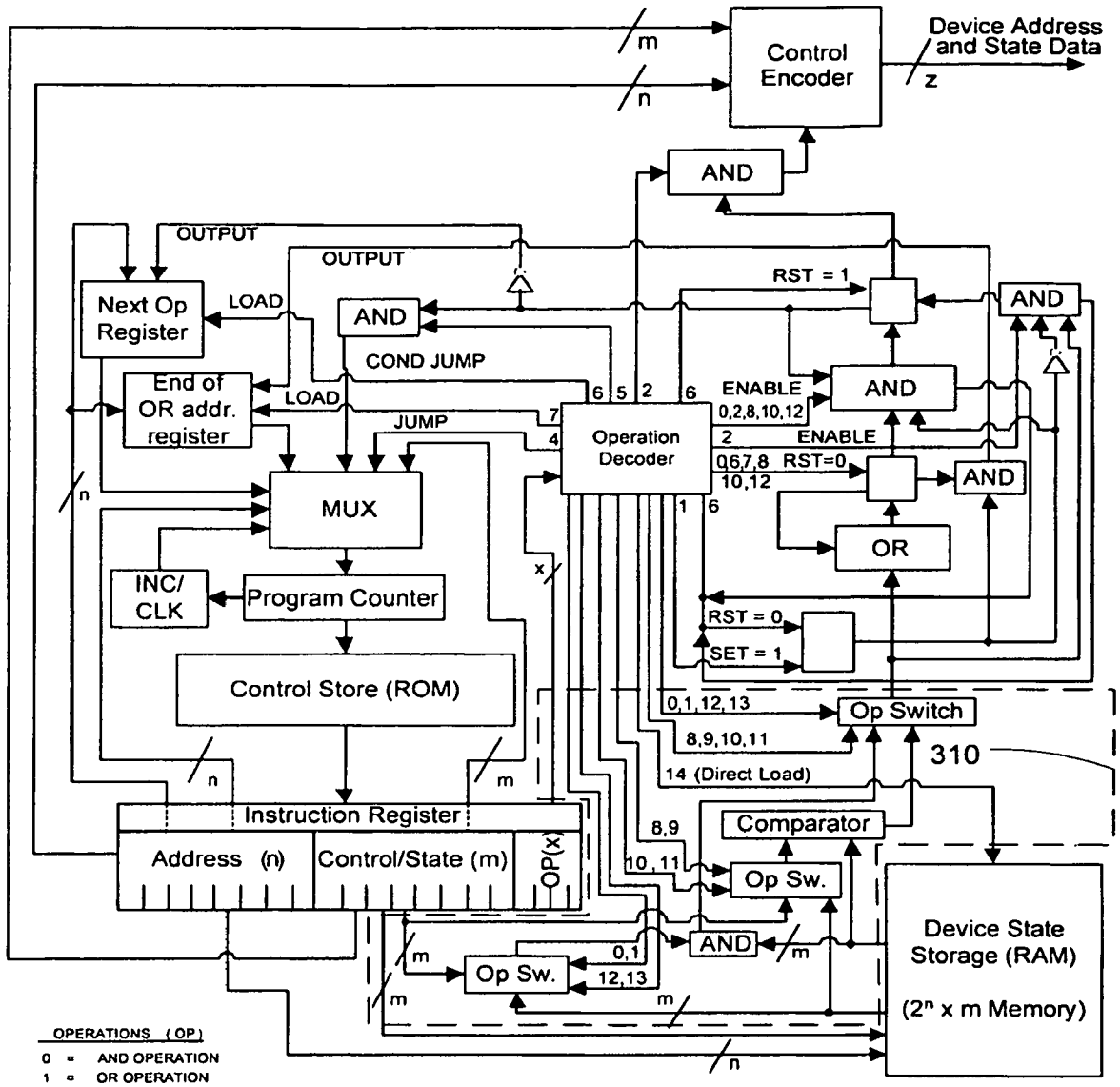
FIG. 39 is a schematic diagram of a CNF Boolean processor having a second enhanced logic unit in accordance with another preferred embodiment of the present invention.
Figure 40:
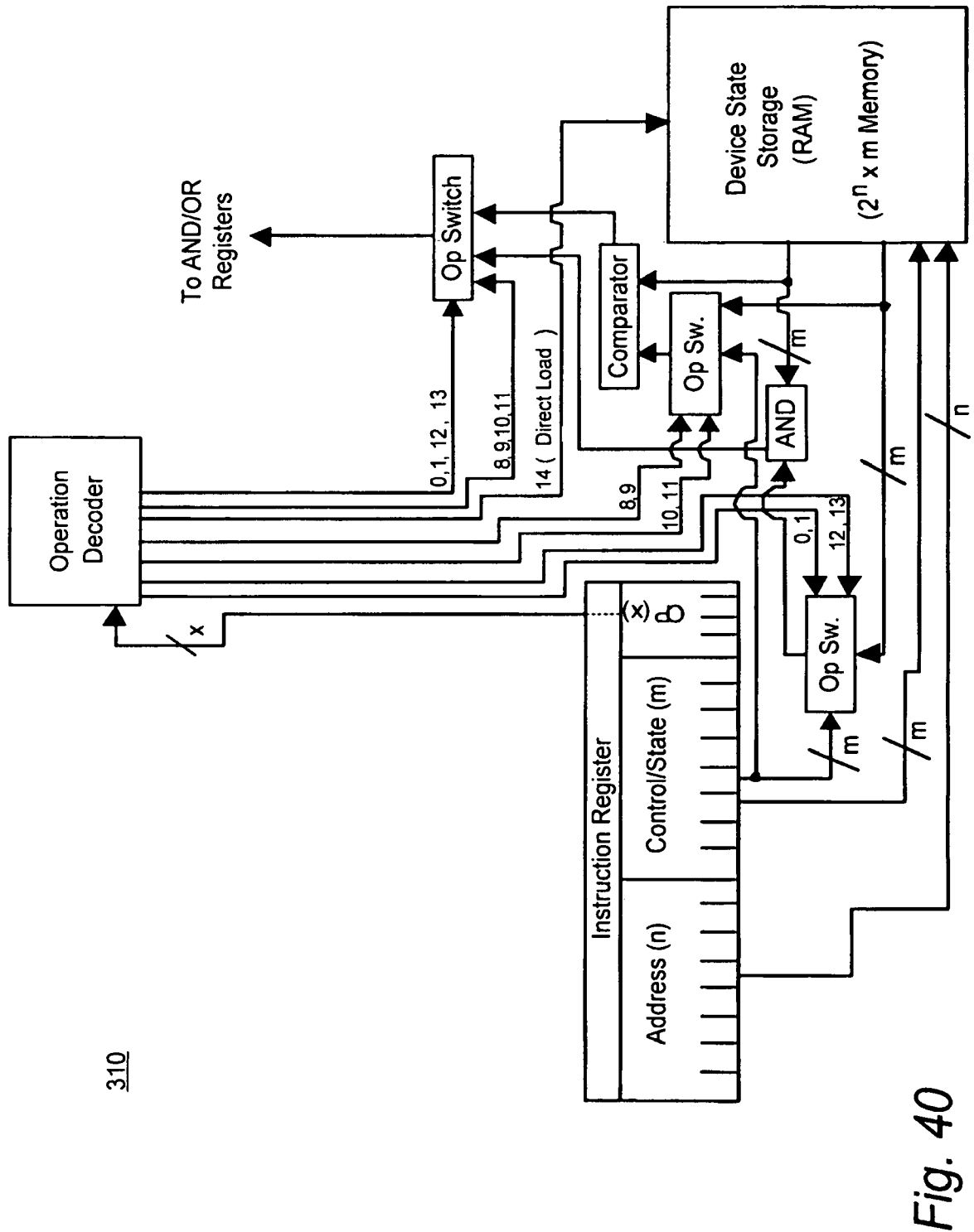
FIG. 40 is an enlarged schematic diagram of a portion of the Boolean processor of FIG. 39.

FIG. 39 is a schematic diagram of a CNF Boolean processor 336 having a second enhanced logic unit 310, and FIG. 40 is an enlarged schematic diagram of a portion of the CNF Boolean processor 336 of FIG. 39. The second enhanced logic unit 310 may incorporate the AND gate 50, the comparator 211 and the switch 213 of the first enhanced logic unit 210 as well as two additional switches 315, 317. Each switch 315, 317 is arranged to receive input from both device state storage 64 and from the control/state portion of the instruction register 40. The output of one switch 315 is connected to an input of the AND gate 50, while the output of the other switch 317 is connected to an input of the comparator 211. Like the first switch 211, the operation of the additional switches 315, 317 are controlled by the operation decoder 60, such that each switch 315, 317 passes on either the data from the instruction register 40 or the device state storage 64. The output from one of the switches 315 is passed to the AND gate 50, while the output from the other switch 317 is passed to the comparator 211.

Like the first enhanced logic unit 210, the second enhanced logic unit 310 is capable of both determining whether two input values are equal to each other and determining whether on input value meets a threshold requirement established by a second input value. In the first enhanced logic unit 210, however, only one of the input values is a device state from device state storage 64, while the second input value is received directly from the control/state portion of the instruction register 40. In the second enhanced logic unit 310, on the other hand, one device state from the device state storage 64 may be compared to a second device state using either the AND gate 50 or the comparator 211. Finally, as with the first enhanced logic unit 210, the original switch 213 is controlled by the operation decoder 60 such that the switch 213 passes the output of either the AND gate 50 or the comparator 211 to the OR gate 52, depending on the control input received from the operation decoder 60. This is perhaps most easily understood with reference to FIG. 40.

The second enhanced logic unit 310 also includes an additional feature. As shown in FIGS. 39 and 40, a direct connection 319 exists between the control/state portion of the instruction register 40 and the device state storage 64. This connection permits a value to be loaded directly from the control/state portion of the instruction register 40 to the device state storage 64.

FIGS. 41 and 42 are enlarged schematic diagrams of portions of two different Boolean processors 736, 836 having a direct connection 319 for facilitating inter-device communication via the device state storage 64. Each processor 736, 836 used a direct connection 319, similar to that shown in FIGS. 39 and 40, to provide the state of any device to any other device in the system. As shown in FIG. 41, an extra instruction may be provided to facilitate this transfer by signaling the device state storage 64 or combinatorial logic (not shown) associated therewith. Alternatively, as shown in FIG. 42, an extra bit 35 may be added to the instruction register 40 in order to indicate that the value in the control/state portion of the instruction register 40 is either a direct value or the address of another device. In the latter case, the state of the memory location corresponding to the source device would be sent to the memory location corresponding to the target device.

In order to utilize all of this additional functionality, five new instructions, represented by five new operation codes (Op Codes 10, 13, 14 and 15) may be provided. Op Code 10 (AND Compare Memory to Memory) and Op Code 11 (OR Compare Memory to Memory) are similar to Op Code 8 (renamed AND Compare w/Immediate Value) and Op Code 9 (renamed OR Compare w/Immediate Value), respectively, except that the comparisons are between two values from device state storage 64, rather than between one value from device state storage 64 and one value from the control/state portion of the instruction register 40. Op Code 12 (Boolean AND, Memory to Memory) and Op Code 13 (Boolean OR, Memory to Memory) are similar to Op Code 0 and Op Code 1, respectively, except that the tests for equality are made between two values from device state storage 64, rather than between one value from device state storage 64 and one value from the control/state portion of the instruction register 40. Op Code 14 (Load Memory w/Immediate Value) loads the current value in the control/state portion of the instruction register 40 into the memory location indicated by the current value of the address portion of the instruction register 40. This latter instruction, coupled with the physical connection described previously, simplifies the process of loading a value into device state storage 64. Without this instruction, loading a value into device state storage 64 would require the evaluation of a simple CNF expression in which the outcome is true, followed by an end of operation instruction (Op Code 2) that would update the location in device state storage 64. Finally, Op Code 15 (Load Memory w/Device State) accepts the addresses of two devices (between which state information is to be transferred) and facilitates the exchange of state data as shown in FIG. 41.

It will be appreciated that the inclusion of five new Op Codes may not require an increase in the size of the operation code portion of the instruction register 40, relative to the size required by the first enhanced logic unit 210, if the operation code portion already requires 4 bits, since 4 bits will support up to a total of 16 operation codes. However, although not illustrated herein, it will also be appreciated that the Boolean OR/Memory to Memory and Boolean AND/Memory to Memory instructions (Op Code 12 and Op Code 13, respectively) may be utilized even without the presence of the comparator 211 and the four "Compare" instructions (Op Codes 8, 9, 10 and 11), and without the presence of the direct connection between the control/state portion of the instruction register 40 and the device state storage 64 and the "Load Memory" instruction (Op Code 14). Finally, although likewise not illustrated herein, it will further be appreciated that the "Compare" instructions, the "Memory to Memory" instructions, or both may be utilized in a DNF Boolean processor 136 in the same manner as with the CNF processor 36 illustrated in FIGS. 37-40.

With regard to the present invention, it is apparent that there has been provided a Boolean processor. The architecture of the Boolean processor is optimized for monitoring and automation applications. The relatively small instruction set and design of the Boolean processor provide an instruction savings of up to about 87.5% in relation to typical microprocessor and microcontroller instruction sets. These instruction savings, and simple design provide the Boolean processor with high speed, in terms of instructions, as compared to other general-purpose architectures performing similar functions. In addition to efficiency, the architecture of the Boolean processor is scalable. For example, if the Boolean processor is built with 32-bit addresses and 32-bit states, it can handle over about 4 billion (232) devices, each with over about 4 billion possible states. The speed and scalability of the architecture of the Boolean processor make it a good candidate for large, critical applications, such as aeronautical and automotive monitoring, control, and automation applications.

As the number of sensors, or devices, increases, so does the amount of wiring required for communications. Thus, serial communications may be used with the Boolean processor. Another advantage of the architecture of the Boolean processor is that it may be fitted with either a parallel or serial communications bus.

Multiple Boolean processors may also be employed for greater efficiencies. For example, multiple Boolean processors 36, 136 or processor cores 436, 536, 636 may be used in parallel to evaluate complex CNF or DNF expressions in a divide-and-conquer type mode. In the case of CNF, the expression's conjuncts would be distributed to the different processors for evaluation. In the event that a conjunct, or series of conjuncts, resulted in a false evaluation, the processor upon which the conjunct(s) were being evaluated would signal the other processors that the entire operation was false, thereby causing the next Boolean expression to be distributed among the processors for evaluation. Similarly, in the case of DNF, the expression's disjuncts would be distributed to the different processors for evaluation. In the event that a disjunct, or series of disjuncts, resulted in a true evaluation, the processor upon which the disjunct(s) were being evaluated would signal the other processors that the entire operation was true, thereby causing the operation that executes upon a true result to be executed as well as the next expression to be distributed among the processors for evaluation.

Instances of both CNF and DNF Boolean processors may also be intermingled to handle expressions. For example, FIG. 43 is a high-level block diagram illustrating the use of Boolean processors 36, 136 in a parallel processing environment. In this illustration, two DNF Boolean processors 136 and one CNF Boolean processor 36 may be utilized to the following CNF expression:

If (A or B or C or D) and (E or F or G) and H then I where A, B, C, D, E, F, G, and H are terms of the form x=y and where x represents a device state and y represents a value for comparison. The two DNF Boolean processors 136 could be employed to evaluate the first two conjuncts since each conjunct represents a DNF expression in its most simple form (i.e., comprised entirely of single term disjuncts). The final values from the DNF Boolean processors as well as the evaluation of H could then be rolled into a CNF Boolean processor 36 as shown in FIG. 43.

A plurality of Boolean processors may also be used in conjunction with different but related systems, each employing a Boolean processor designed to handle a large number of sensors or devices specific to the given system. The individual systems can communicate via another, smaller Boolean processor that is linked to each of the systems as one of their devices. The smaller Boolean processor handles interactions among the systems. For example, consider a braking system and a speedometer system in an automobile. The braking system can be outfitted with numerous devices and sensors to control the application of the brakes, monitor temperature, and monitor pad wear, to name a few. Other systems in the car may only need to know whether or not the brakes are being applied and whether or not there is a problem with the entire braking system. The speedometer system can also be outfitted with numerous devices and sensors for monitoring its own health. Like the braking system, it only needs to communicate speed and generic warnings to the other systems in the car. Because each device only needs to communicate two states, a smaller Boolean processor with a smaller bus that controls the interaction between these systems can be used, thereby saving wiring weight and confining complex communications infrastructure to small areas of the vehicle.

Another potential use for the Boolean processor is as an interrupt controller. A Boolean processor-based controller can enable a microprocessor to be interrupted by an almost limitless number of devices. The Boolean processor acts as an "interrupt broker" for the devices attached to it.

Although the Boolean processor of the present invention has been described and illustrated with reference to preferred embodiments and examples thereof, other embodiments and examples may be used and the following claims are intended to cover all such equivalents.

In a further embodiment, the Boolean Processor includes additional instructions. In one embodiment, the Boolean Processor includes a SET FUNCTION instruction. In another embodiment, the Boolean Processor includes a LOAD MEMORY instruction. In yet another embodiment, the Boolean Processor includes a BIT TOGGLE instruction. In a further embodiment, the Boolean Processor's instruction set is as shown in Table 8.

In one embodiment, the SET FUNCTION instruction is added to the architecture to allow the AND, OR, and LOAD operations to function with immediate values, values from memory, and equality, threshold, and bit evaluations. Boolean Processor instructions that are dependent upon the Set Function instruction may utilize the function specified in the most recently executed SET FUNCTION instruction. In another embodiment, compiler optimization includes consideration for grouping like operations together to minimize the number of SET FUNCTION calls in a compiled/assembled microprogram.

One of the benefits of the SET FUNCTION instruction is that it keeps the operation bits of the Instruction Register (IR) to 4 bits. In various embodiments, the functionality of the combinations of the SET FUNCTION operations and the AND, OR, and LOAD operations can easily be combined into single op codes. Such an embodiment would result in seven additional codes, bringing the total to seventeen and forcing the OP code portion of the IR to 5 bits. It may be advantageous, in certain applications of the architecture, to fully expand the instruction set and widen the OP code portion of the IR to 5 bits.

In one embodiment, the LOAD MEMORY instruction loads a location in memory with either an immediate value or a value from memory. The value from memory may be determined by the most recently executed SET FUNCTION instruction.

In another embodiment, the BIT TOGGLE instruction toggles the specified bit of the value in the specified address to its opposite value. The BIT TOGGLE instruction may allow bit manipulation to be performed. In some embodiments, this enables the Boolean Processor to toggle any bit in a register (device).

TABLE 8

| Op Code | Name | Assembler Code | Description |
|---|---|---|---|
| 0 | AND Operation | AND | Compares the state (value) of a device/memory location with the type of value specified by the most recently executed Set Function instruction and sets the AND register accordingly. |
| 1 | OR Operation | OR | Compares the state (value) of a device/memory location with the type of value specified by the most recently executed Set Function instruction and sets the OR register accordingly. |
| 2 | End of Operation | EOP | Indicates that a Boolean expression has ended and delivers state data to the device specified if the Boolean expression evaluates to TRUE (the AND register is set to true, or 1). |
| 3 | No Operation | NOP | No Operation. |
| 4 | Unconditional Jump | JMP | Jump to the address specified (PC = address). |
| 5 | Conditional Jump | JMPC | Jump to address specified if AND register is set to true, or 1 (PC = address). |
| 6 | Start of Operation | SOP | Initializes single bit registers and sets the End of Operation register to the value (address) specified. |
| 7 | Start of OR Conjunct | SORC | Indicates that a multiple term conjunct is beginning and sets the OR Conjunct Register to true and sets the End of OR Address Register to the value (address) specified. |
| 8 | Set Function | SF | Determines which type of operation is being performed. Possible operand values:<br>00 - Equality Comparison with Immediate Value<br>01 - Equality Comparison with Value in Memory<br>02 - Greater Than Comparison with Immediate Value<br>03 - Greater Than Comparison with Value in Memory<br>04 - Bit Test |
| 9 | Load Memory | LD | Loads a location in memory with either an immediate value or a value from memory (determined by the most recently executed Set Function instruction). |
| 10 | Bit Toggle | BIT | Toggles the specified bit of the value in the specified address to its opposite value. |

As an example, the following code tests a device to see if one of its bits is set. If it is set, the bit will be cleared. In this example, the device's address is 10 and the bit being tested is the 4th bit.

```
SOP   L1         // Start of Operation, short circuit to L1 if
                 // bit is not set.
SF    4          // Set function to bit test.
AND   10  4      // Bit 4 set? If not, a short-
                 // circuit occurs and the PC automatically
                 // jumps to L1
BIT   10  4      // Toggle bit 4. In this case, clear it.
L1    < Remainder of the micro-program >
```

Table 9 illustrates the total number of logic gates present in a variety of implementations. The gate counts listed in Table 9 assume that the number of address bits (n) is equal to the number of control bits (m) used in the system. These two values can change in different implementations (depending upon the number of devices supported and the number of possible states for each device), which results in varying gate counts. Gate count variations are discussed herein; in particular, see Column 5 of Table 11 for examples of gate count variations.

TABLE 9

| Program Counter Word Size (n + m) | Original Boolean Processor - Total Gates (NAND Equivalent) | Extended Boolean Processor (10 Instructions, Threshold Support) - Total Gates (NAND Equivalent) | Extended Boolean Processor (10 Instructions) with Extended Control Store Addressing & Threshold Support - Total Gates (NAND Equivalent) | Boolean Processor (11 Instructions) with Extended Control Store Addressing, Bit Manipulation, Load, & Threshold Support - Total Gates (NAND Equivalent) |
|---|---|---|---|---|
| 8-bit | 255 (603) | 291 (672) | 417 (986) | 542 (1237) |
| 16-bit | 439 (1053) | 521 (1206) | 773 (1834) | 986 (2271) |
| 32-bit | 807 (1953) | 1029 (2370) | 1533 (3626) | 1920 (4433) |
| 64-bit | 1543 (3753) | 2237 (5082) | 3245 (7594) | 3978 (9139) |
| 128-bit | 3015 (7353) | 5421 (12042) | 7437 (17066) | 8860 (20085) |
| 256-bit | 5959 (14553) | 14861 (32106) | 18893 (42154) | 21694 (48119) |

In some embodiments, control encoder of the original Boolean Processor is eliminated. For example, the device address and control bits may be delivered in parallel directly to the devices and to the Device State Storage (RAM). In some embodiments, the parallel address and control lines that carry the data make up the structure of the buses for the Boolean Processor.

Figure 44:
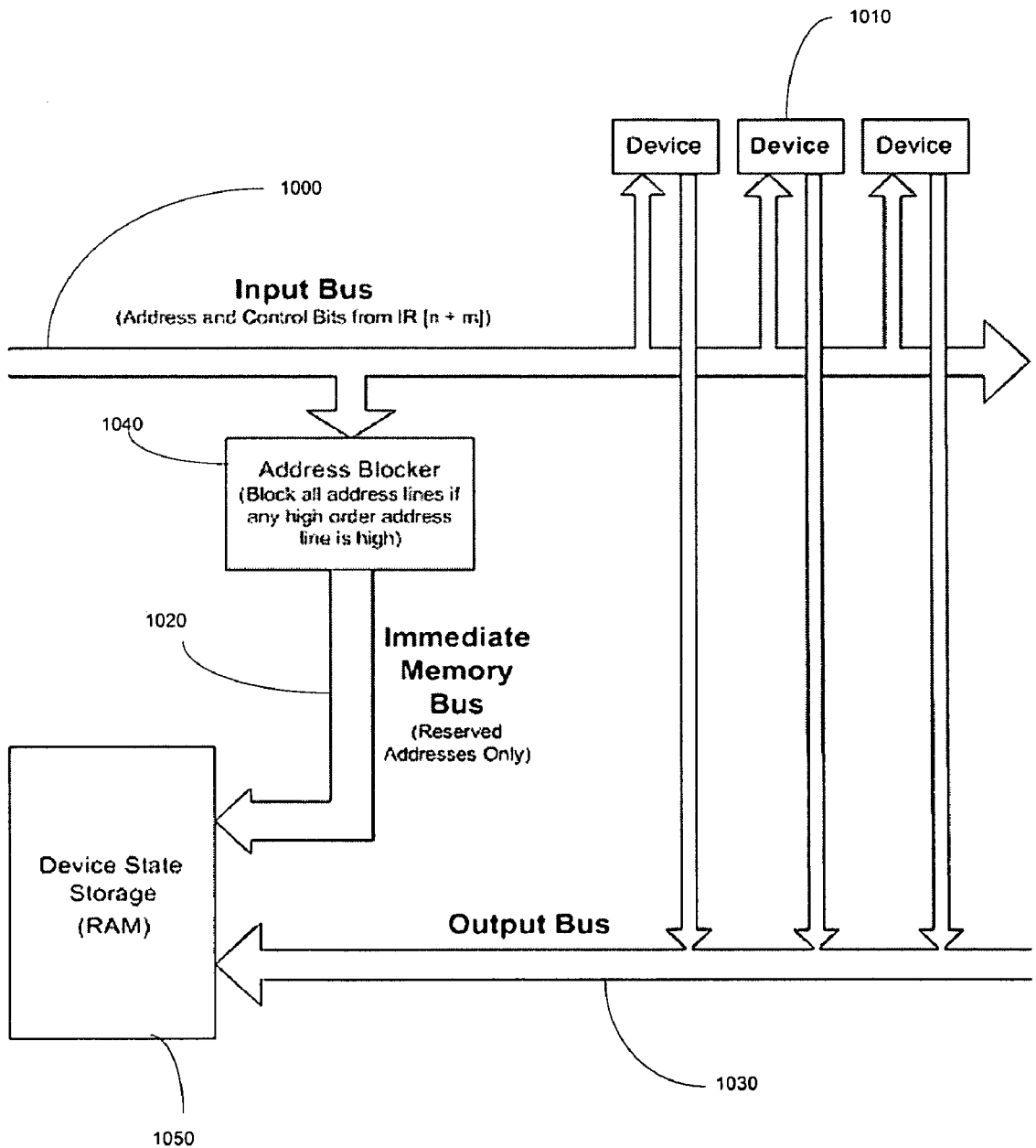
FIG. 44 is a diagram of a portion of a Boolean Processor in which the control encoder of the original Boolean Processor is eliminated and device address and control bits are delivered in parallel directly to the devices and to the Device State Storage (RAM).

FIG. 44 is a diagram of a portion of a Boolean Processor in which the control encoder of the original Boolean Processor is eliminated and device address and control bits are delivered in parallel directly to the devices and to the Device State Storage (RAM). The embodiment depicted in FIG. 44 includes an Input Bus 1000, one or more peripheral devices 1010, an Immediate Memory Bus 1020, an Output Bus 1030, an Address Blocker 1040, and a Device State Storage (RAM) 1050.

In some embodiments, Device State Storage (RAM) 1050 locations may be updated directly from the Instruction Register. In some embodiments, Device State Storage (RAM) locations may be updated from the Instruction Register via a peripheral device 1010.

When updating Device State Storage (RAM) 1050 locations directly from the Instruction Register, some embodiments will use memory locations for the storage of temporary and/or static values. This direct updating of memory locations may be achieved by dedicating a certain number of low order memory addresses as registers, or Reserved Addresses, and splitting the control and corresponding low order address lines of the bus and directing the split lines straight into RAM 1050. The split lines will, henceforth, be referred to as the Immediate Memory Bus 1020.

When updating RAM locations 1050 via peripheral devices, the full bus (Input Bus, 1000) may deliver data to each device. In the event that a device recognizes its address and is ready to output data, the device may send its address and its output to RAM via the Output Bus 1030.

In some embodiments, memory locations in RAM that will be directly updated (and essentially used as data registers) will have reserved addresses that are not used by any peripheral device on the system. In such embodiments, the peripheral devices may not recognize these addresses. Thus, data intended for the reserved address locations will not be delivered across the Output Bus 1030. Likewise, peripheral device data is not delivered across the Immediate Memory Bus 1020. This may be prevented by including an Address Blocker 1040. In one embodiment, the Address Blocker 1040 includes address blocking logic that will block all address data on the Immediate Memory Bus 1020 in the event that any of the high order address lines are asserted.

The address blocking logic adds a negligible number of gates to the architecture, which is equal to:

(Total Address Lines-# of Low Order Address Lines-
1) OR Gates+(# of Low Order Address Lines)
AND Gates address lines, minus one.

Figure 45:
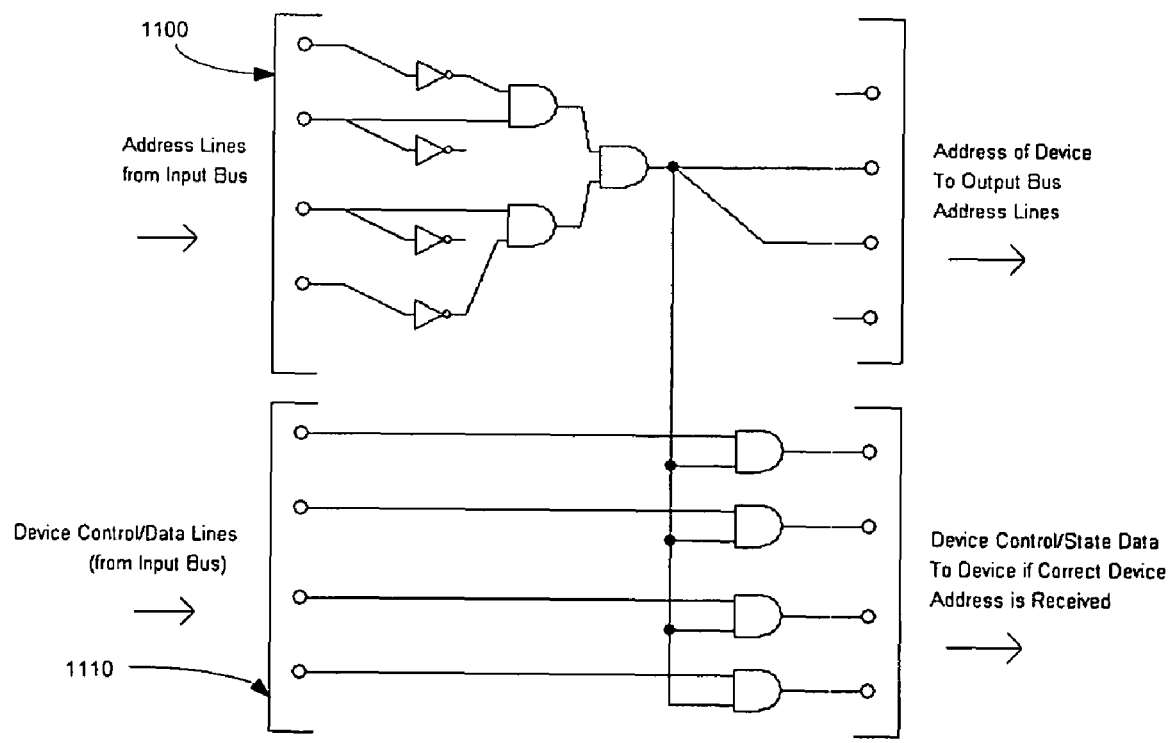
FIG. 45 is a diagram depicting address recognition circuitry according to one embodiment of the invention.

FIG. 45 is a diagram depicting address recognition circuitry according to one embodiment of the invention. In the embodiment depicted in FIG. 45, the address recognition circuitry uses 4 address lines 1100 and 4 control lines 1110 for the bus size and a device address of 6. In such an embodiment, the gate count for the address recognition circuitry for each device is equal to:

(n−1) AND gates+m AND gates+(n−1) Inverters where n=the number of address bits, m=the number of control bits, and the number of inverters is a worst case scenario (if the address of the device is 1).

In a further embodiment comprising a device using eight address bits and 8 control bits, with an address of 7, for example, a total of 15 AND gates and 1 Inverter (for a NAND equivalent of 31 gates) would be required for the device to communicate with the Boolean Processor.

In one embodiment, the Boolean Processor has 15 memory spaces reserved for direct input. In this embodiment, addresses 0 through 15 are considered reserved (zero is actually not used) and no peripheral device may have any of those addresses. Further, the lower 4 lines of the address portion of the input bus would be used for the Immediate Memory Bus. If the total number of address lines is 8, then the blocking logic would require 3 OR Gates and 4 AND gates (17 NAND gates).

In some embodiments, the Boolean Processor can interface with peripheral devices by handling each of a peripheral's registers as a separate device on the system. For example, if a timer has 2 data registers (2 bytes) and a control register, the Boolean Processor may recognize the timer as a combination of 3 "devices".

In some embodiments, the Boolean Processor can perform looping in accordance with Table 10, below. In the event that the Boolean Processor needs to iterate for a set number of times (e.g., for x=1 to 20), a simple counter device can be used as a peripheral. The counter device would reset if it was passed a value of zero or increase by the value passed to it. Its output would be its current value plus the new value being passed to it. For example, if the value of the counter is 8 and a value of 2 is passed to it, its output would be 10.

The following is an example of a looping construct for testing to determine if a key on a keypad has been pressed according to one embodiment. In this example, the pressing of the key will be sampled 10 times and the number of positive "pressings" will be calculated. In this example, there are 2 counter devices on the system. For the purpose of this example, their addresses will be 10 and 11. The status register of the key is assumed to have an address of 12 with the key press indicator being its third bit.

```
      LD   10  0   // Initialize the first counter for loop control
      LD   11  0   // Initialize the 2nd counter to keep track of
                   // positive key pressing
  L1  LD   10  1   // Increment the counter by 1
      SOP  L2      // Start of Operation, short circuit to L2 if
                   // key is not pressed.
      SF   4       // Set function to bit test.
      AND  12  3   // Bit 3 set? (key pressed?)
      EOP  11  1   // Key is pressed. Increment the second
                   // counter by 1
  L2  SOP  L1      // Reset our AND and OR bits and short
                   // circuit address for the loop operation.
      SF   0       // Set function to equality comp. with
                   // immediate value
```

TABLE 10

| Loop Type | Pseudo Code | Boolean Processor Implementation |
|---|---|---|
| For | For x = 1 to 20 | LD    10 0     //Assume counter device address = 10 and reset it<br>SF    0     // Set function to equality comp. w/ imm. value<br>L1  SOP  L1   // Start of Operation, short circuit back here if<br>                           // counter != 20<br>LD    10 1   // Increment the counter by 1<br>< Body of Loop or Jump to Subroutine containing Loop<br>    Body Here. In the case of a subroutine,<br>    the last line of the subroutine would be an unconditional<br>       jump to the AND instruction below ><br>AND   10 20    // Is counter = 20? If it is, no short circuit will<br>                           //occur and control will go to the operation<br>                           // immediately following this one. |
| While | While x != 20 | SF    0     // Set function to equality comp. w/ imm. value<br>L1  SOP  L2   // Start of Operation, short circuit to loop body if<br>                           // x != 20<br>AND   x  20   // x = address of device or register holding the<br>                           // value we're comparing against 20<br>JMPC L3     // conditional jump, if x = 20, jump out of loop<br>L2    < Body of Loop or Jump to Subroutine containing Loop<br>    Body Here. In the case of a subroutine,<br>    the last line of the subroutine would be an unconditional<br>       jump back to the JMP instruction below ><br>JMP   L1       // Loop again.<br>L3    < do operation immediately following While loop > |

```
        AND    10    10    // Is counter = 10? If not, short-circuit to
                           // L1. If it is, no short circuit
                           // will occur and control will go to the
                           // operation immediately following this one
                           // which is assumed to be a test to see if the
                           // key press count is large enough to
                           // establish that the key has been pressed.
```

In some embodiments, the Set Function (SF) operations may be eliminated if the architecture is implemented without them. For example, as described herein the functionality of the combinations of the SET FUNCTION operations and the AND, OR, and/or LOAD operations can be combined into single operation codes.

Further, in some embodiments, subroutines are handled by the Boolean Processor. The subroutines may be handled via the Boolean Processor's Conditional and/or Unconditional Jump Operations. In some embodiments, higher level code containing subroutines will need to be compiled/assembled such that subroutines are entered via a conditional or unconditional jump and exited via unconditional jumps to the instruction immediately following the jump instruction that initiated the subroutine.

Figure 46:
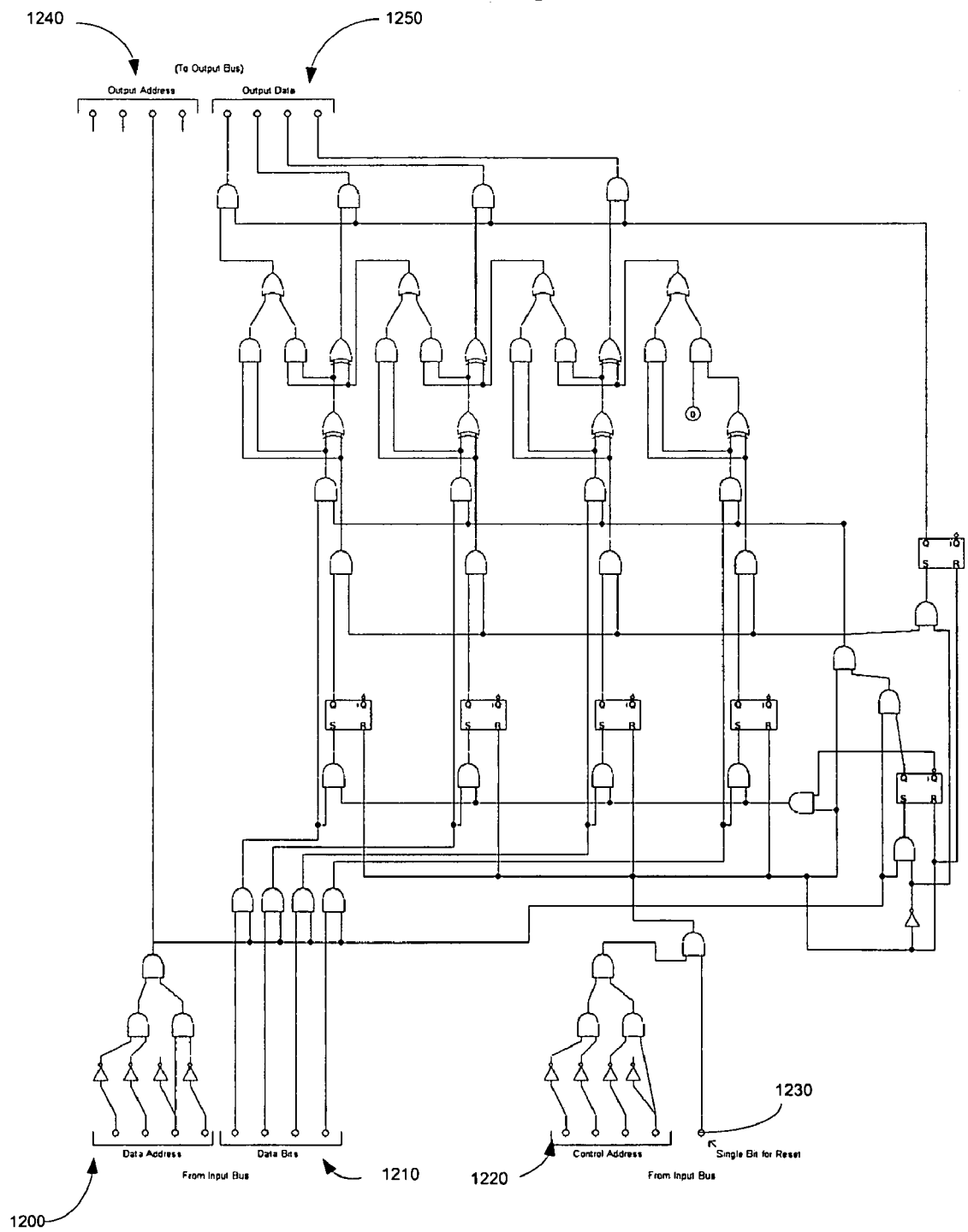
FIG. 46 is a diagram of a Digital Filter that may be added to a Boolean Processor according to one embodiment of the invention.

In some embodiments, the Boolean Processor interfaces with one or more peripherals. For example, the Boolean Processor may include a Digital Filter peripheral. FIG. 46 is a diagram of a Digital Filter that may be added to a Boolean Processor according to one embodiment of the invention.

Digital Filtering is used in analog to digital conversion to eliminate false results based on noise introduced into a system. Assuming that the Digital Filter peripheral contains a status register 1200 and a data register 1210, it would be recognized by the Boolean Processor as 2 devices. In one embodiment, the logical flow for the operation of the Digital Filter is as follows:

1) Set the value of the status register 1200 to zero (resets the data manipulation logic in the filter).
2) Set the value of the data register 1210 to an operand value (value from an A to D converter).
3) Repeat step 2 for as many operands as necessary.
4) Read the value of the data filter output 1230 (the address 1240 for the output would be the same address as that of the data register).

The embodiment depicted in FIG. 46 is a Digital Filter that takes two values and averages them. In the embodiment depicted in FIG. 46, a control address of 1 and a data address of 2 are assumed. In this embodiment, the control address and associated single bit input are used for the sole purpose of resetting the averaging circuitry.

In some embodiments, table interpolation is achieved with the Boolean Processor by utilizing Table Interpolation Devices that would accept an input value and output an interpolated value. This type of device fits well within the paradigm of the Boolean Processor's Input and Output bus scheme where all devices perform a transformation function on input data to generate output data.

Memory requirements for the Boolean Processor may vary and are directly based on the number of devices in the system and the size of their data words. In one embodiment, the memory required for Device State Storage (RAM) is one byte per device. The memory required for the Control Store is calculated by the size of the instruction register, which is a combination of the number of bits required to address all devices on the system (n), the number of bits in a data word (m), and four bits for OP codes.

The example below is an example of how the Control Store of the Boolean Processor can be implemented using off-the-shelf 8 and 16-bit Flash memory. It should be noted that the Boolean Processor is scalable to any memory size or configuration and is not limited to using the types or sizes of memory listed below.

Example: An implementation using 8-bit words and 8-bit addressing.

Data Word Size=8 bits
Max. Devices=256 ($2^8$)
Op Code=4 bits

In this example, the instruction register of the Boolean Processor could be split in a number of ways. In one embodiment, the instruction register could be split among one 16-bit and one 8-bit FLASH module (both with the same number of addressable bytes). In another embodiment, the instruction register could be split among three 8-bit modules.

In the example above, four bits of the module that contains the Op Code portion of each instruction are unused. With low cost in mind, Table 11 provides some possible configurations using a single 16-bit flash module.

TABLE 11

| Address Bits | Control/ State/Data Bits | Op Code Bits | Maximum Number of Devices Supported | Maximum number of Data Values/ States per Device | Gate Count (NAND Equivalent) |
| --- | --- | --- | --- | --- | --- |
| 3 | 9 | 4 | 8 | 512 | 863 (1929) |
| 4 | 8 | 4 | 16 | 256 | 832 (1871) |
| 5 | 7 | 4 | 32 | 128 | 802 (1815) |
| 6 | 6 | 4 | 64 | 64 | 773 (1761) |

Various embodiments of the Boolean Processor may maximize processing performance. In particular, some embodiments will maximize performance in evaluating complex Boolean expressions. Some embodiments of the Boolean Processor are expected to offer an approximate order of magnitude increase in processing speed. This is due to a number of factors including, for example, the following:

In some embodiments, the Boolean Processor performs short-circuit evaluations on complex Boolean expressions using ¼ the number of instructions required by mainstream MCUs to perform the same tasks.

In some embodiments, the machine cycle time for the Boolean Processor is a single clock cycle.

In some embodiments, the handling of interrupts in a Boolean Processor based system may be handled in any number of ways. For example, since the Boolean Processor is designed to run at much faster speeds than existing MCUs, the code being run on the Boolean Processor could be highly compartmentalized into compact subroutines with the main code loop being responsible for sampling interrupt bits/devices in between subroutine calls.

In another embodiment, one or more interrupt registers (corresponding to the number of interrupt lines) could be added to the Boolean Processor architecture. In such an embodiment, these registers are pre-loaded with the addresses of corresponding interrupt routines in the microprogram. A signal on an interrupt line would make the Boolean Processor's PC jump to the address stored in the corresponding interrupt register.

Further, in critical applications, where the processor needs to return to its main control loop from the address in which it was interrupted, a return register may be added to the system. In such an embodiment, the return register would be loaded with the address of the PC at the time of the interrupt. Upon completion of the interrupt routine, the address in the return register would be loaded into the PC and execution of the main control loop would resume.

In various embodiments, a number of specific implementations involving the Boolean Processor may be provided. For example, some embodiments may provide a clockless implementation. In such embodiments, no clock circuitry is required. Rather, if a stable electrical signal is provided in a portion of the circuit, then by permitting the signal to propagate to successive portions of the circuit allows the chip to "clock itself." Specifically, in some embodiments, when the electric signal reaches the end of the circuit, it flips a switch. This provides the clocking function without using a clock.

Such a clockless implementation may help to achieve the full speed of the circuit. Though some clockless chips are known in the art, they have not been widely used because of poor reliability. But a clockless implementation should work with the Boolean Processor because the circuitry of the Boolean Processor simpler than that of conventional microchips.

Further potential uses for various embodiments of the Boolean Processor include utilizing a quantum computing based platform as well as a DNA computing based platform.

A further potential implementation is a chip on RAM. A benefit of chip on RAM technology is that a microprocessor can process data much quicker than it can read data from memory. Because of this, known solutions in the art include predictive architectures. For example, in a predictive architecture a chip may process the data in five different ways, then when it reads the next chunk of data determine that one of the five was correct and discard the results of the other four. Some embodiments of the present invention provide an improvement over such solutions. Specifically, some embodiments include a Boolean Processor in a memory chip to handle this predictive processing.

In a chip on RAM implementation, one or more of the following features may be provided by a Boolean Processor according to one embodiment:
a) Searching memory for data that meets criteria specified in the Boolean Processor's instruction store.
b) Dynamically updating the instruction store of the Boolean Processor to search the memory against any criteria.
c) Marking data in memory that meets the search criteria.
d) Incorporating a Boolean Processor as a component of a memory chip and using the Boolean Processor to accelerate data retrieval.
e) Returning marked data to requesting hardware and/or software.
f) Manipulating marked data within memory.

Further, in some embodiments, these Boolean Processor enhanced memories may be cascaded to permit multiple Boolean Processors to work together.

In some embodiments, multiple Boolean Processors may be combined in parallel. For example, multiple Boolean Processors may be combined in order to facilitate pipelining. Also, in some embodiments multiple Boolean Processors may be combined in one or more of the following ways: on a single chip, on multiple chips, or across a network.

Additionally, in some embodiments, sharing memory among multiple Boolean Processors may be facilitated. In further embodiments, predictive or speculative execution may be facilitated.

Figure 47:
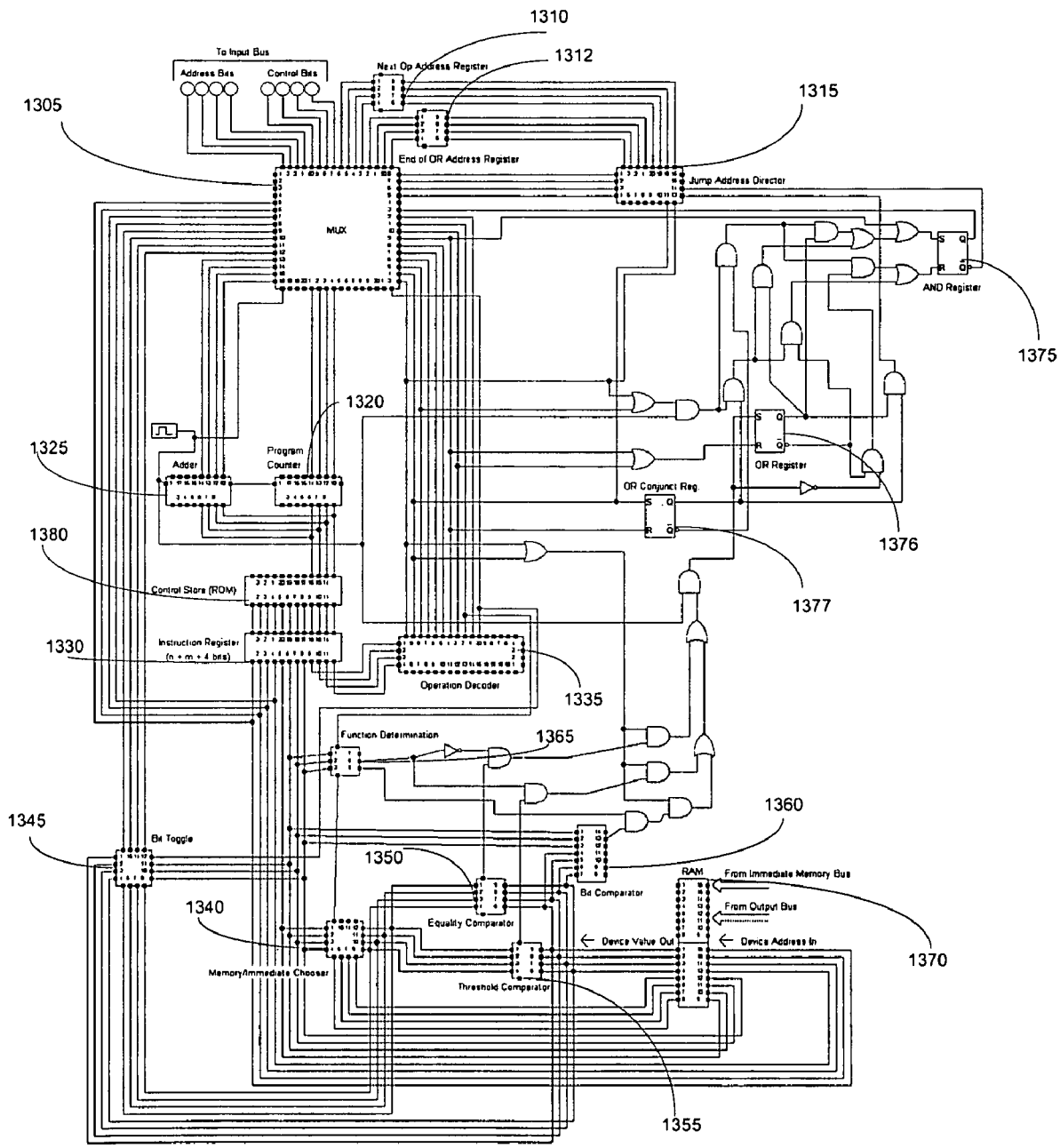
FIG. 47 is a circuit diagram depicting a Boolean Processor that provides the expanded instruction set and the features that flow therefrom, according to one embodiment.

FIG. 47 is a circuit diagram depicting a Boolean Processor that provides the expanded instruction set and the features that flow therefrom, according to one embodiment. FIGS. 48-60 depict several components of the Boolean Processor in more detail. For the purpose of simplicity, the Boolean Processor and its components in FIGS. 47-60 are shown with 4-bit address lines and 4-bit data lines. But it should be understood that various embodiments of the Boolean Processor and its components may include address lines and data lines of a variety of widths (e.g., 8-bit, 16-bit, and so forth).

In the embodiment depicted in FIG. 47, the Boolean Processor includes a number of components, including the following: a Multiplexer 1305, a Next Operation Address Register 1310, an End of OR Address Register 1312 (in this embodiment, the circuitry of these two registers is identical), a Jump Address Register 1315, a Program Counter 1320, an Adder 1325, an Instruction Register 1330, an Operation Decoder 1335, a Memory/Immediate Chooser 1340, a Bit Toggle device 1345, an Equality Comparator 1350, a Threshold Comparator 1355, a Bit Comparator 1360, and a Function Determination Unit 1365. Further, the Boolean Processor depicted in FIG. 47 includes a Random Access Memory (RAM) 1370 which may receive data via one or more buses, an AND Register 1375, an OR Register 1376, an OR Conjunct Register 1377, and a Control Store (ROM) 1380.

In one embodiment, a feature of the architecture of the Boolean Processor depicted in FIG. 47 is its set of registers, or lack thereof. In contrast to conventional microprocessors and microcontrollers, which can have a plurality of registers (typically from 8 to 64 bits wide), the Boolean Processor depicted in FIG. 47 has only six registers. Of the six registers, the next operation address register 1310, the end of OR address register 1312, and instruction register 1330 are the only registers which are generally required to be multi-bit registers. The remaining three registers 1375, 1376, and 1377 hold AND truth states, OR truth states, and an indicator for conjuncts containing OR clauses, respectively. One or more of these registers 1375, 1376, and 1377 may be only a single bit in size, although additional bits may be included in further embodiments.

In the embodiment depicted in FIG. 47, the Boolean Processor includes the instruction register 1330, which is an n+m+x-bit wide register containing an n-bit address, an m-bit control/state word, and an x-bit operational code. In an embodiment using 8-bit device addressing, 8-bit control words, and 3-bit operational codes, the instruction register 1330 is 19 bits wide. In one embodiment, the Boolean Processor also includes a control store (ROM) 1380, which is used to hold a compiled micro-program. The compiled micro-program may include (n+m+x)-bit instructions. In one embodiment, the Boolean Processor further includes a program counter 1320. The program counter 1320 may be used for fetching the next instruction from the control store 1380. In one embodiment, the Boolean Processor further includes a memory (MUX) 1305. The MUX may be used to configure the program counter 1320 for one or more of: normal operation, conditional jump operation, unconditional jump operation, and Boolean short-circuit operation. Further, in some embodiments, plurality of AND gates and OR gates are used to pass operation results as well as signals that may be operational code dependent.

In one embodiment, the AND register 1375 is used to roll up the results of the conjuncts. If the AND register 1375 is one bit in size, then the default value of the AND register 1375 is one and it initializes to a value of one after a start of operational code. In such an embodiment, the 1-bit AND register 1375 remains at a value of one if all of the conjuncts in the Boolean expression being evaluated are true. If this bit is set to zero at any time during the evaluation, the entire CNF operation is false. In such a case, the remainder of the operation may be short-circuited and the evaluation of the next operation can begin. It should be apparent, however, that the AND register 1375 may be modified such that one or more alternative values may be used to initialize the register 1375 and represent a "true" value. The same applies to a "false" value as well, where any of another set of values (provided that the selected value is different from the one(s) used to represent a "true" value) may be used to represent a "false" value.

In one embodiment, the OR register 1376 is used to roll up the results of each of the individual conjuncts. If the OR register 1376 is one bit in size, then it initializes to a value of zero and remains in that state until a state in a conjunct evaluates to one. The OR conjunct register 1377 may be used to indicate that the evaluation of a conjunct containing OR clauses has begun. In one embodiment, the OR conjunct register 1377 initializes to a value of zero and remains in that state until an OR operation sets its value to zero. It should be apparent, however, that the OR register 1376 may be modified such that one or more alternative values may be used to initialize the register 1376 and represent a "false" value. The same applies to a "true" value as well, where any of another set of values (provided that the selected value is different from the one(s) used to represent a "false" value) may be used to represent a "true" value. Further, if the OR conjunct register 1377 is one bit in size, then it may initialize to a value of zero and remains in that state until an OR operation sets its value to one. In the event that the 1-bit OR conjunct register 1377 is set to one and the 1-bit OR register 1376 is set to one, the entire conjunct evaluates to true and short-circuits to the start of the next conjunct.

In one embodiment, the Boolean Processor further includes an operation decoder 1335, which deciphers each operational code and controls the units that are dependent upon each operational code. In one embodiment, the operational codes are 4 bits in length, and the functions of the operation decoder 1335 by operational code include: Boolean AND (Op Code 0), Boolean OR (Op Code 1), End of Operation (Op Code 2), No Operation (Op Code 3), Unconditional Jump (Op Code 4), Conditional Jump (Op Code 5), Start of Operation (Op Code 6), Start of Conjunct (Op Code 7), Set Function (Op Code 8), Load Memory (Op Code 9), and Bit Toggle (Op Code 10). However, it will be apparent that the inclusion of one or more additional bits in the instruction register 1330 would permit additional operational codes to be offered, and that the removal of a bit would reduce the number of operational codes offered, if either such design were to be desired.

In one embodiment, a next operation address register 1310 stores the address used for Boolean short-circuiting. Short-circuiting occurs as soon as a conjunct evaluates to false. In such a case, the address is the address of the next operation. The end of OR address register 1312 stores the address of the instruction immediately following a conjunct containing OR clauses. It may be used for the short-circuiting of conjuncts that contain OR clauses. The Boolean Processor may further include a device state storage (RAM, not depicted), which is responsible for storing the states of the devices that the Boolean Processor monitors and/or controls. It has $2^n$ addresses, each of which are m-bits wide, where n is the address width and m is the control/state word width, in bits.

In one embodiment, the Boolean Processor evaluates micro-programs and controls its environment based upon the results of the above-described evaluations. The micro-programs define the actions to be taken by devices in the event that given Boolean tests evaluate to true. In one embodiment, the Boolean Processor works on the principle that the devices will be controlled based upon their states and the states of other devices, or after some period of time has elapsed. In order to evaluate a micro-program, conditional tests must be compiled into CNF.

In the embodiment depicted in FIG. 47, the Boolean Processor performs ten functions, as specified by operational code. Op Code 0—(Boolean AND) enables the AND gate that loads the AND register 1375 in the event that the conditional state of the device at the address in the instruction register 1330 equals the state being tested in the instruction register 1330. In one embodiment, the Boolean AND instruction serves two purposes. First, the instruction may be used to rollup results between OR conjuncts. This may be accomplished by comparing a "zero" value to the value in location 0, which always results in a "false" evaluation. Second, the instruction may be used to evaluate stand-alone conjuncts, in which case a value is being compared to a device state.

In the embodiment depicted in FIG. 47, Op Code 1—(Boolean OR) sets the value of the OR conjunct register 1377 to one, which enables short-circuiting within a conjunct containing OR clauses.

In one embodiment, Op Code 2—(End of Operation) enables the AND gate that AND's the value of the OR register 1376 with the value of the AND register 1375. If the AND register 1375 evaluates to a value of one, the address and control word specified in the end of operation code may be sent to the proper device.

In one embodiment, Op Code 3—(No Operation) does nothing.

In one embodiment, Op Code 4—(Unconditional Jump) allows the MUX 1305 to receive an address from an address portion of the instruction register 1330 and causes an immediate jump to the instruction at that address.

In one embodiment, Op Code 5—(Conditional Jump) provides that if the AND register 1375 has a value of one, the test condition is met and the MUX 1305 is enabled to receive the "jump to" address from the address portion of the instruction register 1330.

In one embodiment, Op Code 6—(Start of Operation) provides the address of the line following the end of operation line for the current operation. This address may be used to short-circuit the expression and keep the Boolean Processor from having to evaluate the entire CNF expression in the event that one of the conjuncts evaluates to zero. In one embodiment, in addition to loading the next operation address into the next operation address register 1310, this operation also sets the AND register 1375 to one, the OR register 1376 to zero, and the OR conjunct register 1377 to zero.

In one embodiment, Op Code 7—(Start of OR Conjunct) provides the address of the line immediately following the conjunct and loads it into the end of OR address register 1312. This address may be used to provide short-circuiting out of a given conjunct in the event that one of the conjunct's terms evaluates to one.

In one embodiment, Op Code 8—(Set Function) provides the type of operation being performed. If the Set Function instruction is executed, then the Function Determination Unit 1365 may read the operand following the Set Function Instruction in order to determine which function to execute. For example, the type of operation may include one or more of: operand 00—Equality Comparison with Immediate Value; operand 01—Equality Comparison with Value in Memory; operand 02—Greater Than Comparison with Immediate Value; operand 03—Greater Than Comparison with Value in Memory, or operand 04—Bit Test. Depending on the operation chosen, the Memory/Immediate Chooser 1340 selects whether to operate on a value in memory of an immediate value. Further, if an Equality Comparison operation is chosen, then an Equality Comparator 1350 may be used to perform the equality comparison operation. Additionally, if a Greater Than Comparison operation is chosen, then a Threshold Comparator 1355 may be used to perform the operation. Further, if a Bit Test operation is selected, then a Bit Comparator 1360 may be used to perform the operation.

In one embodiment, Op Code 9—(Load Memory) loads a location in memory with either an immediate value or a value from memory. Whether to load an immediate value or a value from memory may be determined by the most recently executed Set Function instruction. In one embodiment, the Memory/Immediate Chooser 1340 is used to determine whether to load an immediate value or a value from memory.

In one embodiment, Op Code 10—(Bit Toggle) toggles a specified bit of a value in a specified address to its opposite value. For example, if the specified bit is '1' then the Bit Toggle operation changes the value of the bit to '0.' The Bit Toggle 1345 may perform this operation.

In one embodiment, the evaluation of a CNF expression begins with Start of Operation (Op Code 6) and proceeds to the evaluation of a conjunct. A conjunct may be either a stand-alone term (evaluated as an AND operation) or a conjunct containing OR clauses. In the latter case, each term of the conjunct is evaluated as part of an OR operation (Op Code 1) Each of these operations represents a test to determine if the state of a given device is equal to the state value specified in the corresponding AND or OR instruction. If the term evaluates to true, the OR-bit is set to a value of one. Otherwise, the OR-bit is set to a value of zero. In the case of a stand-alone term, this value automatically rolls up to the AND register 1375. In conjuncts containing OR clauses, the result of each OR operation is OR'd with the current value of the OR register 1376. This ensures that a true term anywhere in the conjunct produces a final value of true for the entire conjunct evaluation. In the event that the OR register 1376 has a value of one and the OR conjunct register 1377 is set to one, the conjunct will evaluate to true and may be short-circuited to the next conjunct. Next, the Boolean Processor may prepare for subsequent conjuncts (if any additional conjuncts exist). At this point, an AND operation (Op Code 0) joins the conjuncts and the value of the OR register 1376 is rolled up to the AND register 1375 by having the value of the OR register 1376 AND'd with the value of the AND register 1375. In the event that the OR-bit has a value of zero when the AND operation is processed, the AND-bit will change to a value of zero. Otherwise, the AND-bit's value will remain at one. If the AND-bit has a value of one, the next conjunct is evaluated. If the AND-bit has a value of zero, the final value of the CNF expression is false, regardless of the evaluation of any additional conjuncts. At this point, the remainder of the expression may be short-circuited and the next CNF expression can be evaluated.

In a further embodiment, the Boolean Processor requires that functions be compiled in CNF. In one embodiment, a micro-code compiler builds the micro-instructions such that they follow a CNF logic. In such an embodiment, the logic statements for CNF Boolean Processor programs are nothing more than IF-THEN-ELSE statements. For example: IF (Device A has State Ax), THEN (Set Device B to State By), ELSE (Set Device C to State Cz). In such an embodiment, the logic of the IF expression must be compiled into CNF. Further, in such an embodiment the expression must also be expanded into a set of expressions AND'd together, and AND'd with a pre-set value of "true". For the CNF operation according to such an embodiment, the pre-set value of "true" is the initial value of the AND register 1375 at the start of each logical IF operation. The above IF-THEN-ELSE statement would result in the following micro-code logic: [(Device A has State Ax) v "true"]; if the AND statement is "true", then (SET Device B to State By); and if the AND statement is "false", then (SET Device C to State Cz).

In the embodiment depicted in FIG. 47, the next operation address register 1310 and the end of OR address register 1312 may be loaded with values from the n-bit "address" portion of the instruction register 1330. As described herein, these values may specify the addresses of lines of code within the micro-program that are jumped to when performing short circuit operations. However, this design may limit the number of micro-program lines (or micro-program addresses) that can be accessed by the next operation address register 1310 and the end of OR address register 1312 to $2^n$, where n is the width, in bits, of the address portion of the instruction register 1330.

In order to expand the micro-program address values that can be stored in the next operation address register 1310 and the end of OR address register 1312, the architecture may be modified to use the bits from both the address and control/state portions of the instruction register 1330 when loading the next operation address register 1310 and the end of OR address register 1312 with the values of micro-program addresses. This would expand the number of micro-program lines (or micro-program addresses) that can be accessed by the next operation address register 1310 and the end of OR address register 1312 to $2^{n+m}$, where n is the width, in bits, of the address portion of the instruction register 1330 and m is the width, in bits, of the control/state portion of the instruction register 1330. In one embodiment, this approach would require the "control/state" portion of the instruction register 1330 to be connected directly to the address registers 1310, 1312 in addition to the MUX 1305.

Another solution for expanding the range of micro-program address values that may be used is to modify the control store portion of the architecture to include discrete "jump to" addresses that would only be utilized on instructions that are capable of being jumped to. While the limit on the number of instructions that may be jumped to would remain the same in this case, the inclusion of discrete jump to addresses would permit the "jump to" addresses to be dispersed throughout the entire micro-program, as opposed to being limited to the first $2^n$ instructions, where n is the width, in bits, of the address portion of the instruction register 1330. In order to utilize this approach, the control store 1380 may include a secondary addressing scheme to associate "jump to" addresses to widely dispersed primary physical address locations in the store. Primary addressing in the control store 1380 would still need to be maintained for use by the program counter 1320 and also for updating the program counter 1320 when a location is "jumped to." For example, in one embodiment, a word in the control store 1380 could have a primary physical address of 10 and a secondary "jump to" address of 1. If the state of the processor dictates a jump to "jump to" address 1, then the program counter 1320 would need to be updated to 10, or the actual primary physical address of "jump to" address 1. The previously mentioned solution, however, in which the address and control/state portions of the instruction register 1330 are utilized, is a preferred solution.

Figure 48:
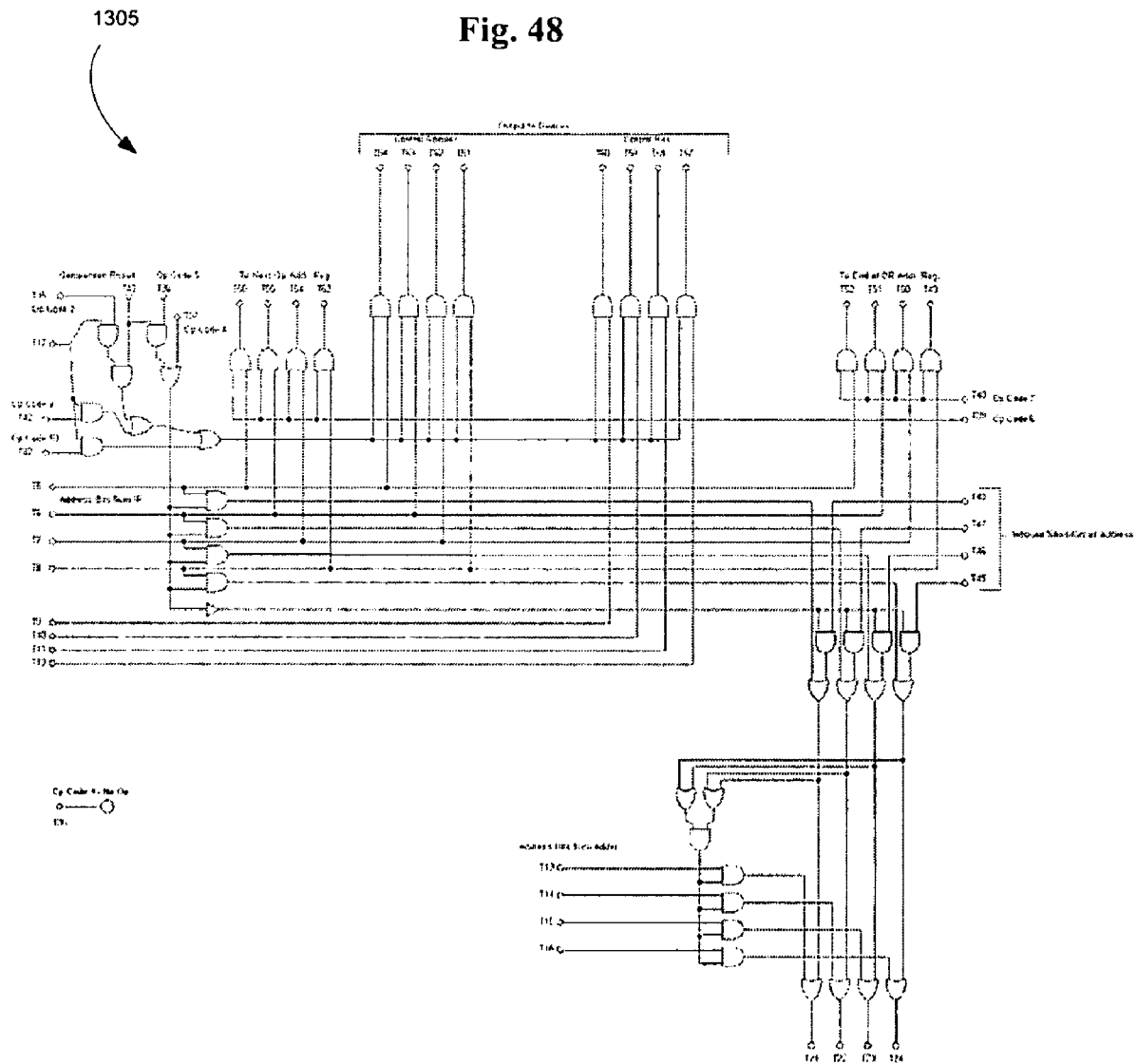
FIG. 48 is a detailed schematic diagram of a MUX 1305 according to one embodiment.

FIG. 48 is a detailed schematic diagram of a MUX 1305 according to one embodiment. The MUX 1305 depicted in FIG. 48 is of a conventional design and may receive input from one or more of: the Instruction Register 1330 (bits T5-T8), the Bit Toggle 1345 (bits T9-T12), the Adder 1325 (bits T13-T16), the Operation Decoder 1335 (bits T33-T42), or the AND register 1375 (bit T43). Further, the MUX 1305 may provide output to one or more of: the Program Counter 1320 (bits T21-T24), the Jump Address Detector 1315 (bits T45-T48), the End of OR Address Register 1377 (bits T49-T52), the Next Operation Address Register 1310 (bits T53-T56), or to the Input Bus (bits T57-T64).

Figure 49:
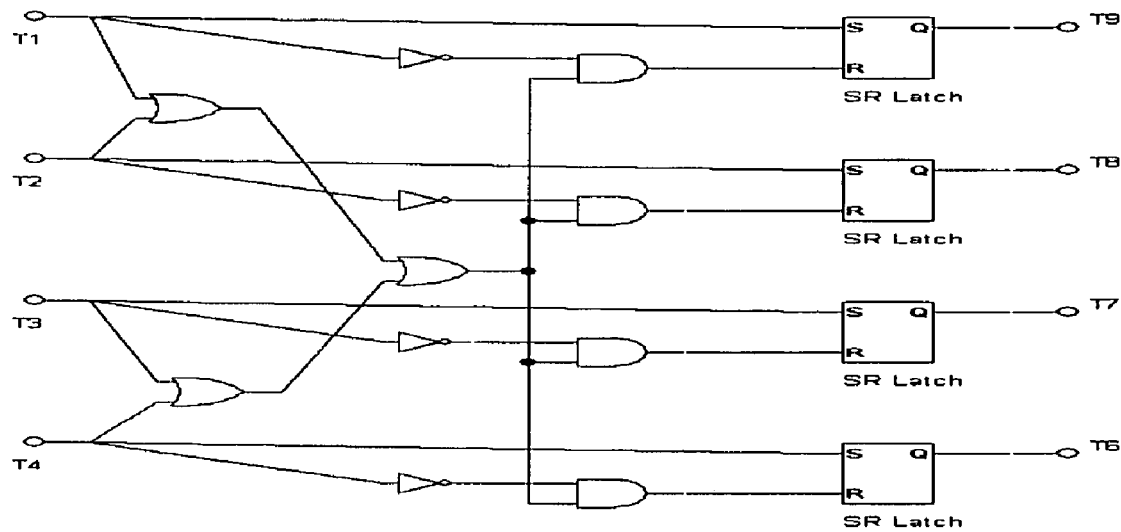
FIG. 49 is a detailed schematic diagram of a register suitable for use as a Next Operation Address Register 1310 or End of OR Address Register 1312, according to one embodiment.

FIG. 49 is a detailed schematic diagram of a register suitable for use as a Next Operation Address Register 1310 or End of OR Address Register 1312, according to one embodiment. In the embodiment depicted in FIG. 49, the registers 1310, 1312 accept four input bits (T1-T4) from the MUX 1305, process the bits through a set of OR, NOT, and AND gates to a set of four conventional SR Latches. The output of the SR Latches (bits T6-T9) may be passed to the Jump Address Register 1315.

Figure 50:
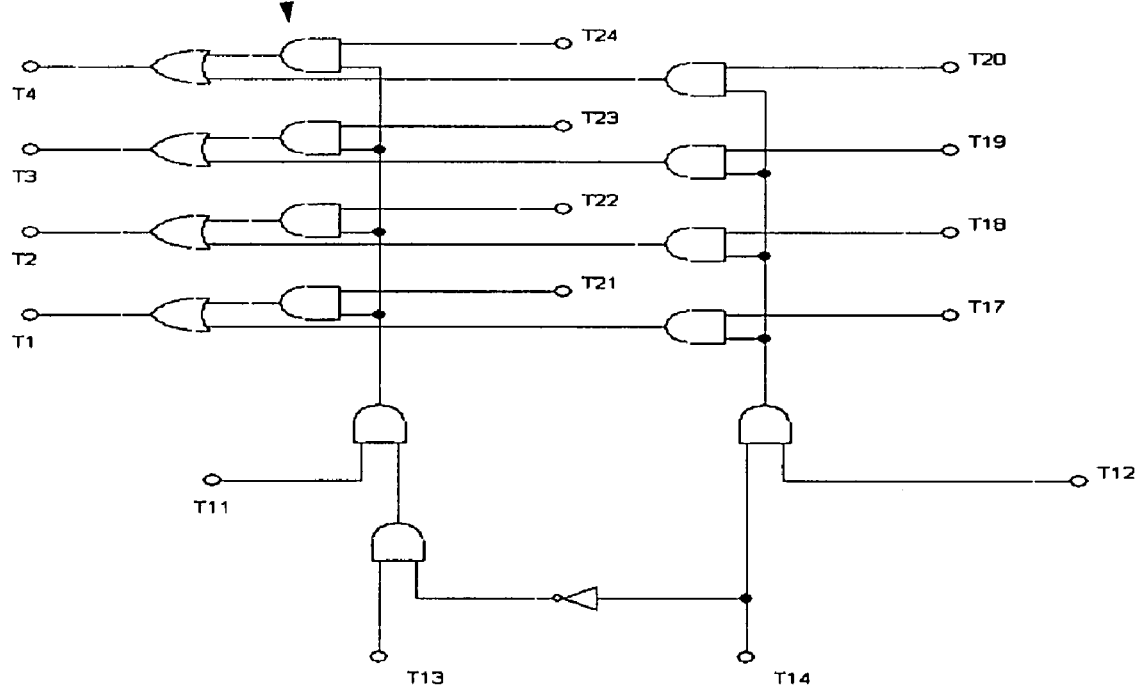
FIG. 50 is a detailed schematic diagram of a register suitable for use as a Jump Address Register 1315, according to one embodiment.

FIG. 50 is a detailed schematic diagram of a register suitable for use as a Jump Address Register 1315, according to one embodiment. The Jump Address Register 1315 may receive input from one or more of: the OR Conjunct Register 1377 (bit T11), the Operation Decoder 1335 (bit T12), the AND product of the output of the OR Register 1376 and the OR Conjunct Register 1377 (bit T13), the AND Register (bit T14), the Next Operation Address Register 1310 (bits T14-T20), or the End of Or Address Register 1312 (bits T21-T24). The Jump Address Register 1315 may provide output to the MUX 1305 (bits T1-T4).

Figure 51:
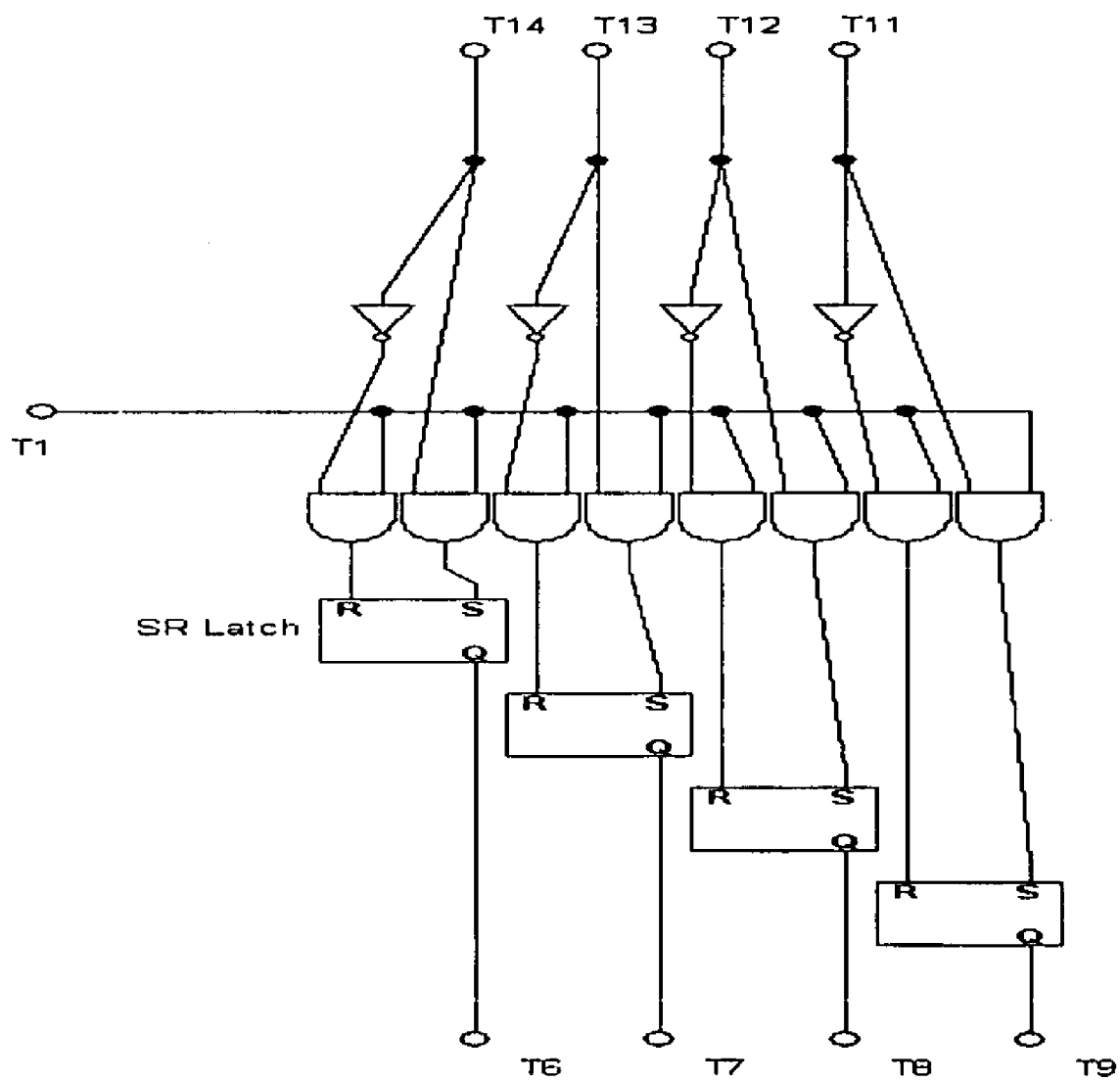
FIG. 51 is a detailed schematic diagram of a Program Counter 1320, according to one embodiment.

FIG. 51 is a detailed schematic diagram of a Program Counter 1320, according to one embodiment. The Program Counter 1320 may accept input from the Adder 1325 (bit T1) and the MUX 1305 (bits T1-T14). In one embodiment, the Program Counter 1320 may, for each bit it receives from the MUX 1305, perform (1) an AND operation on that bit and the bit received from the Adder 1325, and (2) an AND operation on the inverse of the bit received from the MUX 1305 and the bit received from the Adder 1325. Next, the Program Counter 1320 may pass the value from #1 into the "Set" input of a conventional SR Latch, and pass the value from #2 into the "Reset" input of the SR Latch. In one embodiment, the output of the SR Latches (bits T6-T9) is provided to the Control Store (ROM) 1380 and to the Adder 1325.

Figure 52:
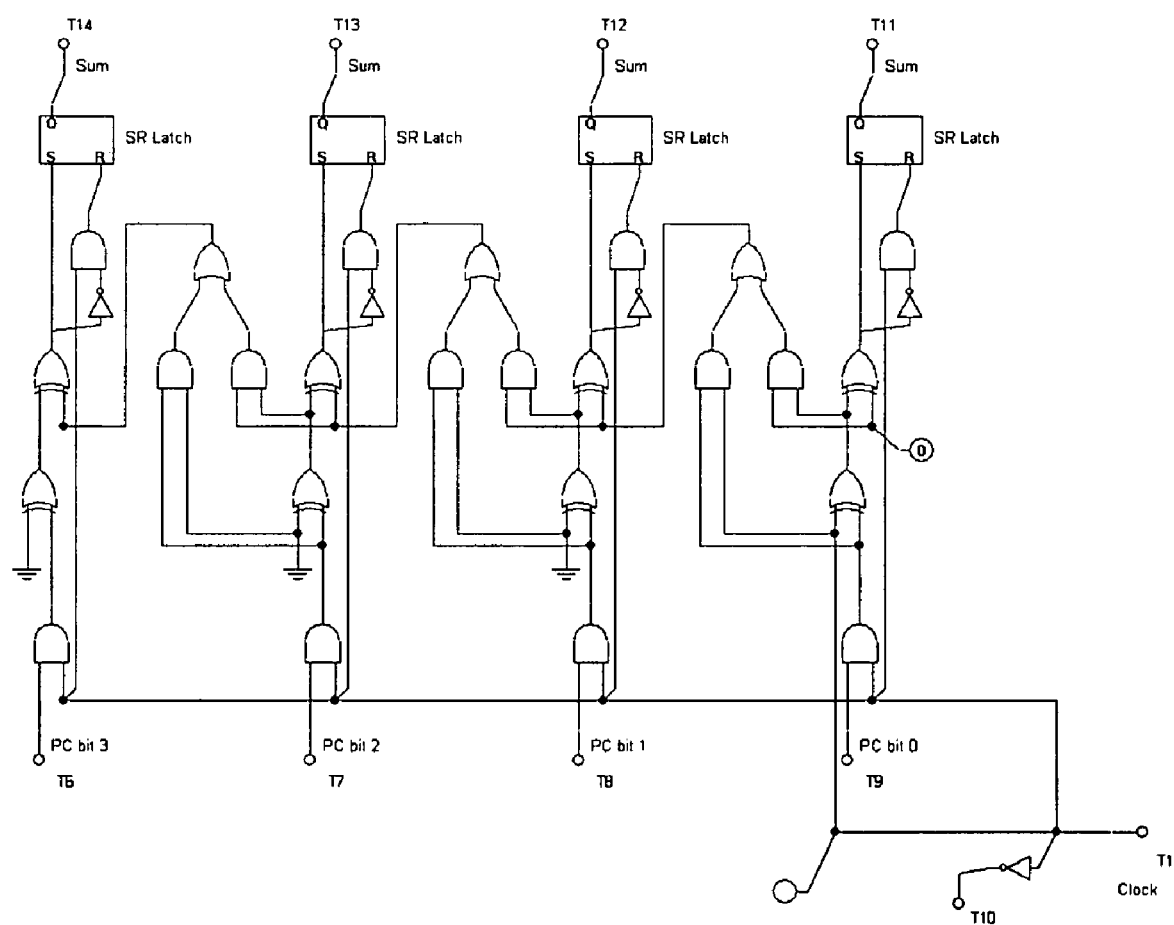
FIG. 52 is a detailed schematic diagram of an Adder 1325, according to one embodiment.

FIG. 52 is a detailed schematic diagram of an Adder 1325, according to one embodiment. The Adder 1325 may receive inputs from one or more of the following: a Clock (bit T1), or the Program Counter 1320 (bits T6-T9). In one embodiment, the bits from the Clock and the Program Counter 1320 are processed by a series of AND, NOR, and OR gates. In such an embodiment, the results are passed into the "Set" and "Reset" inputs of four conventional SR Latches. Finally, the output of each SR Latch may be provided to the MUX 1305.

Figure 53:
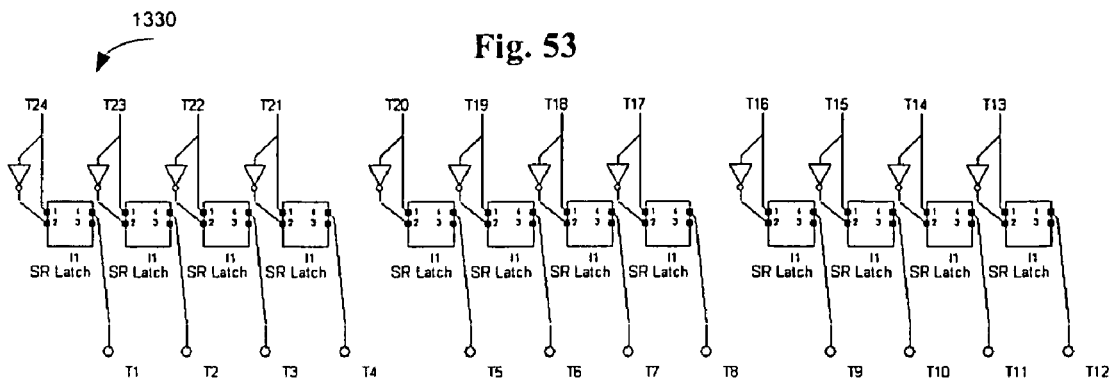
FIG. 53 is a detailed schematic diagram of an Instruction Register 1330, according to one embodiment.

FIG. 53 is a detailed schematic diagram of an Instruction Register 1330, according to one embodiment. The Instruction Register 1330 may receive input from the Control Store 1380 (bits T13-T24). The Instruction Register may 1330 read 12 bits from the Control Store. Further, for each bit, the Instruction Register 1330 may pass the bit into an input of a conventional SR Latch. Additionally, for each bit, the Instruction Register 1330 may pass the inverse of the bit into a different input of a conventional SR Latch. Finally, the output of each SR Latch may be output to one or more of: the RAM 1370 (bits T1-T8), or the Operation Decoder 1335 (bits T9-T12).

Figure 54:
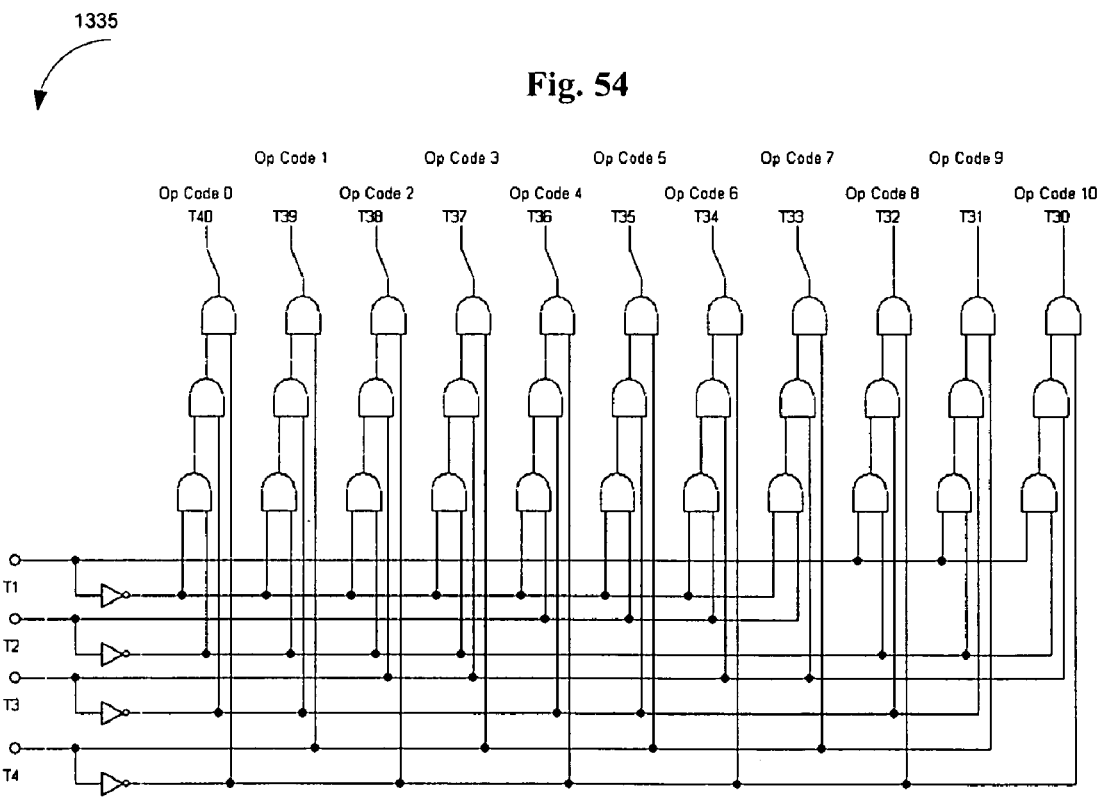
FIG. 54 is a detailed schematic diagram of an Operation Decoder 1335, according to one embodiment.

FIG. 54 is a detailed schematic diagram of an Operation Decoder 1335, according to one embodiment. The Operation Decoder 1335 may receive four bits (bits T1-T4) from the Instruction Register 1330. In one embodiment, the Operation Decoder 1335 processes the bits through a series of AND gates in order to output the requested operation code to the MUX 1305. In the embodiment depicted in FIG. 54, the Operation Decoder 1335 includes 11 output bits (bits T30-T40), each of which represents an operation code. In such an embodiment, only the bit representing the requested operation code should be "1"—the rest of the bits should be "0."

Figure 55:
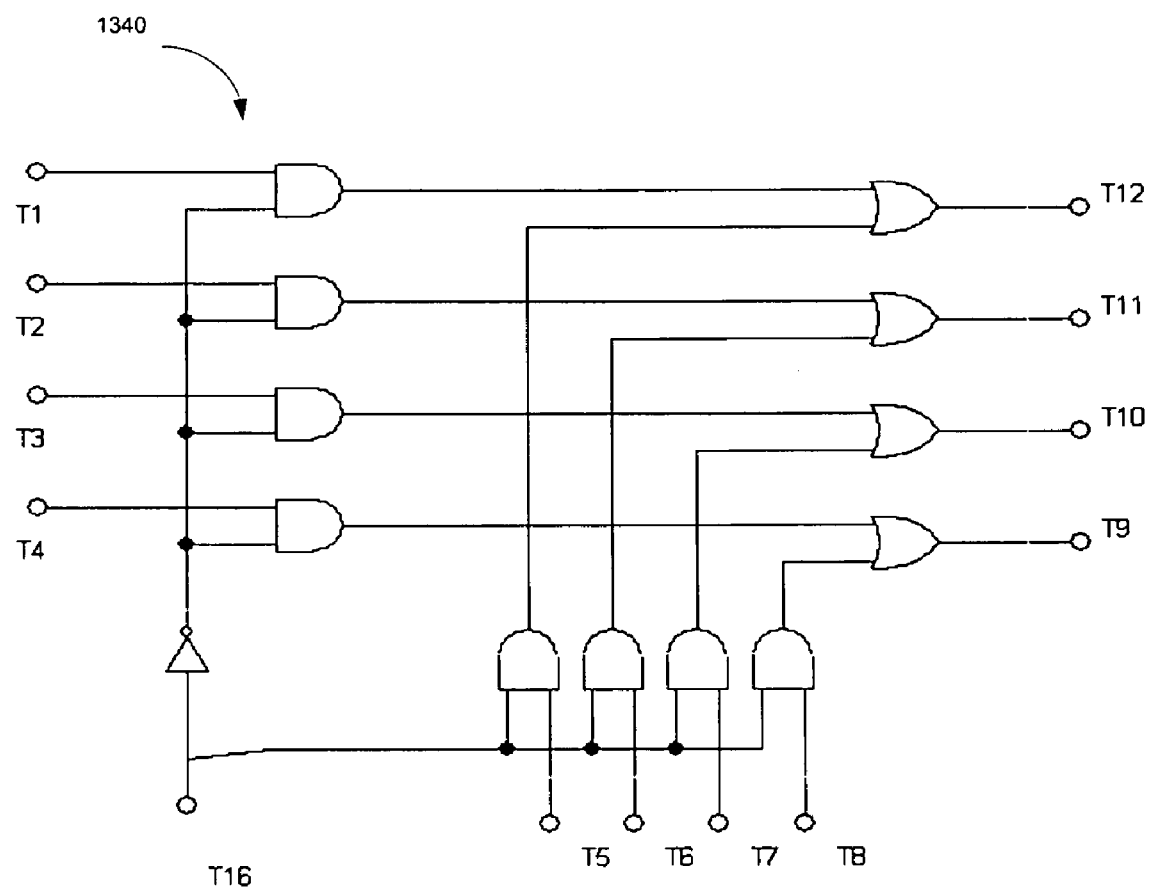
FIG. 55 is a detailed schematic diagram of a Memory/Immediate Chooser 1340, according to one embodiment.

FIG. 55 is a detailed schematic diagram of a Memory/Immediate Chooser 1340, according to one embodiment. The Memory/Immediate Chooser 1340 may receive input from one or more of the following: the Instruction Register 1330 (bits T1-T4), the RAM (bits T5-T8), or the Function Determination Unit 1365 (bit T16). In one embodiment, each bit received from the Instruction Register 1330 is AND'd with the inverse of the bit received from the Function Determination Unit 1365 to produce a first result. In such an embodiment, each bit received from RAM 1370 is AND'd with the bit received from the Function Determination Unit 1365 to produce a second result. Next, the first result and the second result are OR'd, and the output of the OR operations are provided to the Threshold Comparator 1350, the Equality Comparator 1355, and the Bit Toggle 1345.

Figure 56:
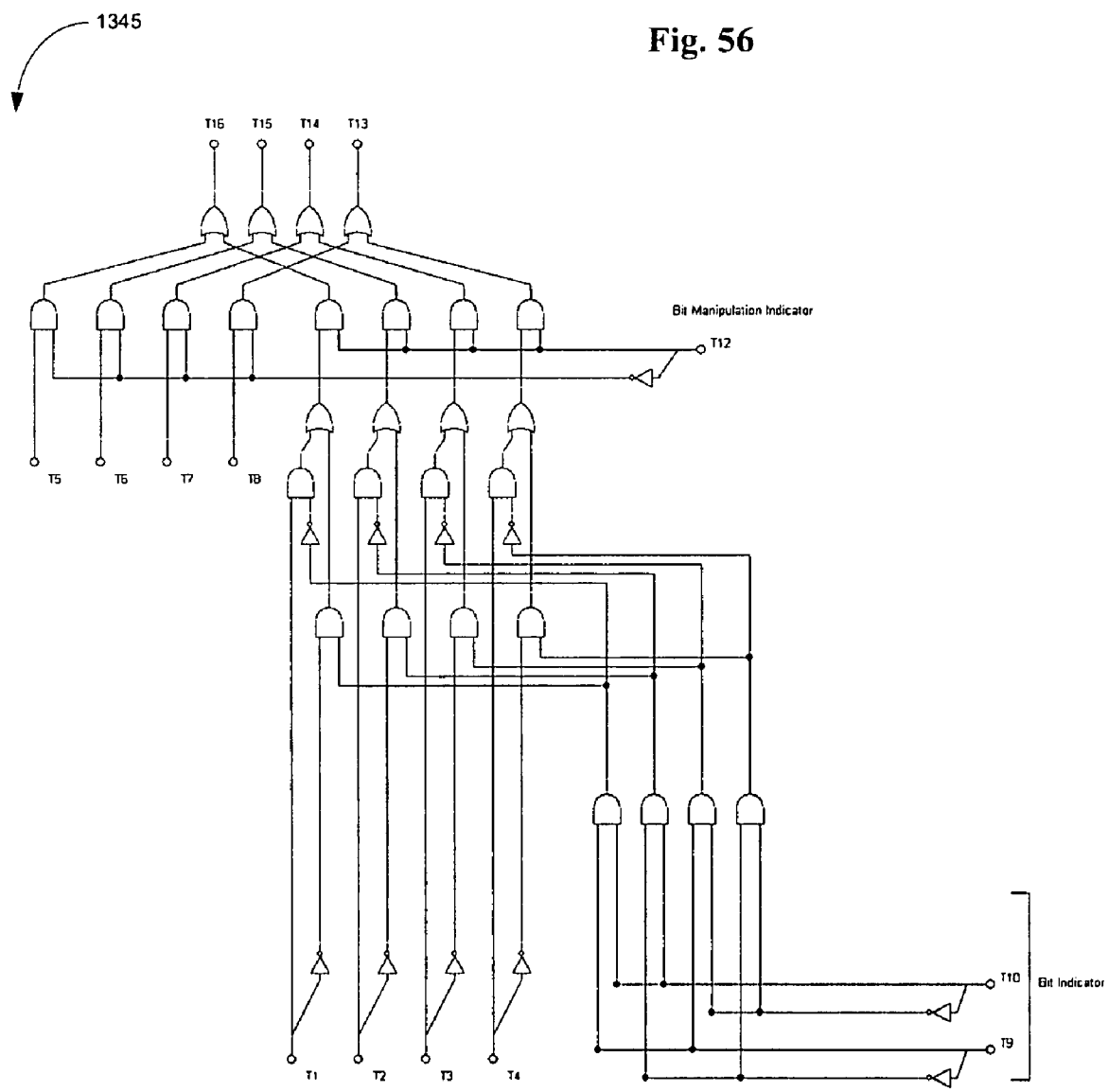
FIG. 56 is a detailed schematic diagram of a Bit Toggle 1345, according to one embodiment.

FIG. 56 is a detailed schematic diagram of a Bit Toggle 1345, according to one embodiment. The Bit Toggle 1345 may receive input from one or more of: the RAM 1370 (bits T1-T4), the Memory/Immediate Chooser 1340 (bits T5-T8), the Instruction Register 1330 (bits T9-T10), or the Operation Decoder 1335 (bit T12). The Bit Toggle 1345 may use a series of AND and OR gates to determine which bit to toggle, then toggle the bit, and finally output the new value to the MUX 1305 (bits T13-T16).

Figure 57:
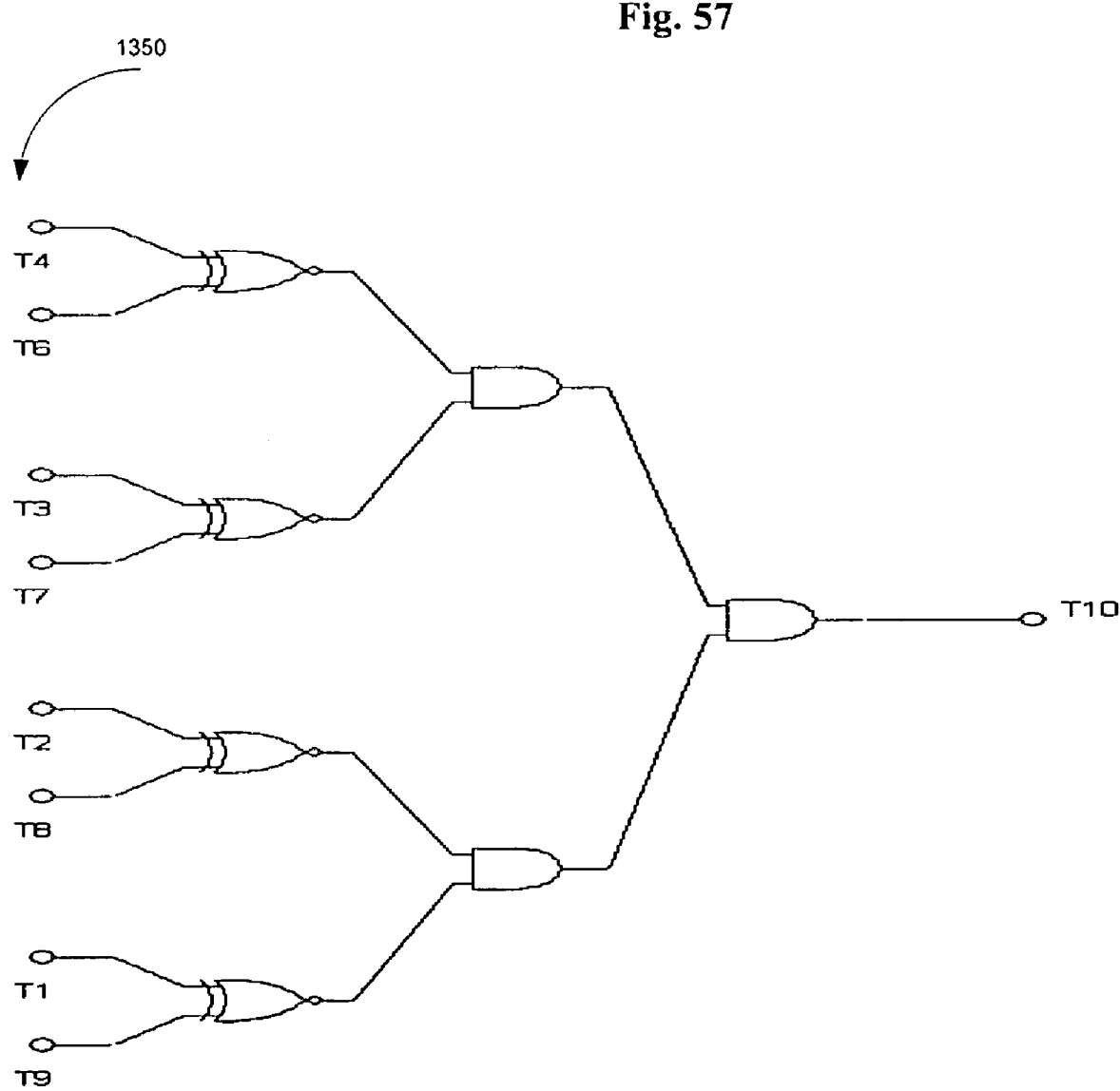
FIG. 57 is a detailed schematic diagram of an Equality Comparator 1350, according to one embodiment.

FIG. 57 is a detailed schematic diagram of an Equality Comparator 1350, according to one embodiment. The Equality Comparator 1350 may receive input from one or more of: the Memory/Immediate Chooser 1340 (bits T1-T4), or the RAM 1370 (bits T6-T9). In the embodiment depicted in FIG. 57, for each input bit, the Equality Comparator 1350 XNOR's one bit from the Memory/Immediate Chooser 1340 with one bit from the RAM 1370. In such an embodiment, the results are AND'd twice to produce a one bit result (true or false). This result may be AND'd with the inverse of the result from the Function Determination Unit 1365. This result may then be processed by two AND gates and one OR gate, and then passed to the OR register 1376.

Figure 58:
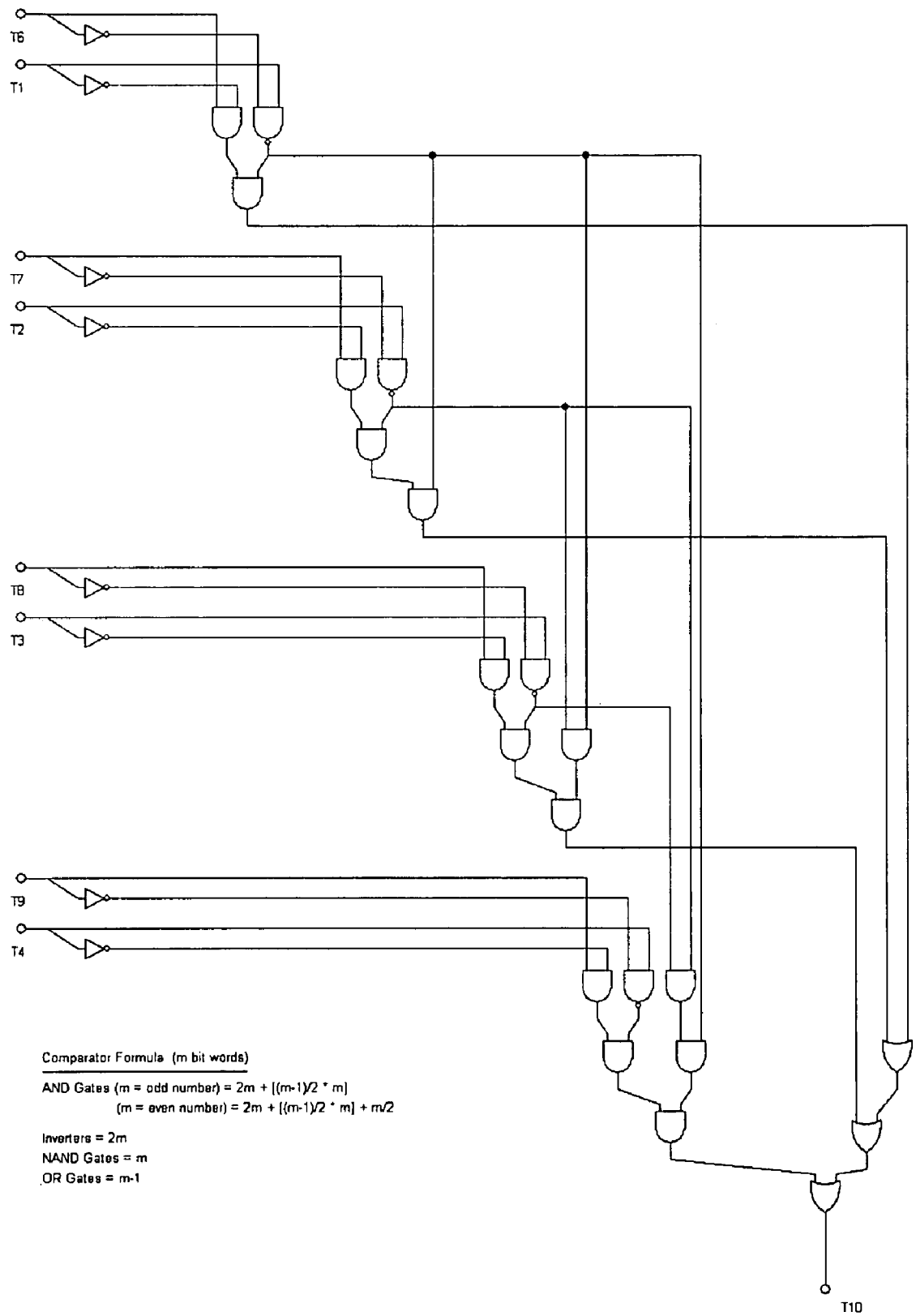
FIG. 58 is a detailed schematic diagram of a Threshold Comparator 1355, according to one embodiment.

FIG. 58 is a detailed schematic diagram of a Threshold Comparator 1355, according to one embodiment. The Threshold Comparator may receive Comparator 1350, according to one embodiment. The Equality Comparator 1350 may receive input from one or more of: the Memory/Immediate Chooser 1340 (bits T1-T4), or the RAM 1370 (bits T6-T9). In the embodiment depicted in FIG. 58, each input bit is processed by a series of AND and OR gates in order to produce a one bit result (true or false). This result may be AND'd with the result from the Function Determination Unit 1365. This result may then be processed by two AND gates and one OR gate, and then passed to the OR register 1376.

Figure 59:
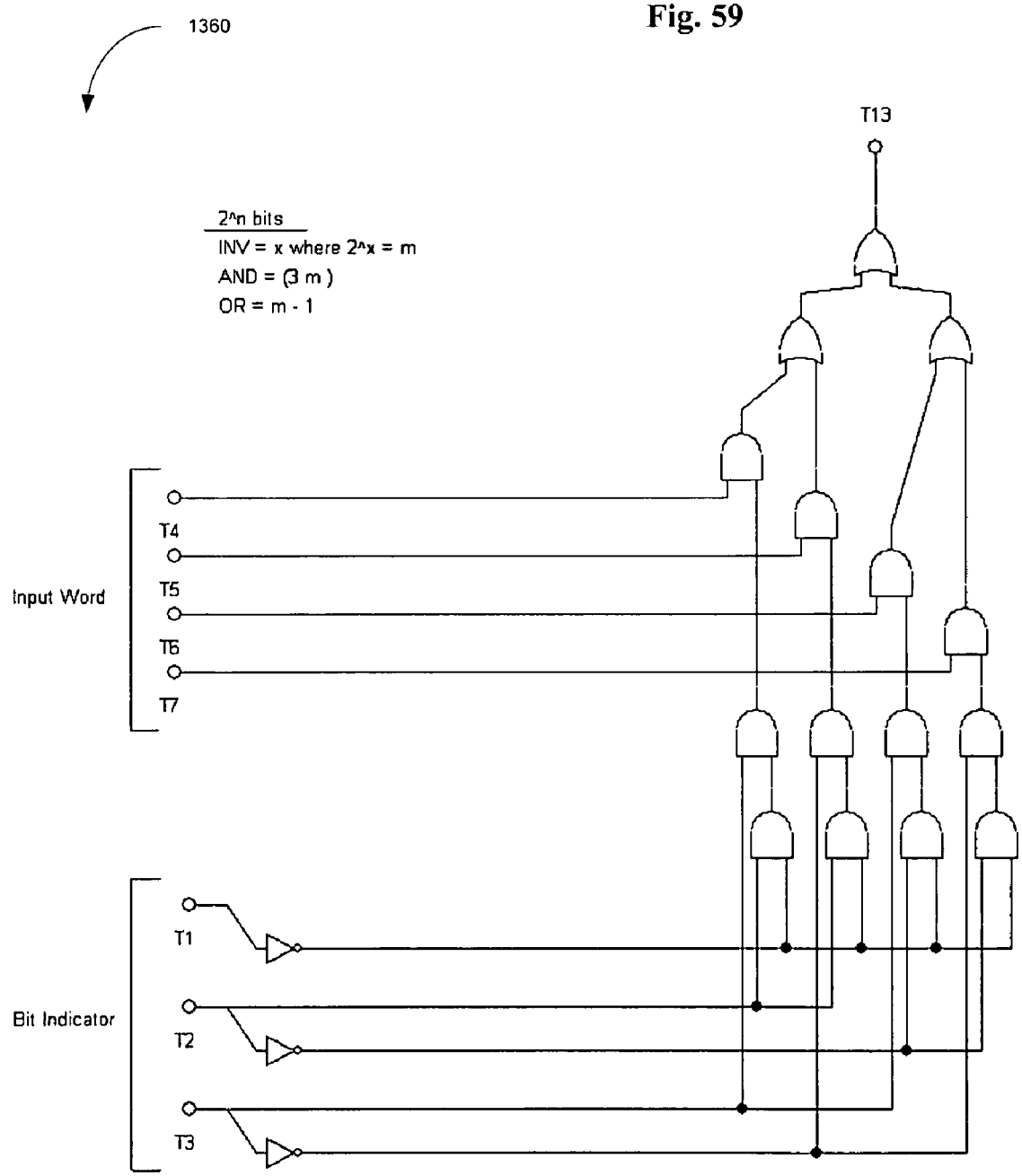
FIG. 59 is a detailed schematic diagram of a Bit Comparator 1360, according to one embodiment.

FIG. 59 is a detailed schematic diagram of a Bit Comparator 1360, according to one embodiment. The Bit Comparator 1360 may receive input from the Instruction Register 1330 (bits T1-T3) and/or the RAM 1370 (bits T4-T7). The bits from the Instruction Register 1330 may serve to identify which bit the Bit Comparator 1360 should compare. The bits from the RAM 1370 may serve as the input word containing the bit to compare. In the embodiment depicted in FIG. 59, the bits from the Instruction Register 1330 are processed by a series of AND gates, and then the results are AND'd with the input word from the RAM 1370. The results are processed by two sets of OR gates to produce a one bit result (true or false). This result may be AND'd with the result from the Function Determination Unit 1365. This result may then be processed by a series of AND and OR gates, and then passed to the OR register 1376.

Figure 60:
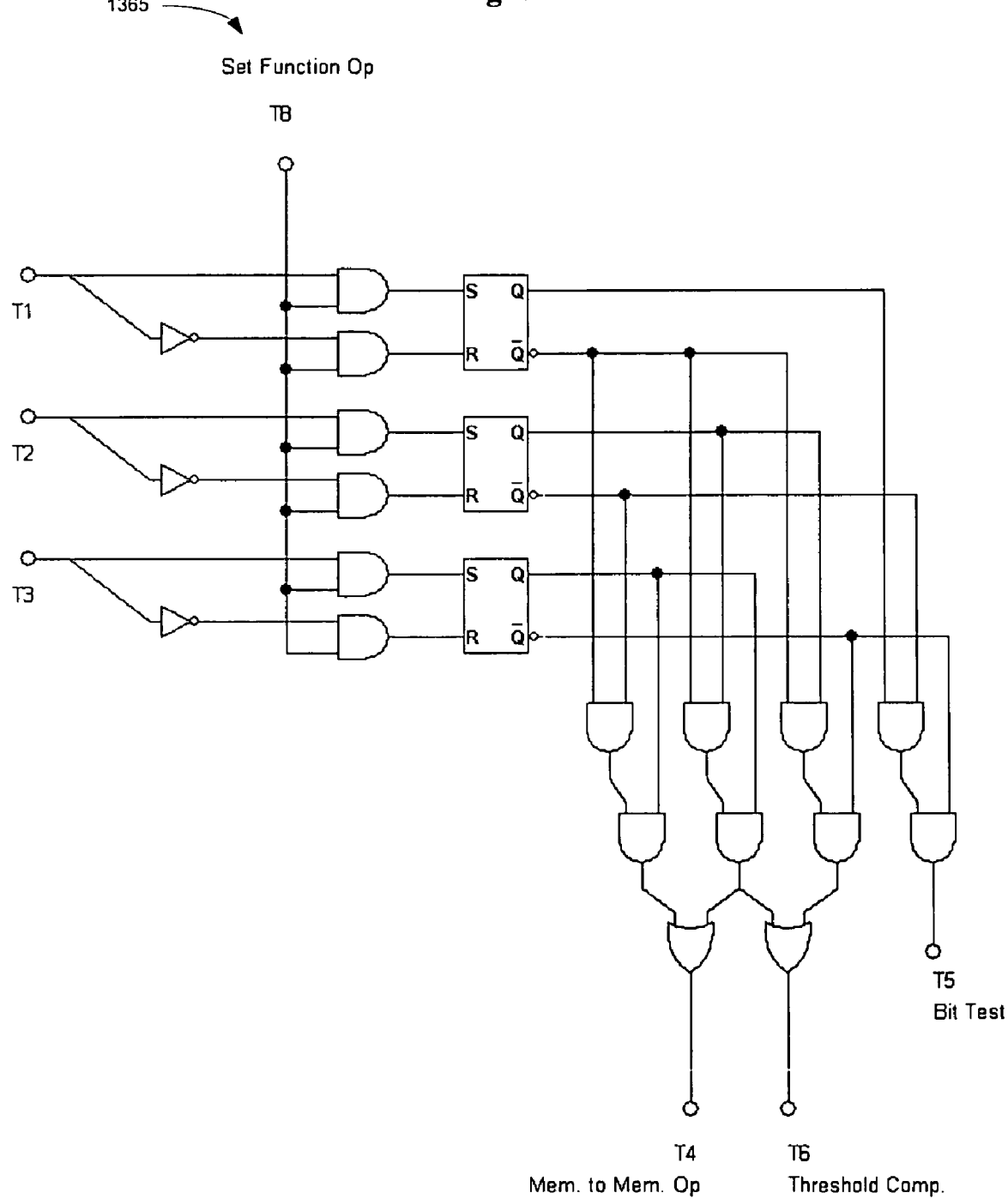
FIG. 60 is a detailed schematic diagram of a Function Determination Unit 1365, according to one embodiment.

FIG. 60 is a detailed schematic diagram of a Function Determination Unit 1365, according to one embodiment. The Function Determination Unit 1365 may receive one bit from the Operation Decoder 1335 (bit T8). This bit is "1" if the requested operation code is Set Function (op code 8). In one embodiment, this bit acts as a control bit—i.e., if this bit is "0" then all output from the Function Determination Unit 1365 is "0." In the embodiment depicted in FIG. 60, the Function Determination Unit 1365 receives 3 bits of input from the Instruction Register 1330 (bits T1-T3). These bits (as well as the inverse of these bits) are AND'd with the bit from the Operation Decoder 1335, and the results are fed into three SR Latches. The output of the Latches is processed through a series of AND and OR gates to produce three results.

In the embodiment depicted in FIG. 60, there are three outputs, one of which should return a true value while the other two are false. First, if bit T4 has a value of "1" then the function selected is a memory to memory operation. This value may be provided to the Memory/Immediate Chooser 1340. Second, if bit T5 has a value of "1" then the function selected is a bit test. This value may be AND'd with the result from the Bit Comparator 1360, then processed by two AND gates and two OR gates before being provided to the OR Register 1376. Third, if bit T6 has a value of "1" then the function selected is a threshold comparison operation. This value may be AND'd with the result from the Threshold Comparator 1355; and the inverse of this value may be AND'd with the result from the Equality Comparator 1350. These values are then processed by a series of AND and OR gates before being provided to the OR Register 1376.

Figure 61:
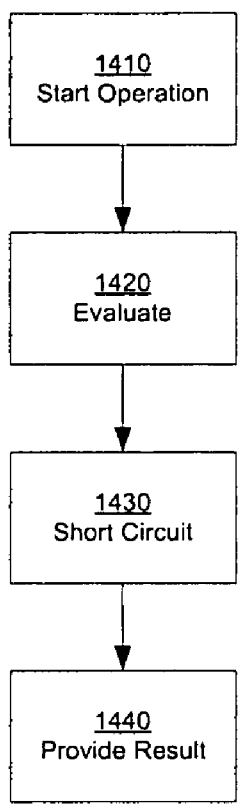
FIG. 61 is a flow chart depicting a method for processing a Boolean expression, according to one embodiment.

FIG. 61 is a flow chart depicting a method for processing a Boolean expression, according to one embodiment. In the embodiment depicted in FIG. 61, a method may be provided for processing a Boolean expression using a Boolean processor. In some embodiments, the method includes one or more of the following steps:

Step 1410: In some embodiments, the operation is started. The operation may be an operation related to a Normal Form Boolean expression. The Boolean expression may comprise a conjunct or a disjunct. In further embodiments, the step of starting an operation includes starting an operation related to a Disjunctive Normal Form Boolean expression. The Boolean expression may comprise a disjunct.

Figure 62:
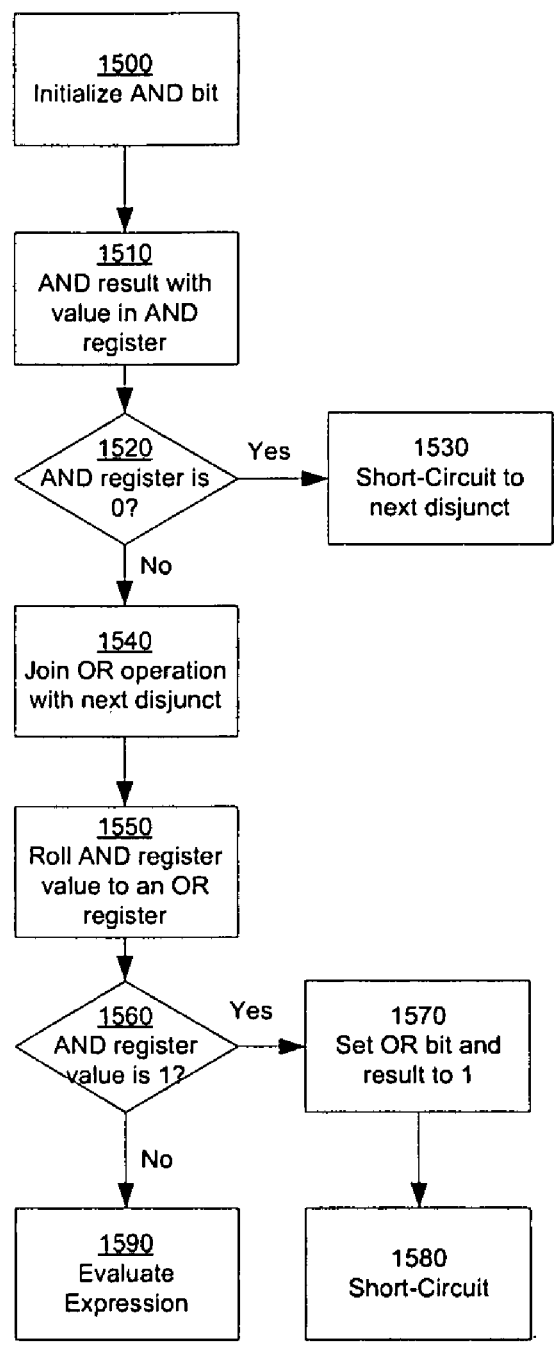
FIG. 62 is a flow chart depicting a method for evaluating a Boolean expression, according to one embodiment.

Step 1420: In further embodiments, the method includes evaluating the conjunct or disjunct. A plurality of terms of the disjunct may be evaluated as part of an AND operation. In some embodiments, the step of evaluating includes evaluating the disjunct. In various embodiments, the disjunct may be a stand-alone term evaluated as an OR operation. In further embodiments, the disjunct comprises an AND clause. This evaluation step may take place in a number of manners, an example is depicted in FIG. 62 and described in the accompanying description. In further embodiments, the evaluating step may include separating the Boolean expression into separate conjuncts or disjuncts. Further this step may include distributing each separate conjunct or disjunct to a separate Boolean processor for evaluation.

Step 1430: In some embodiments, the method includes selectively short-circuiting a portion of the Boolean expression. In some embodiments involving multiple Boolean processors, if a conjunct in a first Boolean processor results in a false evaluation, a signal may be provided to one or more separate Boolean processors. The signal may indicate that the entire expression is false. In further embodiments involving multiple Boolean processors, if a disjunct in a first Boolean processor results in a true evaluation, a signal may be provided to one or more separate Boolean processors. The signal may indicate that the entire expression is true.

Step 1440: In some embodiments, the method includes providing a result. The result may be provided to one or more processors or other devices via means described herein and/or otherwise known in the art.

FIG. 62 is a flow chart depicting a method for evaluating a Boolean expression, according to one embodiment. In some embodiments, the method includes one or more of the following steps:

Step 1500: In some embodiments, the method may comprise initializing the value of an AND-bit to a first predetermined value and setting the value of the AND-bit to a second predetermined value that differs from the first predetermined value.

Step 1510: In some embodiments, the method may comprise, in a disjunct comprising an AND clause, AND'ing the result of each AND operation with the current value of an AND register.

Steps 1520-1530: In some embodiments, in the event that the AND register has a value of 'zero', or its logical equivalent, and an AND disjunct register is set to 'one', or its logical equivalent, the disjunct is evaluated to false. Further, the method may include short-circuiting to a next disjunct.

Step 1540: In some embodiments, if the AND register does not have a value of 'zero,' the method may include joining an OR operation and the next disjunct.

Step 1550: In some embodiments, the method may include rolling the value of the AND register up to an OR register. This may be accomplished by OR'ing the value of the AND register with the value of the OR register.

Steps 1560-1580: In some embodiments, the method may determine whether the AND-bit has a value of 'true', or its logical equivalent, when the OR operation is processed. If the AND-bit has a value of 'true,' or its logical equivalent, the OR-bit may be set to a value of 'true' or its logical equivalent. In some embodiments, the final value of the Boolean expression is set to 'true', or its logical equivalent, if the OR-bit has a value of 'true', or its logical equivalent. In some embodiments, the remainder of the Boolean expression is and short-circuited.

Step 1590: In Some embodiments, if the AND-bit does not have a value of 'true', or its logical equivalent, then the expression is evaluated as described herein and/or in other ways known in the art. In some embodiments, the method may take place as part of a subroutine. Exiting the subroutine may be accomplished via an unconditional jump. The jump may be to the instruction immediately following the jump instruction that initiated the subroutine.

Figure 63:
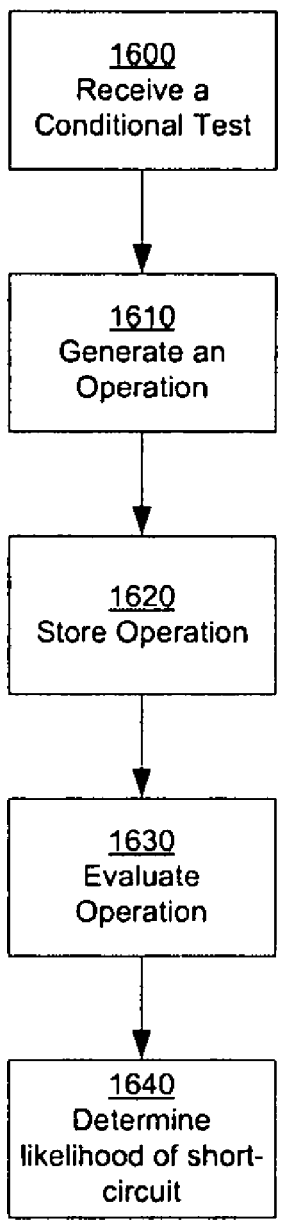
FIG. 63 is a flow chart depicting a compiling method, according to one embodiment.

FIG. 63 is a flow chart depicting a compiling method, according to one embodiment. The method may comprise one or more of the following steps:

Step 1600: In some embodiments, a plurality of conditional tests may be received. The conditional tests may be of any type disclosed herein and/or known in the art.

Step 1610: In some embodiments, an operation is generated. The operation may be generated in computer-readable format. In some embodiments, the operation is representative of a Boolean expression in Conjunctive Normal Form. In some embodiments, the operation is representative of a Boolean expression in Disjunctive Normal Form. This step may include considering whether the Boolean expression is in Disjunctive Normal Form or Conjunctive Normal Form.

Step 1620: In some embodiments, the operation is stored in a Boolean processor. The operation may comprise a plurality of portions. For example, a first of the plurality of portions may be more likely to create a short-circuit condition than at least a second of the plurality of portions. The generated operation may include ordering the plurality of portions within the operation such that the first of the plurality of portions is likely to be processed before the second of the plurality of portions.

Step 1630: In some embodiments, the operation is processed by a Boolean Processor. The Boolean processor may be operated to evaluate the expression by processing the operation and selectively short-circuiting at least a portion of the Boolean expression.

Step 1640: As described herein, for example in connection with step 1620, the operation may comprise a plurality of portions. In some such embodiments, the relative likelihood of at least the first and second of the plurality of portions to create a short-circuit condition may be determined. This determination may be repeated periodically. In further embodiments, the probability of one or more of a plurality of portions to create a short-circuit condition may be stored, for example, in a memory.

Figure 64:
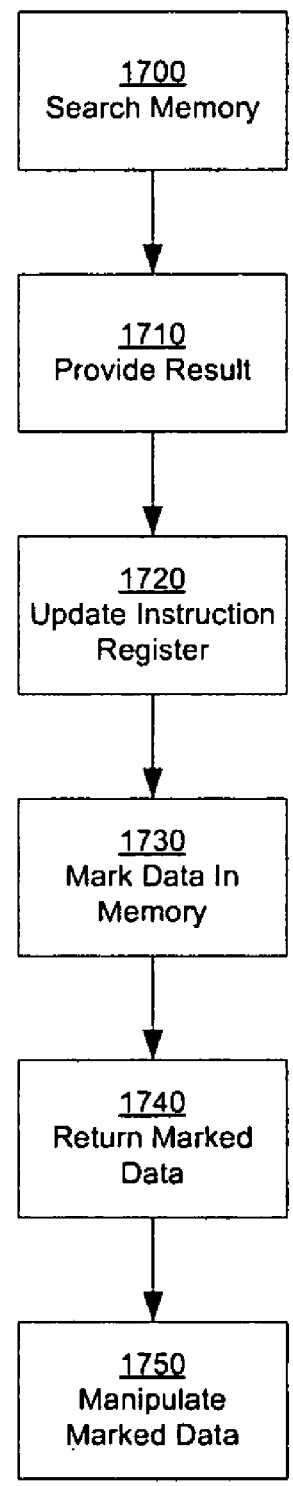
FIG. 64 is a flow chart depicting a method for processing a Boolean expression, according to one embodiment.

FIG. 64 is a flow chart depicting a method for processing a Boolean expression, according to one embodiment. The method may comprise one or more of the following steps:

Step 1700: In some embodiments, a method for processing a Boolean expression using a Boolean processor may be provided. Such a method may include the step of searching a memory for data that meets criteria. The criteria may be specified in an Instruction Register. The processor may be located on a memory chip.

Step 1710: In some embodiments, a result is provided. The result may be provided to one or more processors and/or other devices. Further the result may be provided via any communication means disclosed herein or otherwise known in the art.

Step 1720: In some embodiments, the Instruction Register may be updated. The Instruction may be dynamically updated. As a result of being updated, the Instruction Register may search the memory against one or more criteria.

Step 1730: In some embodiments, data is marked in memory. The marked data may be data that meets the specified criteria.

Step 1740: In some embodiments, the marked data is returned. The marked data may be returned to the requesting hardware or software. It may be returned by any communication means disclosed herein or otherwise known in the art.

Step 1750: In some embodiments, the marked data is manipulated. The marked data may be manipulated within the memory.

The Boolean Processor may be utilized in environments in which a set of operations will be repeated over subsets of data. In some applications, the sets of operations that are repeated only differ by the starting addresses of the memory locations that they are accessing. Thus, in some embodiments, it makes sense to support repetitive operations via the utilization of memory address offsets.

This functionality may be implemented in a number of ways. For example, one embodiment includes additional operations and/or registers for storing offset values. Another embodiment includes additional operations and/or logic for maintaining and modifying the offset values. For example, the additional operations and/or logic may facilitate incrementing, decrementing, or otherwise modifying the offset values. A pseudo-code example of an exemplary embodiment is as follows:

Task: Test each of 10 memory locations for the value x.
Without Support for Repetitive Operations:
 1. Test location 1
 2. Test location 2
 . . .
 . . .
 . . .
 10. Test location 10
With Support for Repetitive Operations:
 1. Set offset=0
 2. Test Location 1+Offset
 3. Increment Offset
 4. If offset<10, goto Step 2

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A processor, comprising:
a Boolean logic unit, wherein the Boolean logic unit is configured to perform a short-circuit evaluation of a Normal Form Boolean expression/operation, wherein performing a short-circuit evaluation comprises halting the evaluation of at least a portion of the Normal Form Boolean expression/operation if the outcome of the portion becomes known based on an outcome of an evaluation of a prior portion of the Normal Form Boolean expression/operation by the Boolean logic unit;
a plurality of input/output interfaces in communication with the Boolean logic unit, wherein the plurality of input/output interfaces are configured for receiving a plurality of compiled Boolean expressions/operations and transmitting a plurality of compiled results; and
a plurality of registers coupled to the plurality of input/output interfaces, wherein the plurality of registers comprise:
a first register for storing the outcome of the most recently evaluated conjunct or disjunct; and
a second register for rolling up the results of the conjuncts or disjuncts;
wherein the second register is initially set to a default value;
wherein, the Boolean Logic unit is further configured to perform the following logic:
if the expression is a conjunct and the evaluation of the conjunct expression stored in the first register is zero or its logical equivalent, then the value of the second register is set to a value other than its default value;

if the expression is a disjunct and the evaluation of the disjunct expression stored in the first register is one or its logical equivalent, then the value of the second register is set to a value other than its default value;

if the value of the second register is set to a value other than its default value, then the processor halts evaluation of the remainder of the expression/operation and provides the result of the expression/operation via one of the input/output interfaces.

2. The processor of claim 1, further comprising a p-bit OR register, wherein the p-bit OR register is operable for rolling up the results of disjuncts.

3. The processor of claim 1, further comprising a q-bit AND register, wherein the q-bit AND register is operable for storing the results of the evaluation of one or more terms within disjuncts.

4. The processor of claim 3, further comprising an r-bit AND disjunct register, wherein the r-bit AND disjunct register indicates that the evaluation of a disjunct comprising an AND clause has begun.

5. The processor of claim 4, wherein the r-bit AND disjunct register initializes to a value of 'zero', or its logical equivalent, and remains in that state until an AND expression/operation sets its value to 'one' or its logical equivalent and wherein the value of the r-bit AND disjunct register remains at 'one', or its logical equivalent, until reset by a Boolean OR operational code, an end of operation operational code, or a start of operation operational code.

6. The processor of claim 4, wherein a predetermined disjunct evaluates to false if the q-bit AND register is set to 'zero', or its logical equivalent, and the r-bit AND disjunct register is set to 'one', or its logical equivalent, and the processor short-circuits to the start of the next disjunct.

7. The processor of claim 1 further comprising a p-bit AND/OR register, wherein the p-bit AND/OR register is operable for rolling up the results of conjuncts and/or disjuncts.

8. The processor of claim 1, further comprising a q-bit AND/OR register, wherein the q-bit AND/OR register is operable for storing the results of the evaluation of one or more terms within conjuncts and disjuncts.

9. The processor of claim 1, further comprising:
one or more memory devices in communication with the processor, wherein the one or more memory devices are operable for storing the states of a plurality of devices that the processor monitors and controls, wherein the states are each stored in a particular memory location, and wherein the random-access memory includes at least one bit associated with each memory location, and wherein the at least one bit is operable for indicating whether or not the device state stored in the respective memory location is in the process of being modified; and
a circuit in communication with the one or more memory devices operated for:
setting the at least one bit of each memory location at the beginning of the process of modifying the device state stored in the respective memory location and for clearing the at least one bit of the respective memory location at the end of the process of modifying the device state stored therein; or
preventing the processor from reading a device state from a memory location when the at least one bit associated with the memory location indicates that the device state stored in the memory location is in the process of being modified.

10. The processor of claim 1, further comprising a control store, wherein the control store is operable for holding a compiled micro-program, a program counter, wherein the program counter is operable for fetching an instruction from the control store, and a device, wherein the device is operable for configuring the program counter for performing the short-circuit evaluation of a Normal Form Boolean expression/operation.

11. A method for processing a Boolean expression by performing a short-circuit evaluation of the Boolean expression using a processor comprising a Boolean logic unit, wherein the Boolean logic unit is in communication with a plurality of input/output interfaces, and a plurality of registers coupled to the plurality of input/output interfaces, the method comprising:

(a) receiving a Normal Form Boolean expression, wherein the Normal Form Boolean expression comprises a conjunct or a disjunct;
(b) storing the outcome of the most recently evaluated conjunct or disjunct in a first register;
(c) initially setting a second register to a default value;
(d) rolling up the results of a conjunct or disjunct in the second register;
(e) setting the value of the second register to a value other than its default value if the expression is a conjunct and the evaluation of the conjunct expression stored in the first register is zero or its logical equivalent;
(f) setting the value of the second register to a value other than its default value if the expression is a disjunct and the evaluation of the disjunct expression stored in the first register is one or its logical equivalent; and
(g) halting the evaluation of the remainder of the expression/operation and providing the result of the expression/operation via an input/output interface if the value of the second register is set to a value other than its default value.

12. The method of claim 11, wherein receiving a Normal Form Boolean expression comprises receiving a Disjunctive Normal Form Boolean expression, wherein the Normal Form Boolean expression comprises a disjunct, and wherein evaluating includes evaluating the disjunct.

13. The method of claim 11, wherein receiving a Normal Form Boolean expression comprises receiving a plurality of conjuncts or a plurality of disjuncts, and wherein evaluating the plurality of conjuncts or disjuncts includes:
separating the Boolean expression into separate conjuncts or disjuncts; and
distributing each separate conjunct or disjunct to a separate Boolean processor for evaluation.

14. The method of claim 13, wherein if the Boolean expression is a Conjunctive Normal Form Boolean expression, then short-circuiting includes:
if a conjunct in a first separate Boolean processor results in a false evaluation, providing a signal, from a first separate Boolean processor to one or more other separate Boolean processors, that the entire expression is false.

15. The method of claim 13, wherein if the Boolean expression is a Disjunctive Normal Form Boolean expression, then short-circuiting includes:
if a disjunct in a first separate Boolean processor results in a true evaluation, providing a signal, from the a first separate Boolean processor to one or more other separate Boolean processors, that the entire expression is true.

16. The method of claim 11, wherein if the Boolean logic circuit is operated for performing the short-circuit evaluation of Conjunctive Normal Form ("CNF") Boolean expressions/ operations, then the first address register is activated as a next operation address register and the second address register is activated as an end of OR address register, the output of the first address register is an address of a CNF expression immediately following the CNF expression being evaluated, and the output of the second address register is the address of the conjunct immediately following the conjunct being evaluated, wherein the output occurs in the event that the Boolean logic unit delivers an indication that the final evaluation of the CNF expression has been determined (false) to the first address register or an indication that the final evaluation of the current conjunct has been determined (true) to the second address register;

wherein if the Boolean logic circuit is operated for performing the short-circuit evaluation of Disjunctive Normal Form ("DNF") Boolean expressions/operations, then the first address register is activated as an end of operation address register and the second address register is activated as an end of AND address register, the output of the first address register is the address of the DNF expression immediately following the DNF expression being evaluated and the output of the second address register is the address of the disjunct immediately following the disjunct being evaluated, wherein the output occurs in the event that the Boolean logic unit delivers an indication that the final evaluation of the DNF expression has been determined (true) to the first address register or an indication that the final evaluation of the current disjunct has been determined (false) to the second address register; and wherein if the Boolean logic circuit is operated for performing the short-circuit evaluation of both Conjunctive and Disjunctive Normal Form Boolean expressions/operations, then the first address register is activated as a next operation/end of operation address register and the second address register is activated as an end of OR/AND address register, the output of the first address register is the address of the CNF/DNF expression immediately following the current CNF/DNF expression and the output of the second address register is the address of the conjunct/disjunct immediately following the current conjunct/disjunct, wherein the output occurs in the event that the Boolean logic unit delivers an indication that the final evaluation of the CNF/DNF expression has been determined to the first address register or an indication that the final evaluation of the current conjunct/disjunct has been determined to the second address register.

17. A compiling method for converting a plurality of conditional tests into a result of a Boolean expression, said method comprising:

receiving the plurality of conditional tests at a processor;
    based upon the received plurality of conditional tests, generating an operation, in computer-readable format, representative of the Boolean expression in Conjunctive Normal Form or Disjunctive Normal Form;
    storing the operation in a Boolean processor comprising a Boolean logic unit, wherein the Boolean logic unit is in communication with a plurality of input/output interfaces, and a plurality of registers coupled to the plurality of input/output interfaces;
    evaluating the Boolean expression by processing the operation and selectively short-circuiting a portion of the Boolean expression on the Boolean processor, wherein selectively short-circuiting a portion of the Boolean expression comprises:
    receiving a Normal Form Boolean expression, wherein the Normal Form Boolean expression comprises a conjunct or a disjunct;
    storing the outcome of the most recently evaluated conjunct or disjunct in a first register;
    initially setting a second register to a default value;
    rolling up the results of a conjunct or disjunct in the second register;
    setting the value of the second register to a value other than its default value if the expression is a conjunct and the evaluation of the conjunct expression stored in the first register is zero or its logical equivalent;
    setting the value of the second register to a value other than its default value if the expression is a disjunct and the evaluation of the disjunct expression stored in the first register is one or its logical equivalent; and
    halting the evaluation of the remainder of the expression/operation and providing the result of the expression/operation via an input/output interface if the value of the second register is set to a value other than its default value.

18. The method of claim 17, wherein the generated operation includes a plurality of portions, wherein at least a first of the plurality of portions is more likely to create a short-circuit condition than at least a second of the plurality of portions, and wherein generating an operation includes ordering the plurality of portions within the operation such that the first of the plurality of portions is likely to be processed before the second of the plurality of portions.

19. The method of claim 18, further comprising: determining the relative likelihood of at least the first and second of the plurality of portions to create a short-circuit condition.

20. The method of claim 19, wherein determining includes determining a probability of the first of the plurality of portions to create a short-circuit condition and a probability of the second of the plurality of portions to create a short-circuit condition, the method further comprising:

storing, in a memory, the probability of the first of the plurality of portions to create a short-circuit condition and the probability of the second of the plurality of portions to create a short-circuit condition.

* * * * *

UNITED STATES PATENT AND TRADEMARK OFFICE
CERTIFICATE OF CORRECTION

PATENT NO. : 8,307,197 B2
APPLICATION NO. : 12/364047
DATED : November 6, 2012
INVENTOR(S) : Kenneth Elmon Koch, III Page 1 of 1

It is certified that error appears in the above-identified patent and that said Letters Patent is hereby corrected as shown below:

Column 2, Line 46, Please delete "T1", please insert --Ti--

Column 73, Line 28, Please delete "bits T1-T14", please insert --bits T11-T14--

Column 80, Line 61, Claim 15, Please delete "the"

Signed and Sealed this
Fifteenth Day of January, 2013

David J. Kappos
*Director of the United States Patent and Trademark Office*